United States Patent
Malladi et al.

(10) Patent No.: US 9,942,013 B2
(45) Date of Patent: Apr. 10, 2018

(54) NON-ORTHOGONAL MULTIPLE ACCESS AND INTERFERENCE CANCELLATION

(71) Applicant: QUALCOMM Incorporated, San Diego, CA (US)

(72) Inventors: Durga Prasad Malladi, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 14/700,071

(22) Filed: Apr. 29, 2015

(65) Prior Publication Data

US 2015/0326360 A1 Nov. 12, 2015

Related U.S. Application Data

(60) Provisional application No. 61/990,099, filed on May 7, 2014.

(51) Int. Cl.
*H04L 12/56* (2006.01)
*H04L 5/00* (2006.01)
(Continued)

(52) U.S. Cl.
CPC ........ *H04L 5/0032* (2013.01); *H04J 11/0056* (2013.01); *H04L 5/0073* (2013.01);
(Continued)

(58) Field of Classification Search
None
See application file for complete search history.

(56) References Cited

U.S. PATENT DOCUMENTS

2006/0133338 A1 6/2006 Reznik et al.
2006/0176866 A1* 8/2006 Wakabayashi ........ H04W 28/12
370/342
(Continued)

FOREIGN PATENT DOCUMENTS

EP 2487987 A1 8/2012
EP 2523360 A1 11/2012
GB 2484755 A 4/2012

OTHER PUBLICATIONS

IPEA/EPO, Second Written Opinion of the International Preliminary Examining Authority, Int'l Appl. No. PCT/US2015/028525, dated Jun. 28, 2016, European Patent Office, Munich, DE, 9 pgs.
(Continued)

*Primary Examiner* — Mohammad Anwar
*Assistant Examiner* — Angel Brockman
(74) *Attorney, Agent, or Firm* — Holland & Hart LLP

(57) ABSTRACT

Methods, systems, and devices are described for hierarchical modulation and interference cancellation in wireless communications systems. Various deployment scenarios may be supported that may provide communications on both a base modulation layer as well as in an enhancement modulation layer that is modulated on the base modulation layer, thus providing concurrent data streams that may be provided to the same or different user equipments. Various interference mitigation techniques may be implemented in examples to compensate for interfering signals received from within a cell, compensate for interfering signals received from other cell(s), and/or compensate for interfering signals received from other radios that may operate in adjacent wireless communications network.

132 Claims, 47 Drawing Sheets

(51) Int. Cl.
*H04W 72/04* (2009.01)
*H04J 11/00* (2006.01)
*H04L 27/34* (2006.01)
*H04L 5/14* (2006.01)

(52) U.S. Cl.
CPC ....... *H04L 27/3488* (2013.01); *H04W 72/042* (2013.01); *H04L 5/006* (2013.01); *H04L 5/0055* (2013.01); *H04L 5/1469* (2013.01)

(56) References Cited

U.S. PATENT DOCUMENTS

| | | |
|---|---|---|
| 2007/0268977 A1 | 11/2007 | Wang et al. |
| 2009/0274077 A1* | 11/2009 | Meylan ................. H04W 28/06 370/280 |
| 2010/0142448 A1* | 6/2010 | Schlicht ................. H04W 4/20 370/328 |
| 2011/0124289 A1 | 5/2011 | Balachandran et al. |
| 2012/0154532 A1 | 6/2012 | Faraj et al. |
| 2012/0219087 A1 | 8/2012 | Lim et al. |
| 2012/0327876 A1* | 12/2012 | Ouchi ................... H04B 1/713 370/329 |
| 2013/0242924 A1* | 9/2013 | Kim ..................... H04B 7/2656 370/329 |
| 2014/0226520 A1* | 8/2014 | Seo ...................... H04B 7/0434 370/252 |
| 2014/0369279 A1* | 12/2014 | Yu ....................... H04B 7/0639 370/329 |
| 2015/0131565 A1* | 5/2015 | Nakashima ........... H04L 1/0026 370/329 |
| 2015/0146642 A1* | 5/2015 | Seo ...................... H04L 1/0003 370/329 |

OTHER PUBLICATIONS

ISA/EPO, Partial International Search Report of the International Searching Authority, Int'l Appl. No. PCT/US2015/028525, dated Jul. 7, 2015, European Patent Office, Rijswijk, NL, 5 pgs.

ISA/EPO, International Search Report and Written Opinion of the International Searching Authority, Int'l Appl. No. PCT/US2015/028525, dated Sep. 14, 2015, European Patent Office, Rijswijk, NL, 16 pgs.

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

2300

NON-ORTHOGONAL MULTIPLE ACCESS AND INTERFERENCE CANCELLATION

CROSS REFERENCES

The present application for patent claims priority to U.S. Provisional Patent Application No. 61/990,099 by Malladi et al., entitled "Non-Orthogonal Multiple Access And Interference Cancellation," filed May 7, 2014, assigned to the assignee hereof, and expressly incorporated by reference herein.

BACKGROUND

Field of the Disclosure

The present disclosure relates to wireless communication systems, for example, and more particularly to non-orthogonal multiple access and interference cancellation.

Description of the Related Art

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of base stations, that can each support communication for a number of user equipments (UEs). A UE may communicate with a base station via downlink and uplink. The downlink (or forward link) refers to the communication link from the base station to the UE, and the uplink (or reverse link) refers to the communication link from the UE to the base station. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Additionally, some systems may operate using time-division duplex (TDD), in which a single carrier is used for both uplink and downlink communications, and some systems may operate using frequency-division duplex (FDD), in which separate carrier frequencies are used for uplink and downlink communications.

As wireless communications networks become more congested, operators are seeking ways to increase capacity. Various approaches may include using small cells, unlicensed spectrum, or wireless local area networks (WLANs) to offload some of the traffic and/or signaling. Many of the approaches for enhancing capacity may cause interference with concurrent communications in a cell, or in adjacent/neighboring cells. For example, a UE in one cell may be transmitting uplink communications while a base station in a neighboring cell may be transmitting downlink communications at a signal strength that may interfere with the uplink communications from the UE. In other examples, interference may arise from radios operating in adjacent frequency bands. In order to provide enhanced data rates through a wireless communications network, it may be beneficial to mitigate such interference at a UE or a base station.

SUMMARY

Methods, systems, and devices are described for hierarchical modulation and interference cancellation in wireless communications systems. Various deployment scenarios may be supported that may provide communications on both a base modulation layer as well as in an enhancement modulation layer that is modulated on the base modulation layer, thus providing concurrent data streams that may be provided to the same or different user equipments (UEs). Various interference mitigation techniques may be implemented, in examples, to compensate for interfering signals received from within a cell, compensate for interfering signals received from other cells, and/or compensate for interfering signals received from other radios that may operate in adjacent wireless communications networks.

In certain examples, concurrent non-orthogonal wireless communications data streams may be provided to a UE from a base station through hierarchical modulation. Certain content may be selected for transmission on a base modulation layer, and different content may be selected for transmission on an enhancement modulation layer. The base modulation layer content may be modulated onto the base modulation layer, and then the enhancement layer content may be modulated onto the enhancement modulation layer which is superpositioned on the base modulation layer and transmitted to one or more UE(s). A UE receiving both the base modulation layer and the enhancement modulation layer may decode content received on the base modulation layer, and perform interference cancellation to cancel the signal of the base modulation layer. The UE may then decode content received on the enhancement modulation layer.

In some examples, the base modulation layer may support transmissions having a higher likelihood of transmission success, and the base modulation layer may be used to transmit content having a relatively lower error threshold. The enhancement modulation layer, in some examples, may support transmissions having relatively lower likelihood of transmission success, and may be used for transmission of content having a relatively higher error threshold.

According to various examples, UEs and base stations may perform various types of interference mitigation on received signals. Such interference mitigation may be performed on signals generated from within the serving cell associated with the UEs and base stations (intra-cell interference), from neighboring cells of the serving cell (inter-cell interference), and/or on signals from transmitters operating according to a different communications protocol in a same communications channel at the serving cell or transmitters in adjacent communications channels (inter radio interference).

According to a first aspect of the disclosure, a method for transmitting hierarchical content may include identifying first content for transmission, the first content associated with a first error rate threshold; identifying second content for transmission, the second content associated with a second error rate threshold that is higher than the first error rate threshold; modulating the first content on a base modulation layer; modulating the second content on an enhancement modulation layer; superpositioning the enhancement modulation layer on the base modulation layer; and transmitting the superpositioned base and enhancement modulation layers. In some examples, the first error rate threshold and the second error rate threshold may be based on a type of information contained in the first content and second content. The first content may include, for example, high priority content and the second content may include, for example, lower priority content. The first content and the second content may be transmitted to a same UE, or may be transmitted to different UEs.

According to some examples, the first content may include control information for a UE that is configured to receive the first content. Such control information may include, for example, one or more of scheduling grant information, acknowledgment information, or signaling information. In some examples, the UE configured to receive the control information may not transmit an acknowledgment of receipt of the control information. In certain examples, the second content may include user data, and the UE configured to receive the user data may transmit an acknowledgment of receipt of the user data. The control information may be transmitted, for example, using a physical downlink control channel (PDCCH) on the base modulation layer, and the user data may be transmitted using a physical downlink shared channel (PDSCH) on the enhancement modulation layer. In some examples, the base modulation layer and enhancement modulation layer may have a same modulation scheme, or may have different modulation schemes. The modulation scheme for each of the base modulation layer and enhancement modulation layer may include, for example, a quadrature phase shift keying (QPSK) modulation scheme, a binary phase shift keying (BPSK) modulation scheme, or a quadrature amplitude modulation (QAM) modulation scheme.

In certain examples, the first content may include latency sensitive unicast data for a first UE and the second content may include best effort unicast data for the first UE or a different UE. The latency sensitive unicast data may be transmitted using a PDSCH on the base modulation layer and the best effort unicast data may be transmitted using a PDSCH on the enhancement modulation layer. In some examples, the first content may include broadcast data and the second content may include unicast data for a specific UE. In other examples, the first content may include unicast data and the second content may include broadcast data. The broadcast data may be transmitted using a physical multicast channel (PMCH) on the base modulation layer and the unicast data may be transmitted using a PDSCH on the enhancement modulation layer. In some examples, UEs configured to receive the broadcast data may not transmit an acknowledgment of receipt of the broadcast data, and specific UEs configured to receive unicast data may transmit an acknowledgment of receipt of the unicast data.

In further examples, the method may also include determining channel state information (CSI) for a channel to be used for transmission of the base modulation layer and the enhancement modulation layer; and calculating a transmission energy ratio between the base modulation layer and enhancement modulation layer based on the CSI. The determining CSI and the calculating the transmission energy ratio may be performed for each of a plurality of transmission time intervals (TTIs).

Additionally or alternatively, the method may also include determining a number of spatial layers available for transmission of each of the base modulation layer and enhancement modulation layer; and transmitting the superpositioned base and enhancement modulation layers on the determined spatial layers. Determining the number of spatial layers may be based on, for example, a rank indicator (RI) from at least one UE.

The method may also include, in certain examples, determining CSI for a plurality of UEs; and ordering which of the plurality of UEs are to receive one or more of the base modulation layer or the enhancement modulation layer based on the CSI for each of the plurality of UEs. In some examples, transmitting the superpositioned base and enhancement modulation layers may include: transmitting the base modulation layer to one or more UEs determined to have lower channel quality based on the determined CSI; and transmitting the enhancement modulation layer to one or more UEs determined to have higher channel quality based on the determined CSI.

According to certain examples, the method may also include transmitting signaling information to at least one UE that is to receive the superpositioned base and enhancement modulation layers. The signaling information may include, for example, one or more of a transmission energy ratio between the base modulation layer and the enhancement modulation layer, a transport block size for the base modulation layer and the enhancement modulation layer, or a modulation and coding scheme for the base modulation layer and the enhancement modulation layer. In some examples, the signaling information may include a downlink grant for a UE indicating downlink resources for the UE on one or more of the base modulation layer or the enhancement modulation layer. Such a downlink grant may indicate, for example, one or more of: a resource block location of data transmitted to the UE on one or more of the base modulation layer or the enhancement modulation layer, a modulation and coding scheme (MCS) of the data transmitted to the UE on one or more of the base modulation layer or the enhancement modulation layer, a precoding matrix used for transmitting on one or more of the base modulation layer or the enhancement modulation layer, layer mapping for one or more of the base modulation layer or the enhancement modulation layer, code block size for one or more of the base modulation layer or the enhancement modulation layer, or a number of spatial layers for one or more of the base modulation layer or the enhancement modulation layer.

In some examples, the downlink grant may be a single downlink grant that includes information for each of the base modulation layer or the enhancement modulation layer, or may include two or more downlink grants for two or more UEs, each downlink grant corresponding to a base modulation layer or an enhancement modulation layer. In some examples, each downlink grant may include an indication of the base modulation layer or the enhancement modulation layer and downlink resources of the indicated base modulation layer or the enhancement modulation layer. Such an indication of the base modulation layer or the enhancement modulation layer may include one or more bits embedded in the downlink grant, or may include a cyclic redundancy check (CRC) masked with a cell radio network temporary identifier (C-RNTI) for the UE to indicate the downlink resources are for the base modulation layer or the enhancement modulation layer. The C-RNTI for the base modulation layer may include a primary cell radio network temporary identifier (PC-RNTI) for the UE, and the C-RNTI for the enhancement modulation layer may include a secondary cell radio network temporary identifier (SC-RNTI) for the UE, according to some examples.

In certain examples, the signaling information may include radio resource control (RRC) signaling, which may include, for example, one or more of an energy ratio between the base modulation layer and enhancement modulation layer, a modulation scheme for the base modulation layer, a modulation scheme for the enhancement modulation layer, a resource block size for the base modulation layer, or a resource block size for the enhancement modulation layer. The signaling information may be provided, in some examples, using a physical control format indicator channel (PCFICH). In certain examples, the signaling information may include independent control information for each of the base modulation layer and the enhancement modulation layer.

According to a second aspect of the disclosure, a method for wireless communication may include receiving a signal comprising an enhancement modulation layer superpositioned on a base modulation layer; determining that data may be to be decoded from the enhancement modulation layer by performing interference mitigation on the received signal to mitigate interference from the base modulation layer; and decoding the enhancement modulation layer. The determining may include, in some examples, receiving control signaling from a serving base station indicating that data may be to be decoded from the enhancement modulation layer. Such control signaling may include a downlink grant indicating resources to be decoded in the enhancement modulation layer, and may include signal characteristics of the base modulation layer for use in performing the interference mitigation. The control signaling may be provided, for example, in the base modulation layer.

According to certain examples, the performing interference mitigation may include one or more of: performing linear minimum mean square error (MMSE) suppression on the received signal to mitigate interference from the base modulation layer; performing QR decomposition based sphere decoding (QR-SD) on the received signal to mitigate interference from the base modulation layer; or performing successive interference cancellation (SIC) on the received signal to mitigate interference from the base modulation layer.

According to a third aspect of the disclosure, a method for transmitting hierarchical content may include receiving a resource grant identifying hierarchical modulation resources, the hierarchical modulation resources comprising a base modulation layer and an enhancement modulation layer, the base modulation layer having a lower error rate threshold than the enhancement modulation layer; identifying first content for transmission on the base modulation layer; identifying second content for transmission on the enhancement modulation layer; superpositioning the enhancement modulation layer on the base modulation layer; and transmitting the superpositioned base and enhancement modulation layers.

In certain examples, the base modulation layer may include a physical uplink control channel (PUCCH) and the enhancement modulation layer may include a physical uplink shared channel (PUSCH). In some examples, both the base modulation layer and enhancement modulation layer may include a PUSCH. In further examples, the first content may include high priority content and the second content may include lower priority content.

According to some examples, receiving the resource grant may include receiving a single uplink grant from a base station indicating hierarchical modulation resources for both the base modulation layer and enhancement modulation layer. The uplink grant may include, for example, one or more of an energy ratio between the base modulation layer and the enhancement modulation layer, layer mapping information, code block size, or a number of spatial layers within each of the base modulation layer and the enhancement modulation layer. In some examples, the uplink grant may also indicate a number of spatial layers for transmission of each of the base modulation layer and enhancement modulation layer. The base modulation layer and enhancement modulation layer may have the same modulation scheme, or the base modulation layer and enhancement modulation layer may have different modulation schemes. The modulation scheme for each of the base modulation layer and enhancement modulation layer may include a QPSK modulation scheme, a BPSK modulation scheme, or a QAM modulation scheme.

In some examples, receiving the resource grant may include receiving a first uplink grant from a base station indicating hierarchical modulation resources for the base modulation layer; and receiving a second uplink grant from the base station indicating hierarchical modulation resources for the enhancement modulation layer. Each of the first and second uplink grants may include, for example, spatial information indicating a number of spatial layers within the corresponding modulation layer, and/or an indication of the base modulation layer or the enhancement modulation layer and uplink resources of the indicated base modulation layer or the enhancement modulation layer. The indication of the base modulation layer or the enhancement modulation layer may include one or more bits embedded in the uplink grant, such as, for example, a CRC masked with a C-RNTI for a UE to indicate that the uplink resources are for the base modulation layer or the enhancement modulation layer. The C-RNTI for the base modulation layer may include a PC-RNTI for the UE, and the C-RNTI for the enhancement modulation layer may include a SC-RNTI for the UE.

In some examples, the method may also include receiving signaling information that may include one or more of a transmission energy ratio between the base modulation layer and the enhancement modulation layer, a transport block size for the base modulation layer and the enhancement modulation layer, or a modulation and coding scheme for the base modulation layer and the enhancement modulation layer. The signaling information may be received, for example, in RRC signaling, and/or in the resource grant. In some examples, the signaling information may be received on a PCFICH. In further examples, the signaling information may include independent control information for each of the base modulation layer and the enhancement modulation layer. In other examples, the first content may include control information transmitted on a PUCCH.

In certain examples, the control information may include one or more of acknowledgment of downlink data, CSI, a rank indicator (RI), or a scheduling request (SR). The control information further may include, for example, uplink information associated with the enhancement modulation layer. The uplink information associated with the enhancement modulation layer may include a data rate associated with the enhancement modulation layer.

According to a fourth aspect of the disclosure, a method for wireless communication at a UE may include determining transmission characteristic information of signals transmitted from a neighboring cell UE; and performing interference mitigation on a signal received from a serving cell base station based on the determined transmission characteristic information. The signals transmitted from the neighboring cell UE, for example, may include uplink subframes transmitted from the neighboring cell UE to a neighboring cell base station according to a different time division duplex (TDD) uplink/downlink (UL/DL) configuration from a TDD UL/DL configuration used by the serving cell base station. The TDD UL/DL configuration used by the neighboring cell UE may include at least one uplink subframe transmitted from the neighboring cell UE to the neighboring cell base station during a downlink subframe transmitted from the serving cell base station, for example. In some examples, the signals transmitted from the neighboring cell UE may include at least one device-to-device (D2D) transmission to another neighboring cell node. Such a D2D transmission may be transmitted from the neighboring cell UE during a downlink subframe transmitted from the serving cell base station, for example.

In certain examples, determining the transmission characteristic information may include monitoring for transmissions from neighboring cell UEs; and determining the transmission characteristic information based on transmissions received while monitoring for the transmissions from neighboring cell UEs. The transmission characteristic information may include one or more of modulation order, number of spatial layers, or precoding information, for example.

In some examples, determining the transmission characteristic information may include: monitoring for transmissions from neighboring cell base stations; and determining the transmission characteristic information based on uplink grant information for uplink transmissions from the neighboring cell UE, the uplink grant information received while monitoring for the transmissions from neighboring cell base stations. Monitoring for transmissions from neighboring cell base stations may include, for example, monitoring a PDCCH of a neighboring cell base station, decoding uplink grants for the neighboring cell UE; and determining the transmission characteristic information of signals transmitted from the neighboring cell UE based on the decoded uplink grants. In some examples, determining the transmission characteristic information may include receiving the transmission characteristic information from a serving cell base station. The serving cell base station may receive the transmission characteristic information through an X2 communications link with the neighboring cell base station or from a central scheduler in communication with the serving cell base station and the neighboring cell base station, for example.

According to a fifth aspect of the disclosure, a method for wireless communication at a serving cell base station may include determining a first transmission characteristic information of signals transmitted from a neighboring cell base station; determining a second transmission characteristic information of signals transmitted from a neighboring cell UE; and performing interference mitigation on a signal received from a UE associated with the serving cell base station based on the determined first transmission characteristic information and the second transmission characteristic information. In some examples, the signals transmitted from the neighboring cell base station may include downlink subframes transmitted from the neighboring cell base station to the neighboring cell UE according to a TDD UL/DL configuration different from a TDD UL/DL configuration used by the serving cell base station. The TDD UL/DL configuration used by the neighboring cell base station may include, for example, at least one downlink subframe transmitted from the neighboring cell base station to the neighboring cell UE during an uplink subframe transmitted from the serving cell UE. In some examples, the signals transmitted from the neighboring cell UE may include one or more of an uplink control channel transmission or an uplink data channel transmission during an uplink subframe transmission from the UE associated with the serving cell base station.

In certain examples, the method may also include determining which of the neighboring cell base station or the neighboring cell UE may be transmitting during an uplink subframe transmission from the UE associated with the serving cell base station; and performing the interference mitigation may be based on which of the neighboring cell base station or neighboring cell UE may be transmitting during the uplink subframe transmission from the UE associated with the serving cell.

In some examples, determining the second transmission characteristic information of signals transmitted from the neighboring cell UE may include monitoring for transmissions from neighboring cell UEs; and determining the second transmission characteristic information of signals transmitted from the neighboring cell UE based on transmissions received while monitoring for the transmissions from the neighboring cell UEs. The second transmission characteristic information of signals transmitted from the neighboring cell UE may include, for example, one or more of modulation order, number of spatial layers, or precoding information. In some examples, determining the second transmission characteristic information of signals transmitted from the neighboring cell UE may include monitoring for transmissions from neighboring cell base stations; and determining uplink grant information for uplink transmissions from the neighboring cell UE based on transmissions received while monitoring for the transmissions from the neighboring cell base stations.

Monitoring for transmissions from neighboring cell base stations may include, for example, monitoring a PDCCH of the neighboring cell base station, and determining downlink transmission characteristic information for downlink transmissions from the neighboring cell base station based on transmissions received while monitoring for the transmissions from the neighboring cell base stations. In some examples, determining the first transmission characteristic information of signals transmitted from the neighboring cell base station and the determining the second transmission characteristic information of signals transmitted from the neighboring cell UE may include receiving the first and second transmission characteristic information through an X2 communications link with the neighboring cell base station or from a central scheduler in communication with the serving cell base station and the neighboring cell base station.

According to a sixth aspect of the disclosure a method for wireless communication at a receiving node may include establishing a first wireless communications channel for receiving wireless transmissions from a transmitting node; determining transmission channel information of a second wireless communications channel different from the first wireless communications channel; and performing interference mitigation on a signal received on the first wireless communications channel from the transmitting node based on the transmission channel information of the second wireless communications channel. In some examples, the determining transmission channel information of the second wireless communications channel may include decoding a transmission preamble of a wireless transmission on the second wireless communications channel.

The performing interference mitigation may include, in certain examples, estimating interference from the second wireless communications channel based on the decoded transmission preamble; and performing an interference cancellation on the signal received on the first wireless communications channel based on the estimated interference. The estimated interference may include one or more of radio frequency (RF) nonlinearities, harmonics from the second wireless communications channel introduced into the first wireless communications channel, intermodulation distortion (IMD) from the second wireless communications channel; channel leakage from the second wireless communications channel, or coupling between the first and second wireless communications channels. The transmission channel information of the second wireless communications channel may include, in some examples, co-channel interference between the second wireless communications channel and the first wireless communications channel. In certain examples, the first wireless communications channel and second wireless communications channel are associated with nodes operating in an unlicensed spectrum according to different wireless transmission protocols.

In some examples, the first wireless communications channel may be associated with a node operating in an unlicensed spectrum according to a Long Term Evolution (LTE) protocol and the second wireless communications channel may be associated with a different node operating in the unlicensed spectrum according to an IEEE 802.11 protocol. In other examples, the first wireless communications channel may be associated with a node operating in an unlicensed spectrum according to an IEEE 802.11 protocol and the second wireless communications channel may be associated with a different node operating in the unlicensed spectrum according to an LTE protocol. In further examples, the second wireless communications channel may be an adjacent channel to the first wireless communications channel, and leakage from the adjacent channel may cause interference with signals of the first wireless communications channel. Such leakage from the adjacent channel may cause interference with signals of the first wireless communications channel, and performing interference mitigation may include performing an interference cancellation on the signal received on the first wireless communications channel based on the transmission channel information of the second wireless communications channel.

In certain examples, the transmitting node may be a base station or UE operating according to an LTE protocol, or may be an access point or a station operating according to an IEEE 802.11 protocol, for example.

According to a seventh aspect of the disclosure, an apparatus for transmitting hierarchical content, may include a processor, memory in electronic communication with the processor and instructions stored in the memory. The instructions may be executable by the processor to: identify first content for transmission, the first content associated with a first error rate threshold; identify second content for transmission, the second content associated with a second error rate threshold that may be higher than the first error rate threshold; modulate the first content on a base modulation layer; modulate the second content on an enhancement modulation layer; superposition the enhancement modulation layer on the base modulation layer; and transmit the superpositioned base and enhancement modulation layers. In certain examples, the apparatus may implement one or more aspects of the first aspect of the disclosure described above.

According to an eighth aspect of the disclosure, an apparatus for wireless communication may include a processor, memory in electronic communication with the processor and instructions stored in the memory. The instructions being executable by the processor to: receive a signal comprising an enhancement modulation layer superpositioned on a base modulation layer; determine that data may be to be decoded from the enhancement modulation layer by performing interference mitigation on the received signal to mitigate interference from the base modulation layer; and decode the enhancement modulation layer. In certain examples, the apparatus may implement one or more aspects of the second aspect of the disclosure described above.

According to a ninth aspect of the disclosure, an apparatus for transmitting hierarchical content may include a processor, memory in electronic communication with the processor and instructions stored in the memory. The instructions may be executable by the processor to: receive a resource grant identifying hierarchical modulation resources, the hierarchical modulation resources comprising a base modulation layer and an enhancement modulation layer, the base modulation layer having a lower error rate threshold than the enhancement modulation layer; identify first content for transmission on the base modulation layer; identify second content for transmission on the enhancement modulation layer; superposition the enhancement modulation layer on the base modulation layer; and transmit the superpositioned base and enhancement modulation layers. In certain examples, the apparatus may implement one or more aspects of the third aspect of the disclosure described above.

According to a tenth aspect of the disclosure, an apparatus for wireless communication at a user equipment may include a processor, memory in electronic communication with the processor and instructions stored in the memory. The instructions may be executable by the processor to: determine transmission characteristic information of signals transmitted from a neighboring cell UE; and perform interference cancellation on a signal received from a serving cell base station based on the determined transmission characteristic information. In certain examples, the apparatus may implement one or more aspects of the fourth aspect of the disclosure described above.

According to an eleventh aspect of the disclosure, an apparatus for wireless communication at a serving cell base station may include a processor, memory in electronic communication with the processor and instructions stored in the memory. The instructions may be executable by the processor to: determine transmission characteristic information of signals transmitted from a neighboring cell base station; determine transmission characteristic information of signals transmitted from a neighboring cell UE; and perform interference cancellation on a signal received from a serving cell UE based on the determined information. In certain examples, the apparatus may implement one or more aspects of the fifth aspect of the disclosure described above.

According to a twelfth aspect of the disclosure, an apparatus for wireless communication at a receiving node may include a processor, memory in electronic communication with the processor and instructions stored in the memory. The instructions may be executable by the processor to: establish a first wireless communications channel for receiving wireless transmissions from a transmitting node; determine transmission channel information of a second wireless communications channel different from the first wireless communications channel; and perform interference mitigation on a signal received on the first wireless communications channel from the transmitting node based on the transmission channel information of the second wireless communications channel. In certain examples, the apparatus may implement one or more aspects of the sixth aspect of the disclosure described above.

According to a thirteenth aspect of the disclosure, an apparatus for transmitting hierarchical content, may include: means for identifying first content for transmission, the first content associated with a first error rate threshold; means for identifying second content for transmission, the second content associated with a second error rate threshold that may be higher than the first error rate threshold; means for modulating the first content on a base modulation layer; means for modulating the second content on an enhancement modulation layer; means for superpositioning the enhancement modulation layer on the base modulation layer; and means for transmitting the superpositioned base and enhancement modulation layers. In certain examples, the apparatus may implement one or more aspects of the first aspect of the disclosure described above.

According to a fourteenth aspect of the disclosure, an apparatus for wireless communication may include: means for receiving a signal comprising an enhancement modulation layer superpositioned on a base modulation layer; means for determining that data may be to be decoded from the enhancement modulation layer by performing interference mitigation on the received signal to mitigate interference from the base modulation layer; and means for decoding the enhancement modulation layer. In certain examples, the apparatus may implement one or more aspects of the second aspect of the disclosure described above.

According to a fifteenth aspect of the disclosure, an apparatus for transmitting hierarchical content may include: means for receiving a resource grant identifying hierarchical modulation resources, the hierarchical modulation resources comprising a base modulation layer and an enhancement modulation layer, the base modulation layer having a lower error rate threshold than the enhancement modulation layer; means for identifying first content for transmission on the base modulation layer; means for identifying second content for transmission on the enhancement modulation layer; means for superpositioning the enhancement modulation layer on the base modulation layer; and means for transmitting the superpositioned base and enhancement modulation layers. In certain examples, the apparatus may implement one or more aspects of the third aspect of the disclosure described above.

According to a sixteenth aspect of the disclosure, an apparatus for wireless communication may include: means for determining transmission characteristic information of signals transmitted from a neighboring cell UE; and means for performing interference cancellation on a signal received from a serving cell base station based on the determined transmission characteristic information. In certain examples, the apparatus may implement one or more aspects of the fourth aspect of the disclosure described above.

According to a seventeenth aspect of the disclosure, an apparatus for wireless communication may include: means for determining transmission characteristic information of signals transmitted from a neighboring cell base station; means for determining transmission characteristic information of signals transmitted from a neighboring cell UE; and means for performing interference cancellation on a signal received from a serving cell UE based on the determined information. In certain examples, the apparatus may implement one or more aspects of the fifth aspect of the disclosure described above.

According to an eighteenth aspect of the disclosure, an apparatus for wireless communication may include: means for establishing a first wireless communications channel for receiving wireless transmissions from a transmitting node; means for determining transmission channel information of a second wireless communications channel different from the first wireless communications channel; and means for performing interference mitigation on a signal received on the first wireless communications channel from the transmitting node based on the transmission channel information of the second wireless communications channel. In certain examples, the apparatus may implement one or more aspects of the sixth aspect of the disclosure described above.

According to a nineteenth aspect of the disclosure, a non-transitory computer-readable medium storing computer-executable code for wireless communication is described. In one configuration, the code may be executable by a processor to: identify first content for transmission, the first content associated with a first error rate threshold; identify second content for transmission, the second content associated with a second error rate threshold that may be higher than the first error rate threshold; modulate the first content on a base modulation layer; modulate the second content on an enhancement modulation layer; superposition the enhancement modulation layer on the base modulation layer; and transmit the superpositioned base and enhancement modulation layers. In certain examples, the non-transitory computer-readable medium may implement one or more aspects of the first aspect of the disclosure described above.

According to an twentieth aspect of the disclosure, a non-transitory computer-readable medium storing computer-executable code for wireless communication is described. In one configuration, the code may be executable by a processor to: receive a signal comprising an enhancement modulation layer superpositioned on a base modulation layer; determine that data may be to be decoded from the enhancement modulation layer by performing interference mitigation on the received signal to mitigate interference from the base modulation layer; and decode the enhancement modulation layer. In certain examples, the non-transitory computer-readable medium may implement one or more aspects of the second aspect of the disclosure described above.

According to a twenty-first aspect of the disclosure, a non-transitory computer-readable medium storing computer-executable code for wireless communication is described. In one configuration, the code may be executable by a processor to: receive a resource grant identifying hierarchical modulation resources, the hierarchical modulation resources comprising a base modulation layer and an enhancement modulation layer, the base modulation layer having a lower error rate threshold than the enhancement modulation layer; identify first content for transmission on the base modulation layer; identify second content for transmission on the enhancement modulation layer; superposition the enhancement modulation layer on the base modulation layer; and transmit the superpositioned base and enhancement modulation layers. In certain examples, the non-transitory computer-readable medium may implement one or more aspects of the third aspect of the disclosure described above.

According to a twenty-second aspect of the disclosure, a non-transitory computer-readable medium storing computer-executable code for wireless communication is described. In one configuration, the code may be executable by a processor to: determine transmission characteristic information of signals transmitted from a neighboring cell UE; and perform interference cancellation on a signal received from a serving cell base station based on the determined transmission characteristic information. In certain examples, the non-transitory computer-readable medium may implement one or more aspects of the fourth aspect of the disclosure described above.

According to an twenty-third aspect of the disclosure, a non-transitory computer-readable medium storing computer-executable code for wireless communication is described. In one configuration, the code may be executable by a processor to: determine transmission characteristic information of signals transmitted from a neighboring cell base station; determine transmission characteristic information of signals transmitted from a neighboring cell UE; and perform interference cancellation on a signal received from a serving cell UE based on the determined information. In certain examples, the non-transitory computer-readable medium may implement one or more aspects of the fifth aspect of the disclosure described above.

According to a twenty-fourth aspect of the disclosure, a non-transitory computer-readable medium storing computer-executable code for wireless communication is described. In one configuration, the code may be executable by a processor to: establish a first wireless communications channel for receiving wireless transmissions from a transmitting node; determine transmission channel information of a second wireless communications channel different from the first wireless communications channel; and perform interference mitigation on a signal received on the first wireless communications channel from the transmitting node based on the transmission channel information of the second wireless communications channel. In certain examples, the non-transitory computer-readable medium may implement one or more aspects of the sixth aspect of the disclosure described above.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
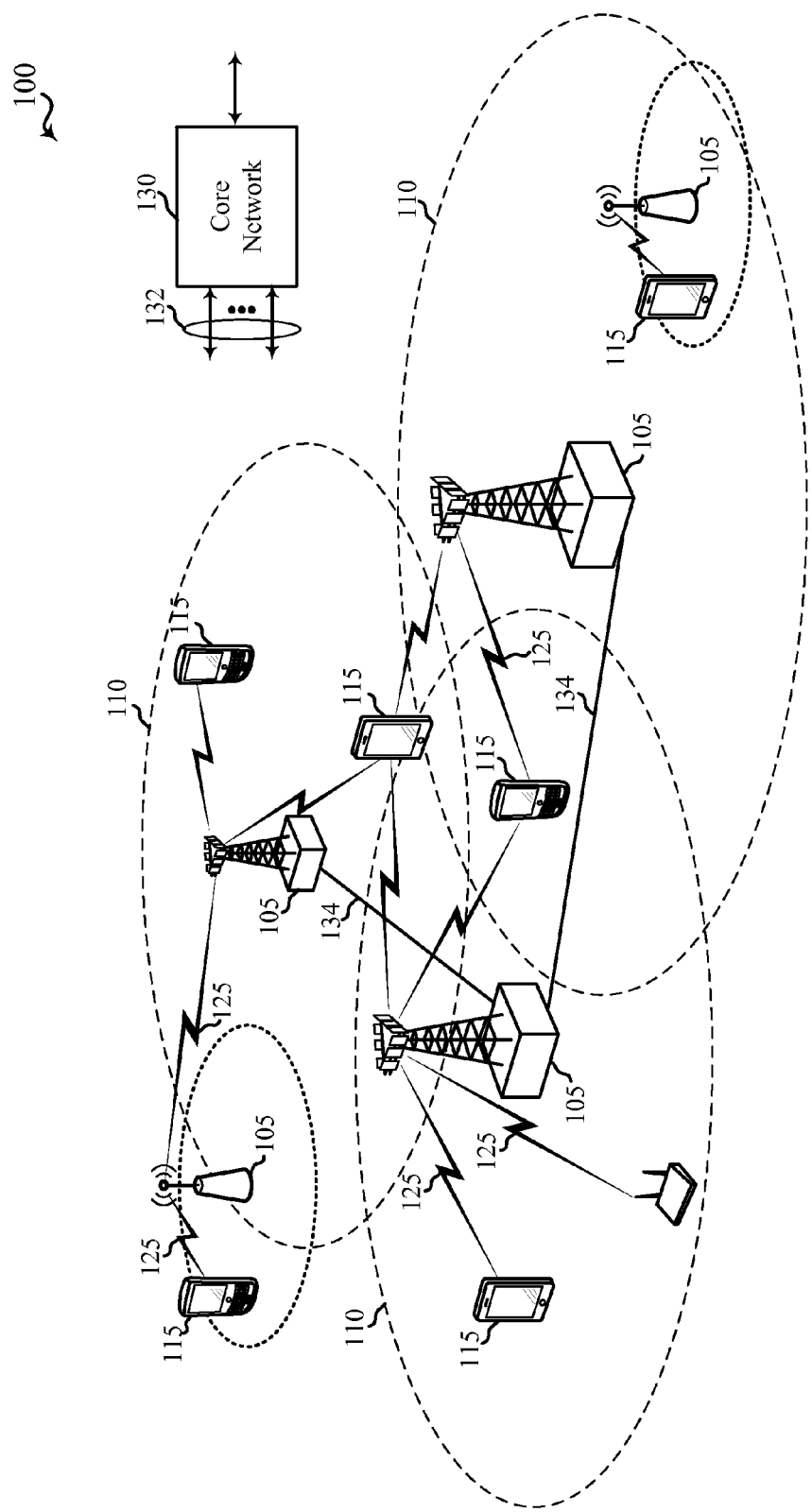
FIG. 1 is a diagram illustrating an example of a wireless communications system in accordance with various examples.

Techniques are described for interference mitigation and hierarchical modulation within a wireless communications system. A base station (e.g., an evolved Node B (eNB)) and/or a user equipment (UE) may be configured to operate within the wireless communications system and may transmit/receive wireless communications on both a base modulation layer as well as on an enhancement modulation layer that is modulated on the base modulation layer. Thus, concurrent, non-orthogonal, data streams may be provided to the same or different UEs, and each modulation layer may be used to transmit content that may be selected based on particular deployments and/or channel conditions. Various interference mitigation techniques may be implemented in examples to compensate for interfering signals received from within a cell, compensate for interfering signals received from other cells, and/or compensate for interfering signals received from other radios that may operate in adjacent wireless communications networks.

In certain examples, concurrent non-orthogonal wireless communications data streams may be provided to a UE from a base station through hierarchical modulation in which first content may be selected for transmission on a base modulation layer and different content may be selected for transmission on an enhancement modulation layer. The base modulation layer content may be modulated onto the base modulation layer, and then the enhancement layer content may be modulated onto the enhancement modulation layer. The enhancement modulation may be superpositioned on the base modulation layer and transmitted to one or more UE(s). In various examples, a UE may transmit multiple hierarchical layers to a base station, in a similar manner.

A UE receiving both the base modulation layer and the enhancement modulation layer may decode content received on the base modulation layer, and then perform interference cancellation to cancel the signal of the base modulation layer. The UE may then decode content received on the enhancement modulation layer.

In some examples, the base modulation layer may support transmissions having a higher likelihood of transmission success, and the base modulation layer may be used to transmit content having a relatively lower error threshold. The enhancement modulation layer, in some examples, may support transmissions having relatively lower likelihood of transmission success, and may be used for transmission of content having a relatively higher error threshold.

According to various examples, UEs and base stations may perform interference mitigation on received signals. Such interference mitigation may be performed on signals generated from within the serving cell associated with the UEs and base stations (intra-cell interference), from neighboring cells of the serving call (inter-cell interference), and/or on signals from adjacent communications channels (inter radio interference).

The techniques described herein are not limited to Long Term Evolution (LTE), and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The wireless communications system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro and/or small cell base stations). There may be overlapping coverage areas for different technologies.

In some examples, the wireless communications system 100 is an LTE/LTE-A network that supports hierarchical modulation and interference cancellation modes of operation. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A small cell would generally cover a relatively smaller geographic area and may allow unrestricted access by UEs with service subscriptions with the network provider and/or restricted access by UEs having an association with the small cell (e.g., UEs in a closed subscriber group (CSG), UEs for users in the home, and the like). An eNB for a macro cell may be referred to as a macro eNB. An eNB for a small cell may be referred to as a small cell eNB, as a femto eNB or a home eNB. An eNB may support one or multiple (e.g., two, three, four, and the like) cells.

The core network 130 may communicate with the eNBs 105 via a backhaul link 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in the wireless communications system 100 may include uplink (UL) transmissions from a mobile device 115 to a base station 105, and/or downlink (DL) transmissions, from a base station 105 to a mobile device 115. The DL transmissions may also be called forward link transmissions while the UL transmissions may also be called reverse link transmissions. According to various examples, one or both of the UL and DL transmissions may include multiple hierarchical modulation layers, in which one or more enhancement modulation layers may be superpositioned onto a base modulation layer. The base modulation layer may be decoded to obtain content modulated on the base modulation layer. The enhancement modulation layer(s) may be decoded by cancelling the base modulation layer (and other lower modulation layers if present) and decoding the resultant signal.

In some examples of the wireless communications system 100, various interference cancellation techniques may be employed including intra-cell interference cancellation, inter-cell interference cancellation, and inter-radio interference cancellation. Base stations 105 as well as UEs 115 may support one or more of these or similar modes of operation. OFDMA communications signals may be used in the communication links 125 for LTE downlink transmissions in an unlicensed spectrum, while SC-FDMA communications signals may be used in the communication links 125 for LTE uplink transmissions. The interference cancellation may be performed on the uplink and downlink. Inter-radio interference may be addressed by base stations 105 as well as UEs 115. Additional details regarding the implementation of hierarchical modulation and/or interference cancellation in a system such as the wireless communications system 100, as well as other features and functions related to the operation of such a system, are provided below with reference to FIGS. 2-46.

Figure 2:
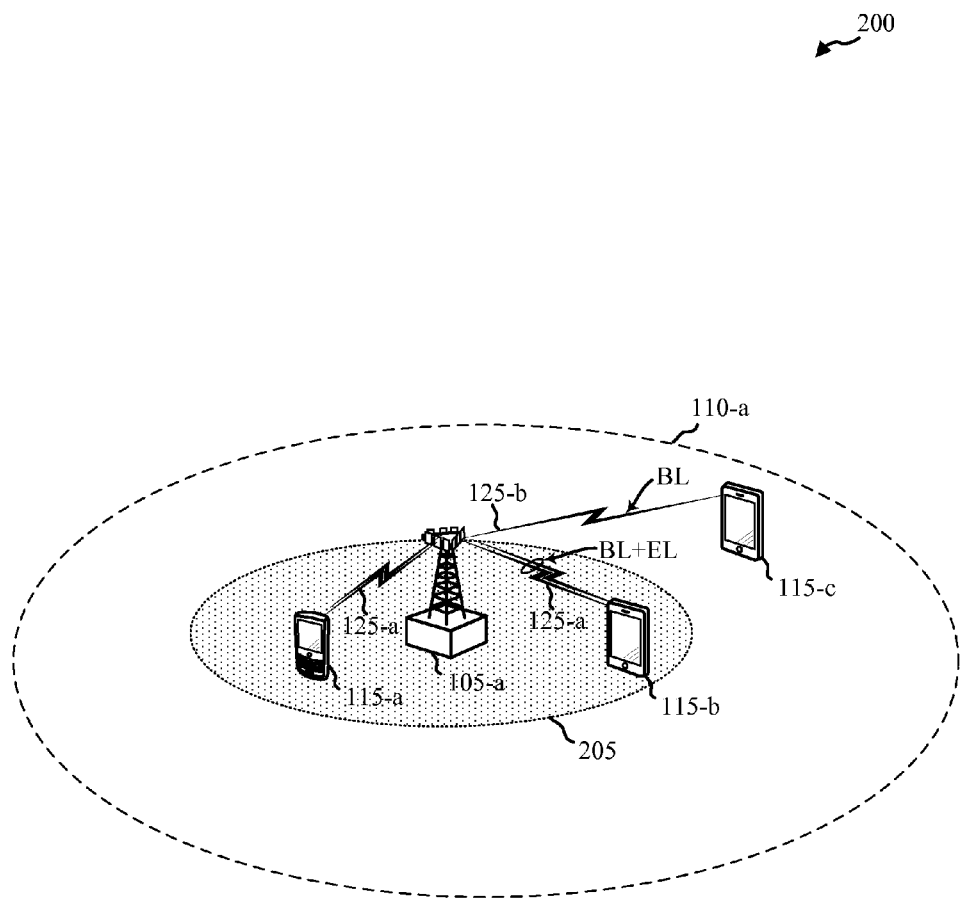
FIG. 2 illustrates a hierarchical modulation and interference cancellation environment in accordance with various examples.

FIG. 2 illustrates a wireless communications system 200 in which an eNB 105-a may communicate with one or more UEs 115 using hierarchical modulation. The wireless communications system 200 may illustrate, for example, aspects of wireless communications system 100 illustrated in FIG. 1. In the example of FIG. 2, an eNB 105-a may communicate with a number of UEs 115-a, 115-b, and 115-c within a coverage area 110-*a* of the eNB 105-*a*. In this example, multiple modulation layers may be employed for wireless communications, in which a base modulation layer and one or more enhancement modulation layers may be concurrently transmitted between the eNB 105-*a* and the UEs 115. The base modulation layer, according to various examples, may provide higher reliability communications between the eNB 105-*a* and UEs 115, resulting in a higher likelihood that the UEs 115 within the coverage area 110-*a* will be able to decode content transmitted on the base modulation layer without requiring retransmissions of the content. The enhancement modulation layer, according to various examples, may provide relatively lower reliability communications between the eNB 105-*a* and UEs 115 as compared to the base modulation layer. As such, transmissions on the enhancement modulation layer may have a higher likelihood of requiring retransmissions in order for a receiver to successfully decode the content transmitted on the enhancement modulation layer. Modulation and transmission of the base modulation layer and enhancement modulation layer will be described in more detail below with respect to FIGS. 5 and 6.

As mentioned, the enhancement modulation layer may have a lower likelihood of successful reception relative to the base modulation layer, with the likelihood of successful reception largely dependent upon channel conditions between the eNB 105-*a* and UEs 115. In some deployments, such as illustrated in FIG. 2, UEs 115-*a* and 115-*b* may be located relatively close to eNB 105-*a* in area 205, while UE 115-*c* may be located closer to a cell edge of the eNB 105-*a* coverage area 110-*a*. If it is determined that UEs 115-*a* and 115-*b* located in area 205 have channel conditions conducive to hierarchical modulation, eNB 105-*a* may signal to the UEs 115-*a* and 115-*b* that such communications may be employed. In such cases, communication links 125-*a* may include both a base modulation layer and an enhancement modulation layer, and UEs 115-*a* and 115-*b* may support communications on each of the hierarchical modulation layers. In this example, UE 115-*c*, located closer to the cell edge of coverage area 110-*a*, and outside of area 205, may be signaled to communicate using the base modulation layer in communication link 125-*b*. While the communication link 125-*b* may still be transmitted with both the base modulation layer and the enhancement modulation layer, UE 115-*c* may not attempt to decode the enhancement modulation layer due to the relatively low likelihood of successful reception and decoding of content modulated on the enhancement modulation layer.

The base modulation layer, as mentioned above, in such deployments may provide a relatively high reliability communications link between the UEs 115 and eNB 105-*a*. According to some examples, the content transmitted using the base modulation layer may be selected to be content that is more desirable to transmit at lower error rates, and the content transmitted using the enhancement modulation layer may be selected to be content that is not as sensitive to transmission error rates. For example, the base modulation layer may be used to transmit high priority or latency sensitive content. In some examples, the base modulation layer may include control information, such as uplink or downlink grant information, acknowledgment information for prior transmissions, and/or other control signaling, in addition to user data. The enhancement modulation layer, in such examples, may be used to transmit user data that has lower sensitivity to transmission errors.

In other examples, the base modulation layer may include unicast data for a particular UE 115 that is latency sensitive, and the enhancement modulation layer may include unicast data that is latency insensitive. Determination of unicast data that is to be sent using the base versus enhancement modulation layer may be made, for example, according to a quality of service (QoS) associated with different unicast data. For example, data having a high QoS requirement may be transmitted using the base modulation layer, and data having a best effort QoS requirement may be transmitted using the enhancement modulation layer. In still further examples, the base modulation layer may be used to transmit broadcast data from eNB 105-*a*, and the enhancement modulation layer may be used to transmit unicast data associated with a particular UE 115.

In some examples, the base modulation layer may transmitted without any requirement for acknowledgment of receipt of the transmitted data. For example, base modulation layer content may be transmitted without requiring hybrid automatic repeat request (HARD) acknowledgment/negative-acknowledgment of receipt of the content. In some examples, the error rate associated with the base modulation layer may be approximately 1%, and the error rate associated with the enhancement modulation layer may be higher than 1%, such as 10%. Thus, successful receipt of content transmitted using the enhancement modulation layer may require reliance on retransmission procedures, while the error rate associated with the base modulation layer may provide confidence that retransmissions are not required to achieve successful transmission of content.

In situations where successful reception of the enhancement modulation layer is less likely, such as for UE 115-*c*, communications between UE 115-*c* and eNB 105-*a* may be conducted using the base modulation layer alone. Thus, communications with different UEs 115 may be selectively adapted based on channel conditions, with UEs 115 having suitable channel conditions being signaled to receive data on multiple hierarchical modulation layers that are concurrently transmitted, thus enhancing data rates to such UEs 115. Likewise, communications with UEs 115 having relatively poorer channel conditions may be maintained at a reliably maintained data rate through the base modulation layer. In some examples, the base modulation layer may be used to transmit one or more of a UE reference signal-based physical downlink control channel (PDCCH or ePDCCH), a physical downlink shared channel (PDSCH), a physical multicast channel (PMCH), or high priority data. In examples, the enhancement modulation layer may be used to transmit one or more of a UE reference signal-based PDSCH or ePDSCH, or lower priority data. Similarly as discussed above, the determination of high priority data and low priority data may be made based on a QoS parameter associated with the data.

Figure 3:
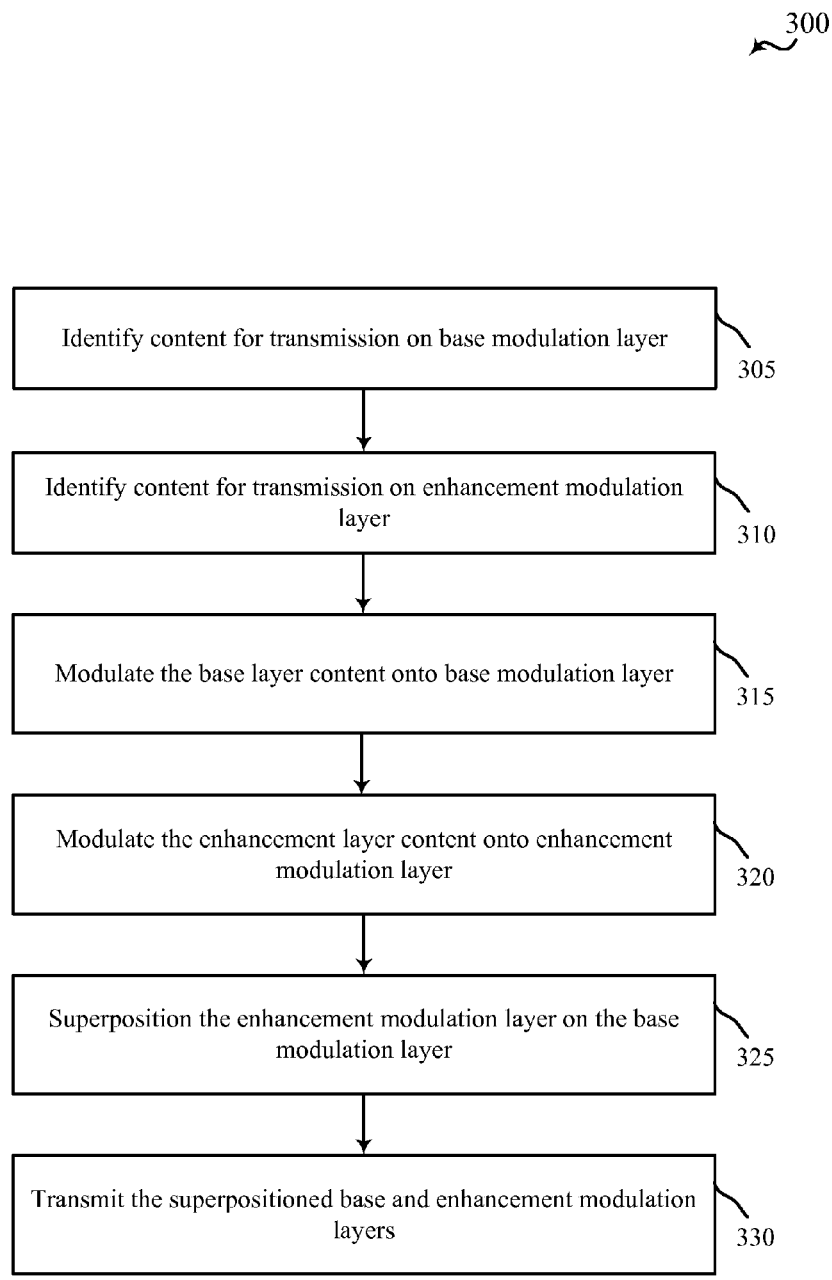
FIG. 3 is a flowchart of a method for hierarchical modulation of content in a base station according to various examples.

With reference now to FIG. 3, a flowchart conceptually illustrating an example of a method for wireless communication is described in accordance with aspects of the present disclosure. For clarity, the method 300 is described below with reference to ones of the base stations, eNBs 105 and/or UEs 115 described with reference to FIGS. 1 and/or 2. In one example, an eNB or UE may execute one or more sets of codes to control the functional elements of the eNB or UE to perform the functions described below.

At block 305, content is identified for transmission on a base modulation layer. For example, an eNB may identify high priority content or latency sensitive content, similarly as discussed above. Also, as mentioned above, an eNB may identify unicast content for a UE that is to be transmitted to the UE based on whether the UE is capable of reliably receiving one or more enhancement modulation layers, and content for transmission on the base modulation layer may be identified according to such a determination. In some examples, a UE may identify content to be transmitted to an eNB on the base modulation layer based on similar criteria. In some examples, a UE may receive signaling from an eNB indicating that certain content is to be transmitted on the base modulation layer.

At block 310, content is identified for transmission on an enhancement modulation layer. For example, an eNB may identify lower priority content or latency insensitive content, similarly as discussed above. Also, as mentioned above, an eNB may identify unicast content for a UE that is to be transmitted to the UE based on whether the UE is capable of reliably receiving the enhancement modulation layer, and content for transmission on the enhancement modulation layer may be identified according to such a determination. A UE, in examples, may identify content to be transmitted to the eNB on the enhancement modulation layer based on similar criteria, and/or may receive signaling from the eNB indicating that certain content is to be transmitted on the enhancement modulation layer.

At block 315, the base layer content is modulated onto the base modulation layer. Such modulation may be, for example, binary phase shift keying (BPSK) modulation, quadrature phase shift keying (QPSK), or 16 quadrature amplitude modulation (16 QAM) modulation, to name but three examples. At block 320, the enhancement layer content is modulated onto the enhancement modulation layer. Similarly as with the base modulation layer modulation, such modulation may be binary phase shift keying (BPSK) modulation, quadrature phase shift keying (QPSK), or 16 quadrature amplitude modulation (16 QAM) modulation, to name but three examples.

At block 325, the enhancement modulation layer is superpositioned on the base modulation layer. Such superpositioning results in superpositioned constituent constellations according to the modulation used at each of the base modulation layer and the enhancement modulation layer. In examples where the base modulation layer uses QPSK and the enhancement modulation layer uses QPSK, the resultant is a shaped 16 QAM. In examples where the base modulation layer uses QPSK and the enhancement modulation layer uses 16 QAM, the resultant is a shaped 64 QAM constellation. Further, in examples where the base modulation layer uses 16 QAM and the enhancement modulation layer uses 16 QAM, the resultant is a shaped 256 QAM constellation. Finally, at block 330, the superpositioned base and enhancement modulation layers are transmitted. As mentioned above, a receiver, such as a UE or eNB receiving the transmitted signal, may decode the received signal to obtain the base modulation layer content, cancel interference associated with the base modulation layer to obtain the enhancement modulation layer, and decode the enhancement modulation layer to obtain the enhancement modulation layer content.

Figure 4:
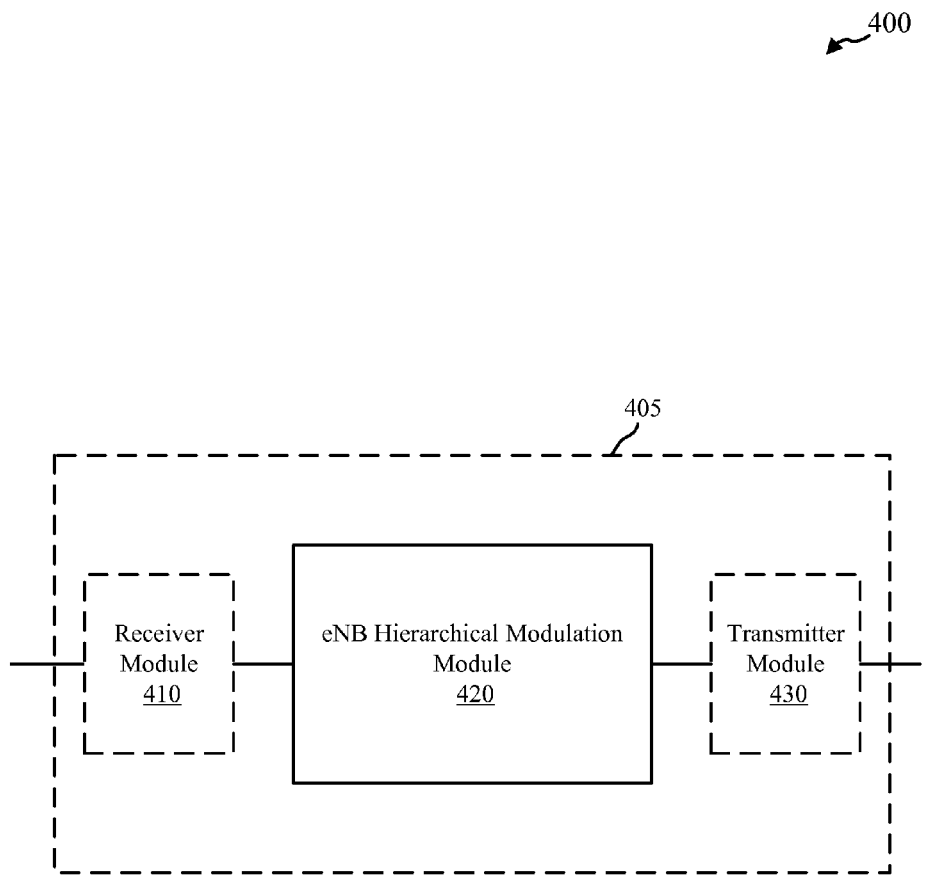
FIG. 4 shows a block diagram of a device that may be used for hierarchical modulation in accordance with various examples.

FIG. 4 is a block diagram conceptually illustrating a device, such as an eNB, for use in wireless communications in accordance with aspects of the present disclosure. In some examples, the device 405 may be an example of one or more aspects of the base stations or eNBs 105 described with reference to FIGS. 1 and/or 2. The device 405 may also be a processor. The device 405 may include a receiver module 410, an eNB hierarchical modulation module 420, and/or a transmitter module 430. Each of these components may be in communication with each other.

The components of the device 405 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 410 may be or include a radio frequency (RF) receiver, such as an RF receiver operable to receive transmissions on two or more hierarchical modulation layers. The receiver module 410 may be used to receive various types of data and/or control signals (i.e., transmissions) over one or more communication links of a wireless communications system, such as one or more communication links 125 of the wireless communications systems 100 and/or 200 described with reference to FIGS. 1 and/or 2.

In some examples, the transmitter module 430 may be or include an RF transmitter, such as an RF transmitter operable to transmit on two or more hierarchical modulation layers (e.g., through a base modulation layer and one or more enhancement modulation layers). The transmitter module 430 may be used to transmit various types of data and/or control signals (i.e., transmissions) over one or more communication links of a wireless communications system, such as one or more communication links 125 of the wireless communications systems 100 and/or 200 described with reference to FIGS. 1 and/or 2.

In some examples, the eNB hierarchical modulation module 420 may configure multiple hierarchical modulation layers and determine content to be transmitted on each hierarchical modulation layer for device 405 when operating in a wireless communications system supporting transmissions on two or more hierarchical modulation layers. The eNB hierarchical modulation module 420 may, for example, configure device 405 to determine content for transmission on each hierarchical modulation layer, modulation of the content on each hierarchical modulation layer, and superpositioning of the hierarchical modulation layers for transmission through transmitted module 430, such as described above with respect to FIGS. 1-3, for example, and as will be described below for various examples in FIGS. 5-46.

In certain examples, the eNB hierarchical modulation module 420 may receive signals from receiver module 410 that include multiple hierarchical modulation layers. In such cases, the eNB hierarchical modulation module 420 may decode the base modulation layer, cancel interference from the base modulation layer from the received signal, and decode the resultant signal to obtain content form an enhancement modulation layer. In some examples, two or more enhancement modulation layers may be present, in which case the eNB hierarchical modulation module 420 may perform successive interference cancellation and decoding of each successive modulation layer. Furthermore, eNB hierarchical modulation module 420 may, in various examples, determine one or more parameters associated with each hierarchical modulation layer, and may provide signaling to one or more UEs that are to transmit and/or receive transmissions on multiple hierarchical modulation layers, such as described above with respect to FIGS. 1-3, for example, and as will be described below for various examples in FIGS. 5-46.

Figure 5:
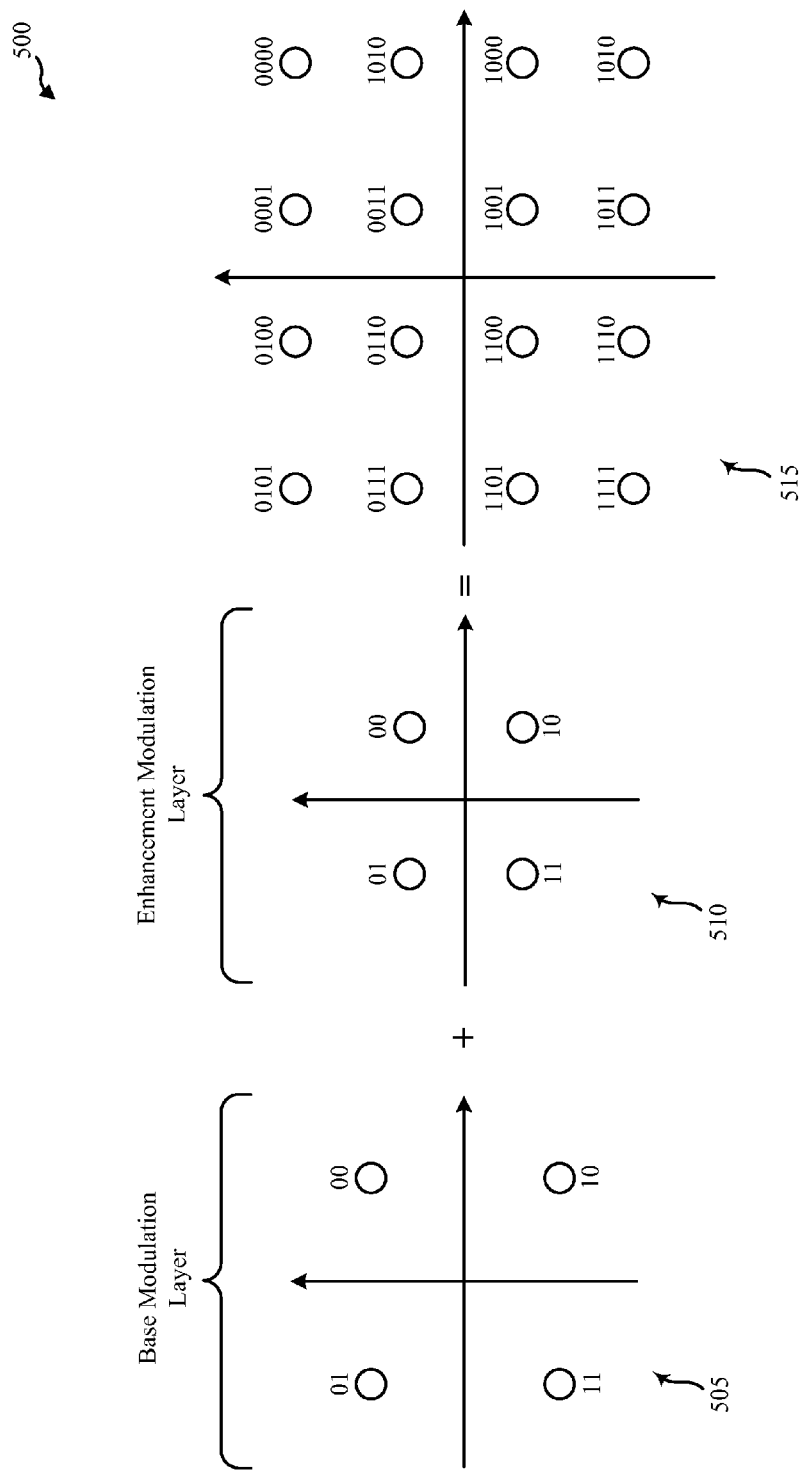
FIG. 5 is an illustration of modulation schemes for a base layer, enhancement layer, and resulting transmission, in accordance with various examples.

As discussed above, in various examples a transmission from a UE, eNB, or other device, such as UEs 115, eNBs 105, and/or device 405 of FIGS. 1, 2, and/or 4, may include multiple hierarchical modulation layers. FIG. 5 illustrates an example 500 of hierarchical modulation layers and a resultant transmission from superimposed hierarchical modulation layers. In this example, a high QoS base modulation layer 505 may use QPSK encoding and be represented as $\{\alpha X_B : X_B \in C_B\}$. Similarly a lower QoS enhancement modulation layer 510 may use QPSK encoding and be represented as $\{\beta X_E : X_E \in C_E\}$. The resultant hierarchical constellation 515 formed from a superimposition of the constituent base modulation layer constellation 505 and enhancement layer constellation 510 may be a shaped 16 QAM constellation represented as $C = \{X = \alpha X_B + \beta X_E\}$. It will be understood that different modulation schemes may be used for the base modulation layer and/or the enhancement modulation layer, with corresponding changes to the hierarchical constellation. For example, the base modulation layer may use QPSK and the enhancement modulation layer may use 16 QAM, thus resulting in a shaped 64 QAM hierarchical constellation. In other examples, the base modulation layer may use 16 QAM and the enhancement modulation layer may use 16 QAM, thus resulting in a shaped 256 QAM hierarchical constellation. Furthermore, additional enhancement modulation layers may be superimposed on the hierarchical constellation to provide three or more hierarchical modulation layers, in a similar manner.

Figure 6:
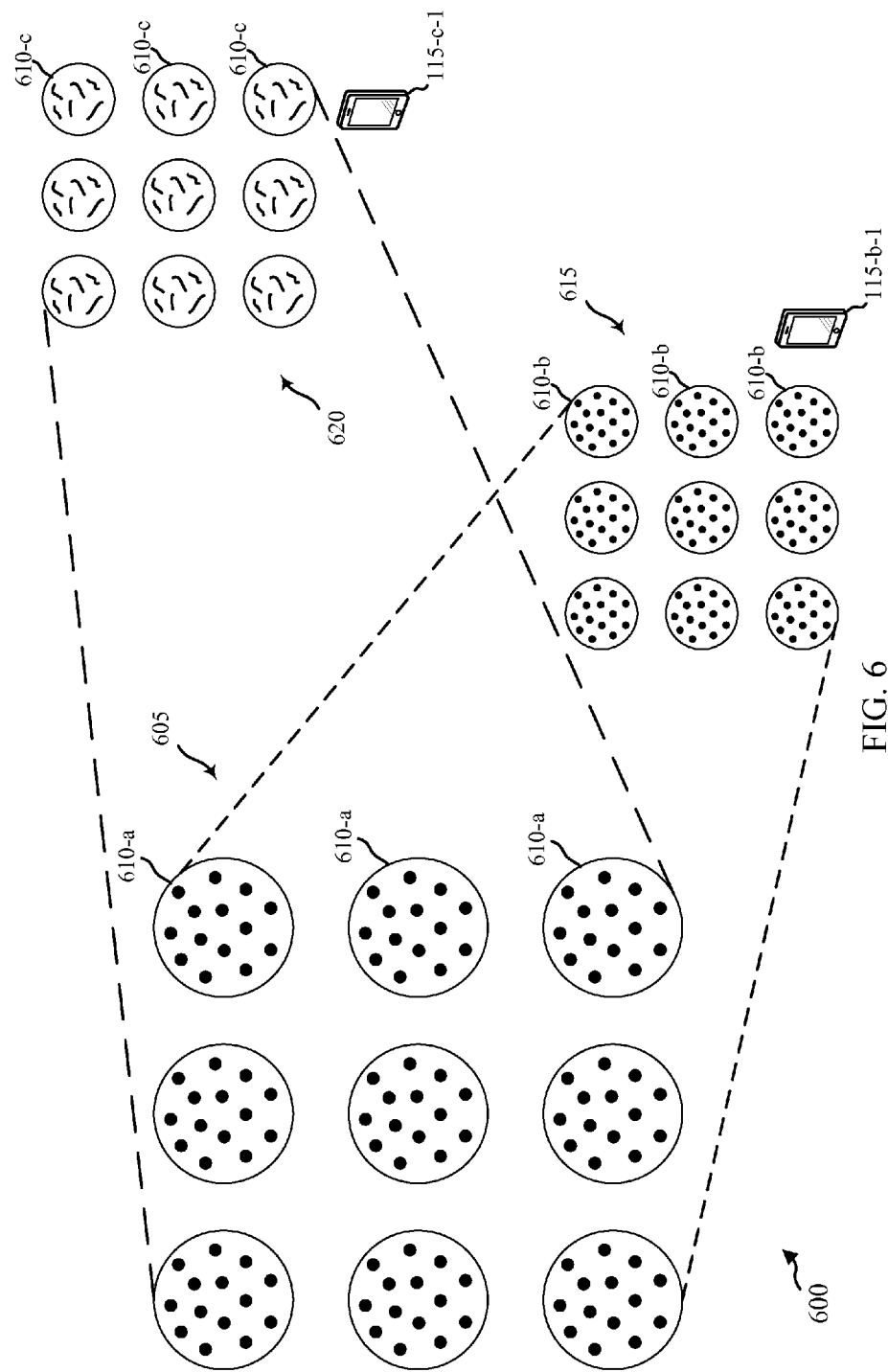
FIG. 6 is an illustration of a hierarchical modulation scheme and likelihood of successfully decoding the enhancement layer at different user equipments (UEs) that may be served by an evolved NodeB (eNB)

As mentioned, the base modulation layer may be used to provide a high QoS data stream between a UE and an eNB, and the enhancement modulation layer may be used to provide a lower QoS data stream between a UE and an eNB. In some situations, as noted above, channel conditions between a UE and an eNB may not support transmission and decoding of the enhancement modulation layer, and communications with a UE having such channel conditions may be performed using the base modulation layer. FIG. 6 illustrates an example 600 of different UEs 115 that may receive a hierarchical modulation signal 605. Within the signal 605 are a number of clusters 610 representing the base modulation layer, and within each cluster 610 may be a number of individual points that represent the hierarchical modulation layer. A first UE 115-b-1 may have relatively good channel conditions, and may receive the hierarchical modulation signal 605 as received signal 615. Within the received signal 615, the first UE 115-b-1 may be able to distinguish both the clusters 610-b as well as the individual points within each cluster 610-b. Thus, the first UE 115-b-1, for example, may be within area 205 as illustrated in FIG. 2.

A second UE 115-c-1 in this example may be closer to the cell edge of a serving cell that transmits the hierarchical modulation signal 605, and may have relatively poor channel quality, resulting in a received signal 620 in which the clusters 610-c may be distinguished, but not the individual points. Thus, the second UE 115-c-1 may reliably receive and decode the base modulation layer, but not the enhancement modulation layer. In some examples, a serving cell eNB may transmit data to the second UE 115-c-1 using the base modulation layer, and may transmit data to the first UE 115-b-1 using the enhancement modulation layer. In other examples, such as discussed above, the base modulation layer may be used to transmit low latency data, high priority data, control data, etc., and the enhancement modulation layer may be used to transmit latency insensitive data, lower priority data, user data, etc.

A log likelihood ratio (LLR) for the base modulation layer may be computed, according to some examples, according to the following computation:

$$LLR_{B,k} = \frac{\sum_{x \in C: b_B(k)=1} f(y/H, x)}{\sum_{x \in C: b_B(k)=0} f(y/H, x)}$$

where $LLR_{B,k}$ is the base modulation layer LLR for bit k, $b_B(k)$ is base modulation layer bit k of symbol x, and C is the constellation of the modulation scheme of the base modulation layer.

The enhanced modulation layer may be decoded, in some examples, using parallel decoding or using serial decoding with interference cancellation performed on the base modulation layer. In examples using parallel decoding, grey mapping may be used and a LLR may be computed according to the following computation:

$$LLR_{E,k} = \frac{\sum_{x \in C: b_E(k)=1} f(y/H, x)}{\sum_{x \in C: b_E(k)=0} f(y/H, x)}$$

where $LLR_{E,k}$ is the enhancement modulation layer LLR for bit k, $b_E(k)$ is enhancement modulation layer bit k of symbol x, and C is the constellation of the shaped modulation scheme of the superimposed base and enhancement modulation layers.

In examples that use serial decoding with interference cancellation performed on the base modulation layer, a LLR may be computed according to the following computation:

$$LLR_{E,k} = \frac{\sum_{x_E \in C_E: b_E(k)=1} f(y_E/H, x_E)}{\sum_{x_E \in C_E: b_E(k)=0} f(y_E/H, x_E)}$$

where $LLR_{E,k}$ is the enhancement modulation layer LLR for bit k, $b_E(k)$ is enhancement modulation layer bit k of symbol x, and C is the constellation of the enhancement layer modulation scheme, and $y_E$ is the reconstructed enhancement modulation layer following interference cancellation of the combined base modulation layer and enhancement modulation layer signal.

Figure 7:
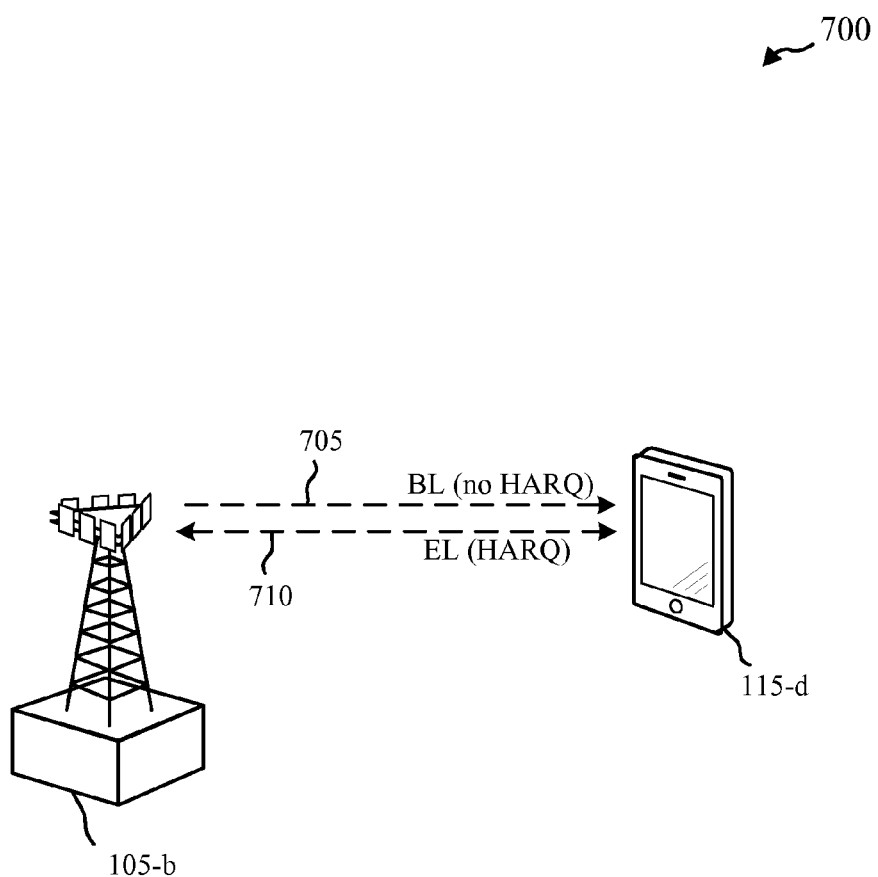
FIG. 7 illustrates a hierarchical modulation environment in accordance with various examples.

As discussed above, the base modulation layer and the enhancement modulation layer may be used to transmit different content based on one or more of a number of different factors. Such factors may include, for example, system deployment, traffic needs, the type of information contained in the content that is to be transmitted, channel conditions, a number of UEs that are capable of receiving multiple modulation layers, and/or a number of UEs that are capable of receiving only the base modulation layer, to name but a few. FIG. 7 illustrates a wireless communications system 700 in which an eNB 105-b may communicate with UE 115-d using hierarchical modulation. While only one UE 115-d is illustrated, it will be readily recognized that eNB 105-b may be in communication with multiple UEs. The wireless communications system 700 may illustrate, for example, aspects of wireless communications systems 100 and/or 200 illustrated in FIGS. 1 and/or 2. In this example, multiple modulation layers may be employed for wireless communications, in which a base modulation layer 705 and an enhancement modulation layer 710 may be concurrently transmitted between the eNB 105-*b* and the UE 115-*d*. While a single enhancement modulation layer 710 is illustrated in FIG. 7, other examples may include more than one enhancement modulation layer. The enhancement modulation layer 710 may be superpositioned on the base modulation layer 705 and transmitted in a single communications link between eNB 105-*b* to UE 115-*d*, in a manner such as described above with respect to FIGS. 3-6.

The base modulation layer 705, according to this example, may provide higher reliability communications between the eNB 105-*b* and UEs 115-*d*, resulting in a relatively high confidence that UE 115-*d* may successfully receive and decode the base modulation layer 705. In this example, the UE 115-*d* does not transmit an acknowledgment (ACK) or negative acknowledgment (NACK) of receipt of transmissions on the base modulation layer, such as according to HARQ techniques. Removal of such feedback may enhance capacity on the base modulation layer due to less overhead associated with HARQ ACK/NACK transmissions and associated retransmissions. Due to the relatively high reliability of the base modulation layer 705, content may be selected for transmission on the base modulation layer that may benefit from the high reliability and reduced latency of base modulation layer 705 transmissions. For example, as discussed above, the base modulation layer 705 may be selected to communicate high priority content, latency sensitive content, and/or control/signaling information from the eNB 105-*b* to UE 115-*d*.

The enhancement modulation layer 710, according to various examples, may provide relatively lower reliability communications between the eNB 105-*b* and UE 115-*d* as compared to the base modulation layer 705. As such, UE 115-*d* may perform HARQ techniques on transmissions of the enhancement modulation layer 710, such that transmissions that are not successfully received and decoded may be retransmitted by the eNB 105-*b*. According to some examples, the base modulation layer 705 may have an error rate of approximately 1%, and the enhancement modulation layer 710 may have an error rate of approximately 10%. As mentioned above, in some examples the eNB 105-*b* may identify first content for transmission on the base modulation layer 705.

In some examples, the first content may be associated with a first error rate threshold that defines an error rate in an initial transmission that is required or desired for the first content. The first error rate threshold may be determined based on, for example a type of information contained in the first content. The eNB 105-*b* may also identify second content for transmission on the enhancement modulation layer 710. In some examples, the second content may be associated with a second error rate threshold that is higher than the first error rate threshold. The second error rate threshold may be determined, for example, based on the type of information contained in the second content. For example, the first content may include high priority content and the second content may include lower priority content. As used herein, the term "error rate threshold" may include a target or desired reliability threshold, or may include another reliability or error rate metric associated with data.

In other examples, the first content may include control information that may be used by the UE 115-*d* for communications with the eNB 105-*b*. For example, the control information may include scheduling grant information, acknowledgment information, and/or signaling information, and the control information may be transmitted using a (PDCCH on the base modulation layer 705. The second content may include, for example, user data that may be transmitted using a PDSCH on the enhancement modulation layer 710. In still other examples, the first content may include latency sensitive unicast data for the UE 115-*d*, and the second content may include best effort unicast data for UE 115-*d*, or for a different UE. The latency sensitive unicast data may be transmitted, for example, using a PDSCH on the base modulation layer 705 and the best effort unicast data may be transmitted using a PDSCH on the enhancement modulation layer 710.

Similarly as discussed above with respect to FIGS. 3-6, the eNB 105-*b* may modulate the first content on the base modulation layer 705, and modulate the second content on the enhancement modulation layer 710. The eNB 105-*b* may then superposition the enhancement modulation layer 710 on the base modulation layer 705 and transmit the superpositioned base and enhancement modulation layers 705 and 710 to UE 115-*d*. Thus, in this example, the base modulation layer 705 and the enhancement modulation layer 710 both include content that is transmitted to a same UE, namely UE 115-*d*. In other examples, the content of the base modulation layer 705 may be transmitted to a UE different from a UE to which the content of the enhancement modulation layer 710 is transmitted. UE 115-*d* (and other UEs operating in system 700) may receive control signaling from the eNB 105-*b* indicating which of the base modulation layer 705 and enhancement modulation layer 710 are to be decoded for a particular time period (e.g., one or more subframes indicated in a downlink grant provided to UE 115-*d* via PDCCH).

Figure 8:
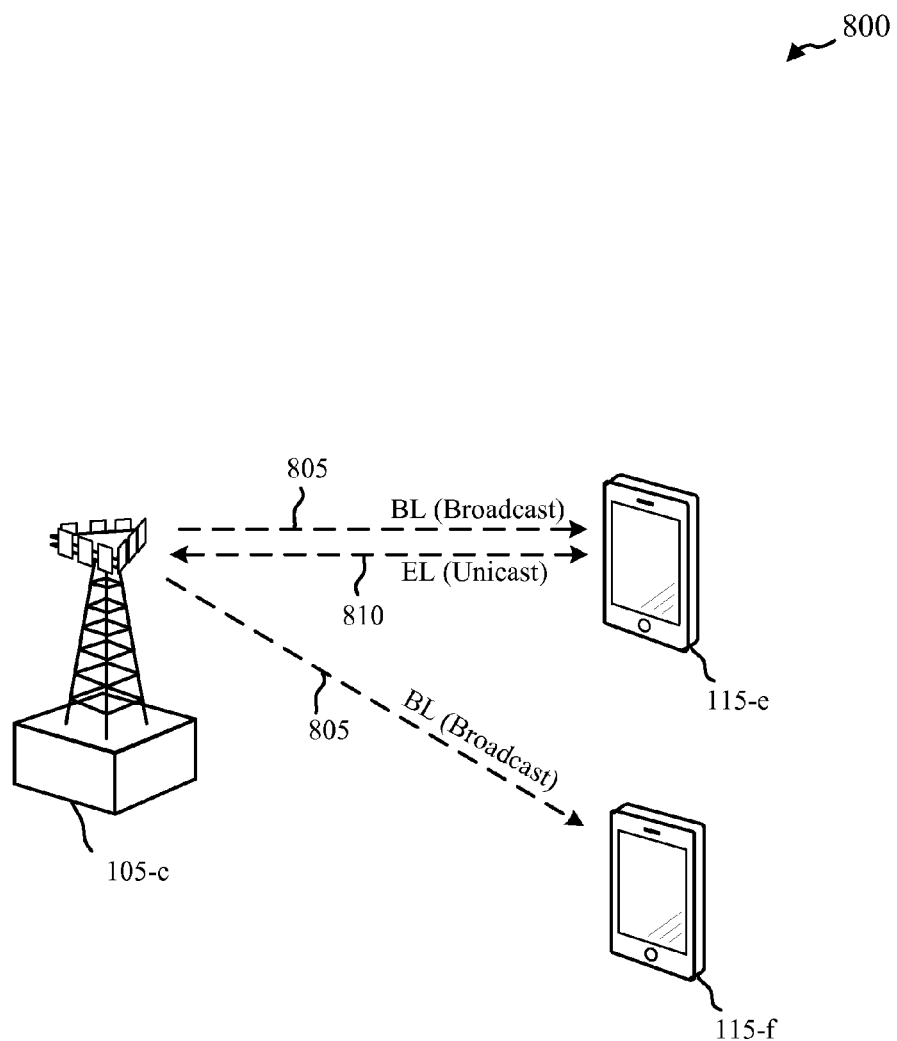
FIG. 8 illustrates another hierarchical modulation environment in accordance with various examples.

With reference now to FIG. 8 a wireless communications system 800 is illustrated in which an eNB 105-*c* may be in communication with UE 115-*e* and UE 115-*f* using hierarchical modulation. The wireless communications system 800 may illustrate, for example, aspects of wireless communications systems 100, 200 and/or 700 illustrated in FIGS. 1, 2 and/or 7. In this example, similarly as above, multiple modulation layers may be employed for wireless communications, in which a base modulation layer 805 and an enhancement modulation layer 810 may be concurrently transmitted between the eNB 105-*c* and the UEs 115-*e* and 115-*f*. In this example, base modulation layer 805 may include broadcast data that is transmitted to multiple different UEs, such as UE 115-*e* and UE 115-*f*.

The enhancement modulation layer 810, in this example, may be superpositioned on the base modulation layer 805 and include unicast data for UE 115-*e*. The enhancement modulation layer and base modulation layer may be transmitted in a single communications link between eNB 105-*c* to UE 115-*e*, in a manner such as described above with respect to FIGS. 3-6. In this example, even though UE 115-*f* may have sufficient channel quality to receive and decode the enhancement modulation layer 810, the UE 115-*f* may ignore the enhancement modulation layer 810 based on the enhancement modulation layer 810 not including content for UE 115-*f*. In some examples, the eNB 105-*c* may provide signaling to UEs 115-*e* and 115-*f* indicating that the first UE 115-*e* is scheduled to receive unicast data via the enhancement modulation layer 810. The second UE 115-*f*, having not received a downlink grant on the enhancement modulation layer 810, may thus ignore the enhancement modulation layer 810 and decode information contained in the base modulation layer 805.

In some examples, the broadcast data provided on the base modulation layer 805 may be transmitted using a physical multicast channel (PMCH), and the unicast data provided on the enhancement modulation layer 810 may be transmitted using a PDSCH. The UEs 115-*e* and 115-*f*, in certain examples, receive the broadcast data on the base modulation layer and do not transmit an acknowledgment of receipt of the broadcast data. The UE 115-*e* that receives the unicast data via the enhancement modulation layer 810, in examples, may perform HARQ techniques on the received unicast data and transmit an ACK/NACK of receipt of the unicast data.

Figure 9:
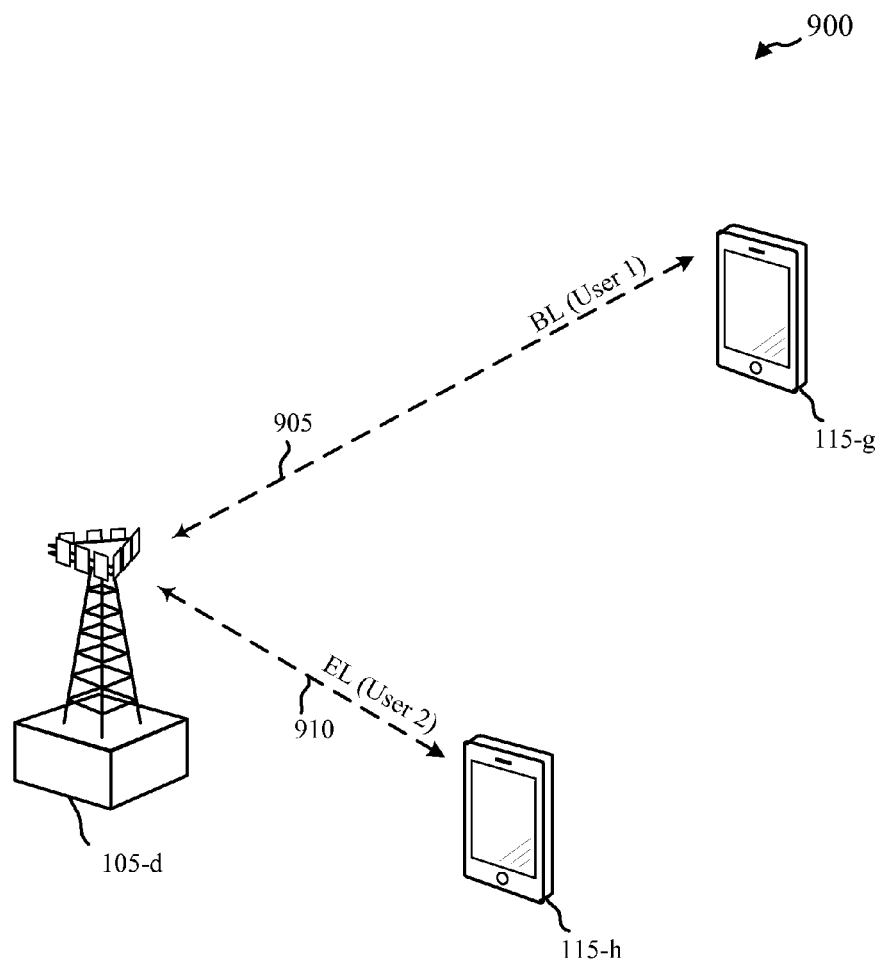
FIG. 9 illustrates another hierarchical modulation environment in accordance with various examples.

With reference now to FIG. 9 a wireless communications system 900 is illustrated in which an eNB 105-*d* may be in communication with UE 115-*g* and UE 115-*h* using hierarchical modulation. The wireless communications system 900 may illustrate, for example, aspects of wireless communications systems 100, 200, 700 and/or 800 illustrated in FIGS. 1, 2, 7 and/or 8. In this example, similarly as above, multiple modulation layers may be employed for wireless communications, in which a base modulation layer 905 and an enhancement modulation layer 910 may be concurrently transmitted between the eNB 105-*d* and the UEs 115-*g* and 115-*h*. In this example, base modulation layer 905 may include first content that includes unicast data transmitted to first UE 115-*g*, and the enhancement modulation layer 910 may be superpositioned on the base modulation layer 905 and include second content that includes unicast data for second UE 115-*h*.

The base modulation layer 905 and enhancement modulation layer 910 may be transmitted in a single communications link between eNB 105-*d* to UE 115-*g* and UE 115-*h*, in a manner such as described above with respect to FIGS. 3-6. In this example, the first UE 115-*g* may have relatively poor channel conditions that do not allow the UE 115-*g* to decode the enhancement modulation layer 910. Thus, the eNB 105-*d* may provide, for example, a downlink grant to UE 115-*g* using base modulation layer 905 that indicated unicast downlink content will be provided to UE 115-*g* using the base modulation layer 905. UE 115-*g* may simply decode the base modulation layer 905, and not perform any decoding of the enhancement modulation layer or interference cancellation to remove the base modulation layer 905 from the received transmission. The UE 115-*g*, in examples, may perform HARQ techniques on the received unicast data and transmit an ACK/NACK of receipt of the unicast data.

The second UE 115-*h*, in this example, may have relatively good channel conditions that allow the UE 115-*h* to receive and decode the enhancement modulation layer 910. The eNB 105-*d* may thus schedule the UE 115-*h* to receive downlink content using the enhancement modulation layer 910, and the UE 115-*h* may perform interference cancellation techniques on the received transmission to cancel interference from the base modulation layer 905 and decode the enhancement modulation layer 910. Thus, through use of hierarchical modulation techniques, multiple data streams may be transmitted concurrently to different UEs 115-*g* and 115-*h*, thereby enhancing utilization of the wireless communications system 900.

In some examples, the eNB 105-*d* may provide signaling to UEs 115-*g* and 115-*h* indicating that the first UE 115-*g* is scheduled to receive unicast data via the base modulation layer 905 and that the second UE 115-*h* is scheduled to receive unicast data via the enhancement modulation layer 910. In some examples, the unicast data provided to each of the UEs 115-*g* and 115-*h* may be transmitted using a PDSCH that is transmitted on the respective base modulation layer 905 or enhancement modulation layer 910. The UEs 115-*g* and 115-*h*, in certain examples, may perform HARQ techniques on the received unicast data and transmit an ACK/NACK of receipt of the unicast data.

Figure 10:
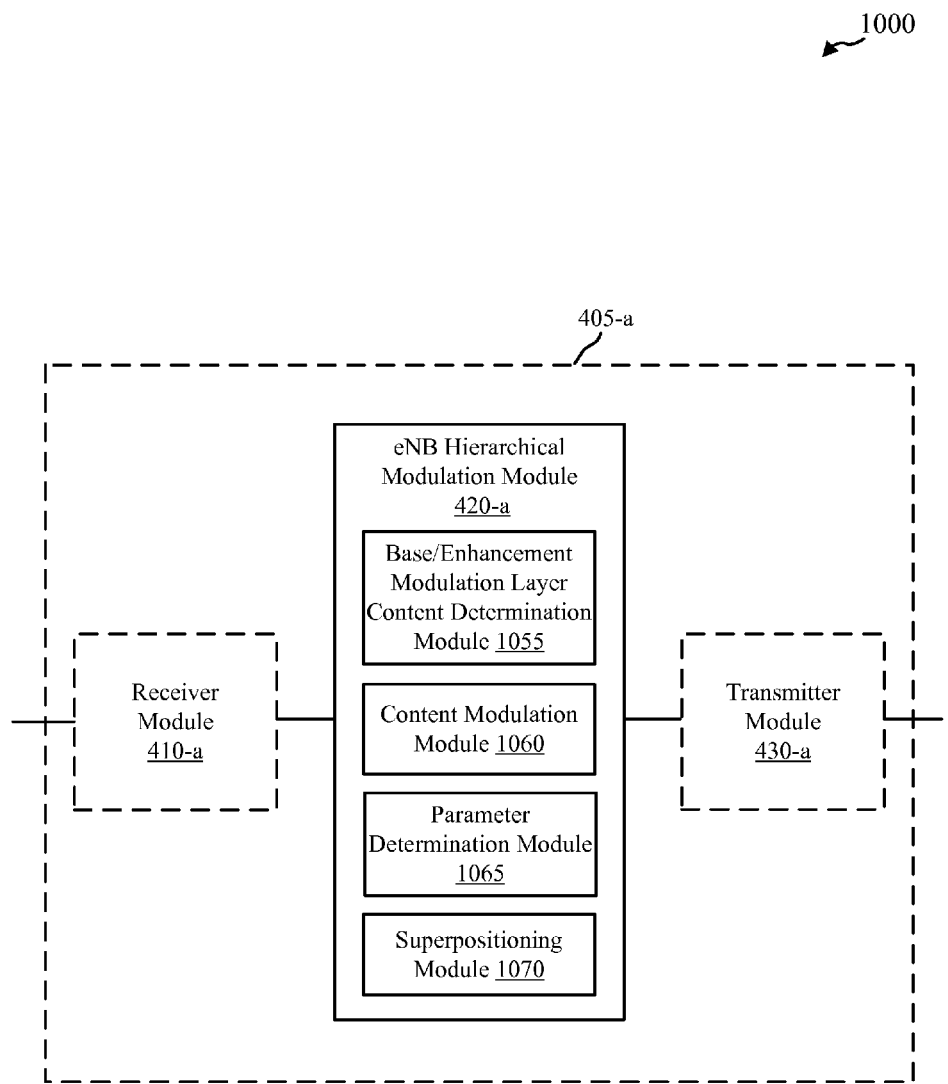
FIG. 10 shows a block diagram of a device that may be used for hierarchical modulation in accordance with various examples.

Referring now to FIG. 10, a block diagram 1000 illustrates a device 405-*a* for use in wireless communications, in accordance with various aspects of the present disclosure. In some examples, the device 405-*a* may be an example of one or more aspects of the base stations or eNBs 105 and/or device 405 described with reference to FIGS. 1, 2, 4, 7, 8 and/or 9. The device 405-*a* may also be a processor. The device 405-*a* may include a receiver module 410-*a*, an eNB hierarchical modulation module 420-*a*, and/or a transmitter module 430-*a*. Each of these components may be in communication with each other.

The components of the device 405-*a* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 410-*a* may be an example of the receiver module 410 of FIG. 4. The receiver module 410-*a* may be or include an RF receiver, such as an RF receiver operable to receive transmissions on two or more hierarchical modulation layers. In some examples, the transmitter module 430-*a* may be an example of the transmitter module 430 of FIG. 4. The transmitter module 430-*a* may be or include an RF transmitter, such as an RF transmitter operable to transmit data on two or more hierarchical modulation layers. The RF transmitter 430-*a*, in some examples, may include a single transmitter or a single transmitter per transmit/receive chain. The transmitter module 430-*a* may be used to transmit various types of data and/or control signals (i.e., transmissions) over one or more communication links of a wireless communications system including two or more hierarchical modulation layers, such as one or more communication links 125 of the wireless communications systems 100, 200, 700, 800, and/or 900 described with reference to FIGS. 1, 2, 7, 8, and/or 9.

The eNB hierarchical modulation module 420-*a* may be an example of the eNB hierarchical modulation module 420 described with reference to FIG. 4 and may include a base/enhancement modulation layer content determination module 1055, a content modulation module 1060, a parameter determination module 1060, and a superpositioning module 1070. Each of these components may be in communication with each other.

In some examples, base/enhancement modulation layer content determination module 1055 may determine content that is to be transmitted from the device 405-*a* using the base modulation layer and content that is to be transmitted from the device 405-*a* using the enhancement modulation layer, such as described above with respect to FIGS. 1-9, for example. The content modulation module 1060 may modulate the determined content onto the appropriate base modulation layer or the enhancement modulation layer. The parameter determination module 1065 may determine one or more of various parameters related to channel conditions and parameters to use in hierarchical modulation, such as a transmission energy ratio between the base modulation layer and the enhancement modulation layer.

In some examples, the parameter determination module 1065 may determine channel quality associated with a UE based on channel state information (CSI) received from the UE, and determine if the UE channel conditions support hierarchical modulation. If the channel conditions support hierarchical modulation, the parameter determination module 1065 may calculate the transmission energy ratio between the base modulation layer and enhancement modulation layer based on the CSI. In some examples, the parameter determination module 1065 may determine parameters for each of a plurality of transmission time intervals (TTIs). The parameter determination module 1065 may also, in some examples, determine a number of spatial layers available for transmission of each of the base modulation layer and enhancement modulation layer, which may be determined based on CSI and a rank indicator (RI) associated with the UE, for example.

In certain examples, the parameter determination module may determine CSI for a number of UEs and order which of the UEs is to receive one or more of the base modulation layer or the enhancement modulation layer based on the CSI for each of the UEs. For example, one or more UEs determined to have lower channel quality based on the determined CSI may receive the base modulation layer, and one or more UEs determined to have higher channel quality based on the determined CSI may receive the enhancement modulation layer or both the base modulation layer and the enhancement modulation layer, depending upon the content that is to be transmitted to the UEs. The superpositioning module 1070 may superposition the enhancement modulation layer onto the base modulation layer according to the parameters determined by the parameter determination module 1065 for transmission by transmitter module 430-*a*.

Figure 11:
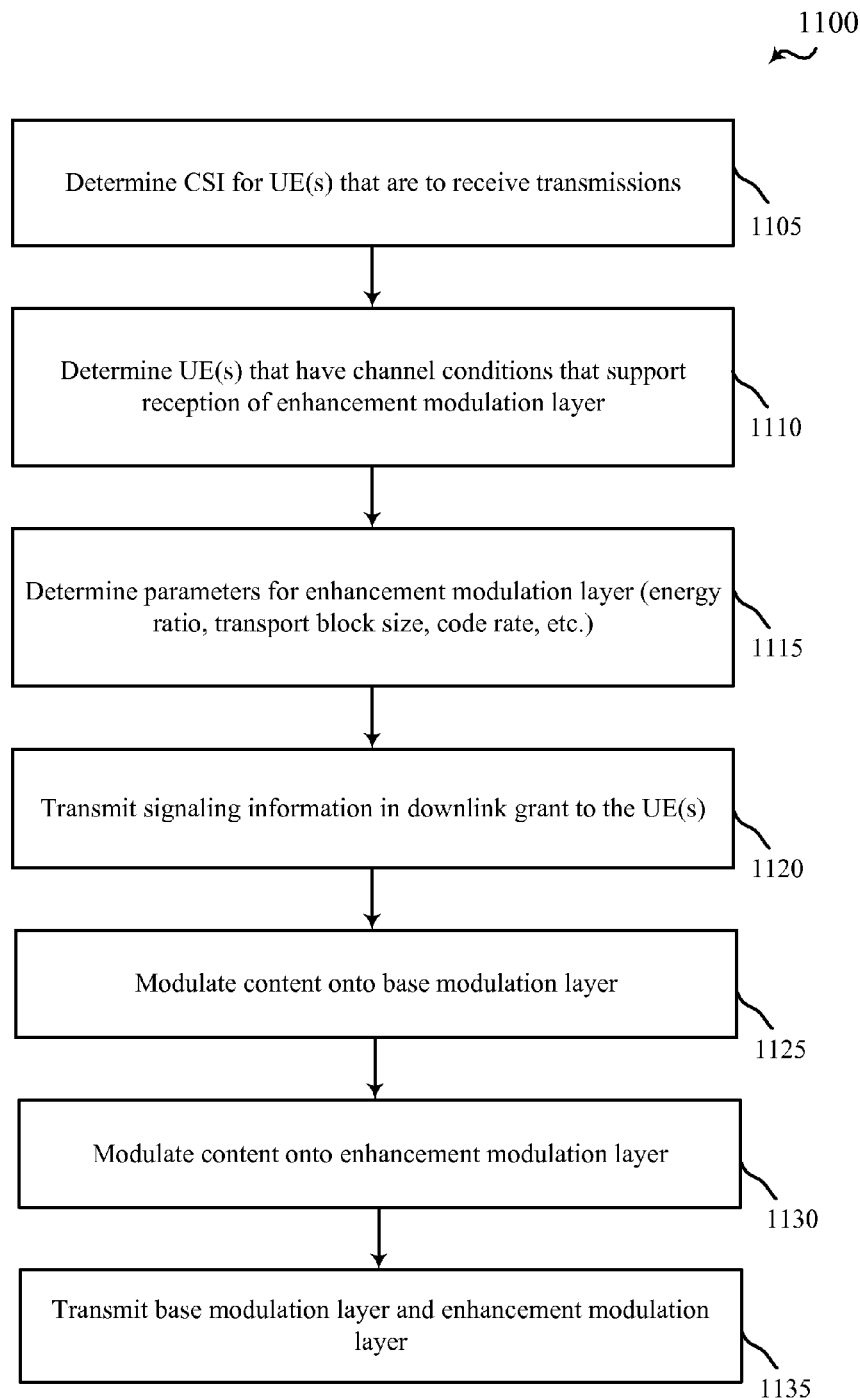
FIG. 11 is a flowchart of a method for hierarchical modulation of content in a base station according to various examples.

With reference now to FIG. 11, a flowchart conceptually illustrating an example of a method for wireless communication is described in accordance with aspects of the present disclosure. For clarity, the method 1100 is described below with reference to ones of the base stations or eNBs 105 and/or devices 405 described with reference to FIGS. 1, 2, 4, 7, 8, 9, and/or 10. In one example, an eNB or device may execute one or more sets of codes to control the functional elements of the eNB or device to perform the functions described below.

At block 1105, the eNB may determine CSI for UE(s) that are to receive transmissions. As mentioned above, the CSI may be provided by the UE(s) and may include information related to channel conditions at the UE and other information related to the UE, such as a rank indicator (RI) that indicated a number of spatial layers that the UE may transmit/receive. At block 1110, the eNB may determine UE(s) that have channel conditions that support reception of enhancement modulation layer. At block 1115 the eNB may determine parameters for enhancement modulation layer, such as energy ratio, transport block size, modulation and coding scheme, and the like. The parameters for the enhancement modulation layer may be determined based on the CSI for the UE, the RI for the UE, and data that is to be transmitted, for example.

At block 1120 the eNB may transmit signaling information in a downlink grant to the UE(s). The signaling information may include, for example, a downlink grant that includes an indication of whether a UE is to receive the base modulation layer, the enhancement modulation layer, or both, and downlink resources for the UE on the layer(s). The signaling information may also include, for example, one or more of a transmission energy ratio between the base modulation layer and the enhancement modulation layer, a transport block size for the base modulation layer and the enhancement modulation layer, or a modulation and coding scheme for the base modulation layer and the enhancement modulation layer. In certain examples, the downlink grant may include one or a combination of a resource block location of data transmitted to the UE on one or more of the base modulation layer or the enhancement modulation layer, a modulation and coding scheme (MCS) of the data transmitted to the UE on one or more of the base modulation layer or the enhancement modulation layer, a precoding matrix used for transmitting on one or more of the base modulation layer or the enhancement modulation layer, layer mapping for one or more of the base modulation layer or the enhancement modulation layer, code block size for one or more of the base modulation layer or the enhancement modulation layer, or a number of spatial layers for one or more of the base modulation layer or the enhancement modulation layer.

The signaling information, in some examples, may be provided in a single downlink grant comprising information for each of the base modulation layer and the enhancement modulation layer provided to each UE that is to receive downlink resources. In some examples, the downlink grant may include information for one of the hierarchical modulation layers, and also include an indication that the grant is for the base modulation layer or the enhancement modulation layer, such as through one or more bits embedded in the downlink grant. In certain examples, the indication of the base modulation layer or the enhancement modulation layer may include a cyclic redundancy check (CRC) masked with a cell radio network temporary identifier (C-RNTI) for the UE to indicate the downlink resources are for the base modulation layer or the enhancement modulation layer. For example, the C-RNTI for the base modulation layer may include a primary cell (PCell) RNTI (PC-RNTI) for the UE, and the C-RNTI for the enhancement modulation layer may include a secondary cell (SCell) RNTI (SC-RNTI) for the UE.

In other examples, all of a portion of the signaling information may be provided using radio resource control (RRC) signaling, which may include, for example, the energy ratio between the base modulation layer and enhancement modulation layer, a modulation scheme for the base modulation layer, a modulation scheme for the enhancement modulation layer, a resource block size for the base modulation layer, or a resource block size for the enhancement modulation layer. In such examples, the parameters provided in the RRC signaling may be semi-statically configured, and downlink grants may be based on such semi-statically configured parameters. In some examples, the signaling information is provided using a physical control format indicator channel (PCFICH).

With continued reference to FIG. 11, at block 1125 the eNB may modulate content onto base modulation layer. The base modulation layer content may be modulated onto the base modulation layer according to the parameters associated with the base modulation layer and the enhancement modulation layer. At block 1130, the eNB may modulate content onto enhancement modulation layer in a similar manner. At block 1135 the eNB may transmit base modulation layer and enhancement modulation layer. Such transmission may include superpositioning the enhancement modulation layer onto the base modulation layer and transmitting the modulation layers to the one or more UEs.

Figure 12:
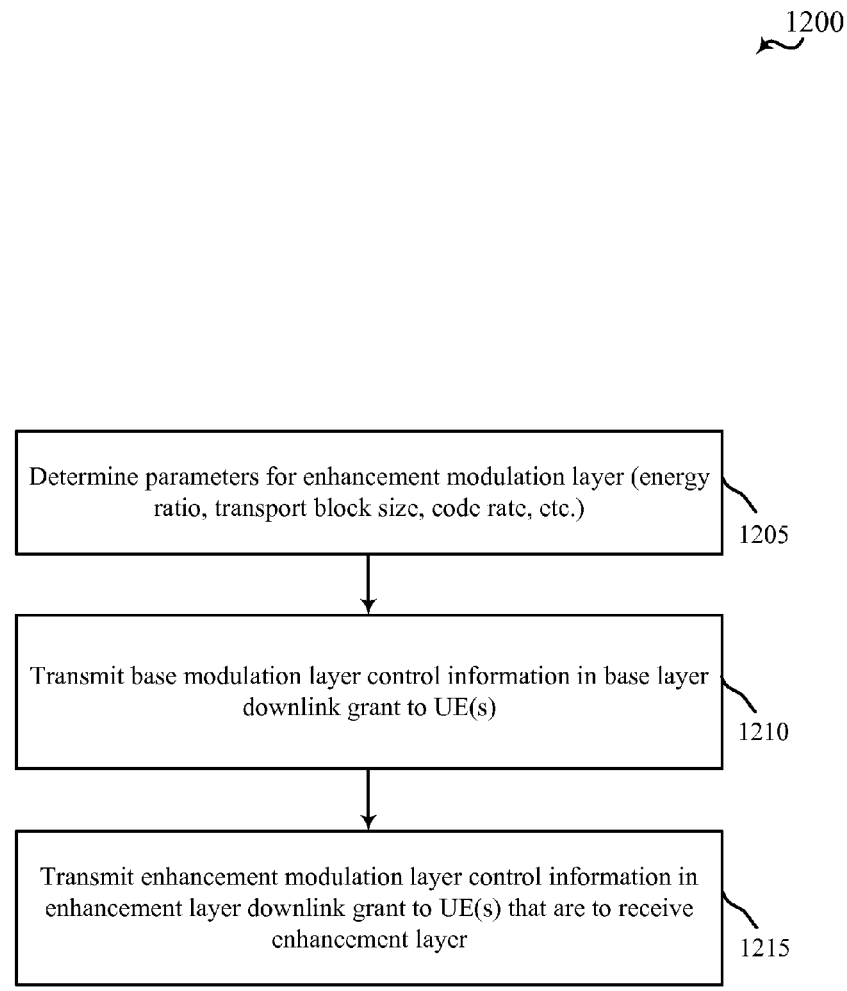
FIG. 12 is a flowchart of another method for hierarchical modulation of content in a base station according to various examples.

With reference now to FIG. 12, a flowchart conceptually illustrating an example of a method for wireless communication is described in accordance with aspects of the present disclosure. For clarity, the method 1200 is described below with reference to ones of the base stations or eNBs 105 and/or devices 405 described with reference to FIGS. 1, 2, 4, 7, 8, 9, and/or 10. In one example, an eNB or device may execute one or more sets of codes to control the functional elements of the eNB or device to perform the functions described below.

At block 1205, the eNB may determine parameters for the enhancement modulation layer, such as energy ratio, transport block size, modulation and coding scheme, and the like. As discussed above, in some examples separate downlink grants may be provided for each of the base modulation layer and enhancement modulation layer. For example, certain UEs may receive content on the base modulation layer, and other UEs may receive content on the enhancement modulation layer, in which case separate grants for each modulation layer may be provided. At block 1210, the eNB may transmit base modulation layer control information in a base layer downlink grant to one or more UEs. At block 1215, the eNB may transmit enhancement modulation layer control information in an enhancement layer downlink grant to UE(s) that are to receive enhancement layer. Each of the downlink grants may include information such as described above related to modulation layer parameters.

Figure 13:
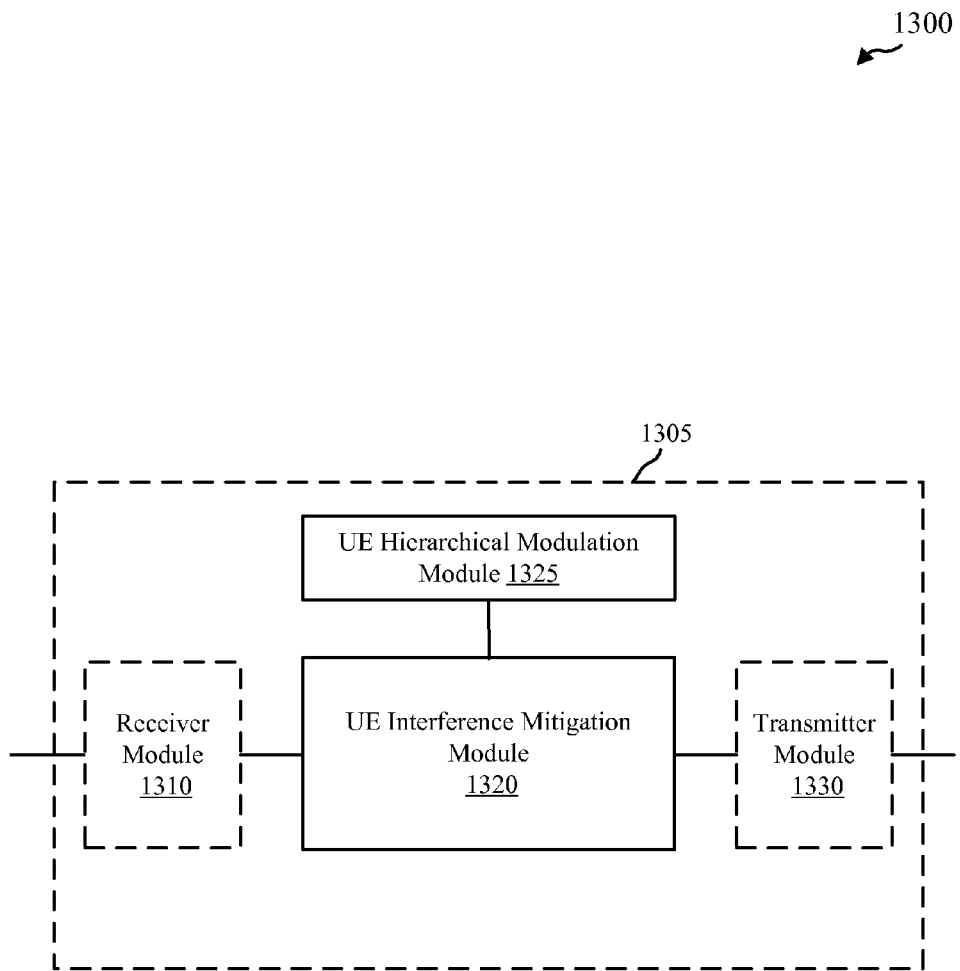
FIG. 13 shows a block diagram of a device that may be used for hierarchical modulation and interference cancellation in accordance with various examples.

Referring now to FIG. 13, a block diagram 1300 illustrates a device 1305 for use in wireless communications, in accordance with various aspects of the present disclosure. In some examples, the device 1305 may be an example of one or more aspects of the UEs described with reference to FIGS. 1, 2, 6, 7, 8 and/or 9. The device 1305 may also be a processor. The device 1305 may include a receiver module 1310, a UE interference mitigation module 1320, a UE hierarchical modulation module 1325, and/or a transmitter module 1330. Each of these components may be in communication with each other.

The components of the device 1305 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may be or include an RF receiver, such as an RF receiver operable to receive transmissions on two or more hierarchical modulation layers. In some examples, the transmitter module 1330 may be or include an RF transmitter, such as an RF transmitter operable to transmit data on two or more hierarchical modulation layers. The RF transmitter 1330, in some examples, may include a single transmitter or a single transmitter per transmit/receive chain. The transmitter module 1330 may be used to transmit various types of data and/or control signals (i.e., transmissions) over one or more communication links of a wireless communications system including two or more hierarchical modulation layers, such as one or more communication links 125 of the wireless communications systems 100, 200, 700, 800, and/or 900 described with reference to FIGS. 1, 2, 7, 8, and/or 9.

In some examples, the UE interference mitigation module 1320 may perform interference mitigation on signals received at the receiver module 1310. For example, interference mitigation module 1320 may perform interference cancellation techniques on received signals to, for example, cancel interference associated with the base modulation layer from the received signal to provide the enhancement layer that may be decoded. The UE interference mitigation module 1320 may also perform other intra-cell, inter-cell, and/or inter-radio interference cancellation techniques as will be described below for various examples in FIGS. 14-46. The UE hierarchical modulation module 1325 may decode multiple hierarchical modulation layers and/or configure multiple hierarchical modulation layers and determine content to be transmitted on each hierarchical modulation layer for device 1305 when operating in a wireless communications system supporting transmissions on two or more hierarchical modulation layers.

The UE hierarchical modulation module 1325 may, for example, configure device 1305 to decode a base modulation layer, perform interference cancellation techniques on the received signal to cancel interference from the base modulation layer, and decode the enhancement modulation layer. The UE hierarchical modulation module 1325 may also determine parameters associated with the one or more modulation layers to assist in interference cancellation and decoding of the modulation layers. In some examples, two or more enhancement modulation layers may be present, in which case the UE hierarchical modulation module 1325 may manage the performance of successive interference cancellation and decoding of each successive modulation layer.

Figure 14:
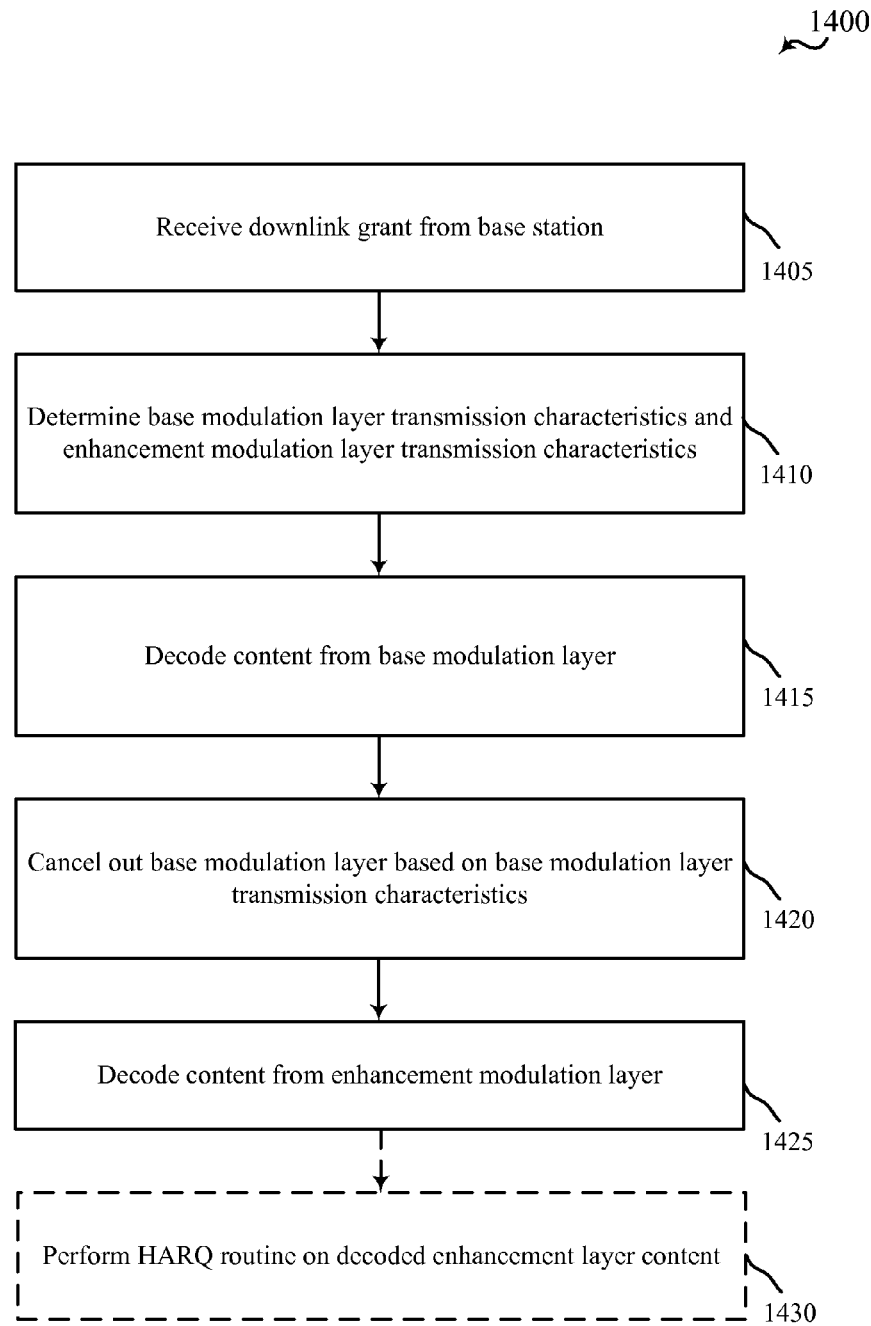
FIG. 14 is a flowchart of a method for hierarchical modulation of content and interference cancellation in a user equipment according to various examples.

With reference now to FIG. 14, a flowchart conceptually illustrating an example of a method for wireless communication is described in accordance with aspects of the present disclosure. For clarity, the method 1400 is described below with reference to ones of the UEs 115 and/or device 1305 described with reference to FIGS. 1, 2, 6, 7, 8, 9 and/or 13. In one example, a UE may execute one or more sets of codes to control the functional elements of the UE to perform the functions described below.

At block 1405, the UE may receive a downlink grant from a base station. For example, the UE may receive a downlink grant from an eNB indicating that downlink resources have been allocated for a base modulation layer and/or an enhancement modulation layer, and the downlink grant may include information such as discussed above with respect to FIGS. 10-12. At block 1410, the UE may determine base modulation layer transmission characteristics and enhancement modulation layer transmission characteristics. Such characteristics may be determined based on signaling information included in the downlink grant, and/or may be determined based on RRC signaling received that includes parameters associated with hierarchical modulation layers, such as discussed above. At block 1415, the UE may decode content from base modulation layer.

At block 1420, the UE may perform interference cancellation techniques on the received signal to mitigate interference in the signal from the base modulation layer. The interference cancellation may be based on, for example, base modulation layer transmission characteristics and enhancement modulation layer characteristics provided in control signaling in the downlink grant or through RRC signaling. The control signaling may include signal characteristics of the base modulation layer for use in performing the interference mitigation, for example. In some examples, the control signaling may be provided in the base modulation layer. The interference cancellation techniques may include one or more established interference cancellation techniques, such as, for example, linear minimum mean square error (MMSE) suppression, QR decomposition based sphere decoding (QR-SD), and/or successive interference cancellation (SIC). At block 1425, the UE decodes content from enhancement modulation layer. Such content may include content that is determined to be sent using the enhancement modulation layer, such as lower priority data or data having a lower transmission data error rate threshold, for example. In some examples, the UE may perform a HARQ routine on decoded enhancement layer content, as indicated at optional block 1430, and transmit an ACK/NACK of receipt of the transmission.

Figure 15:
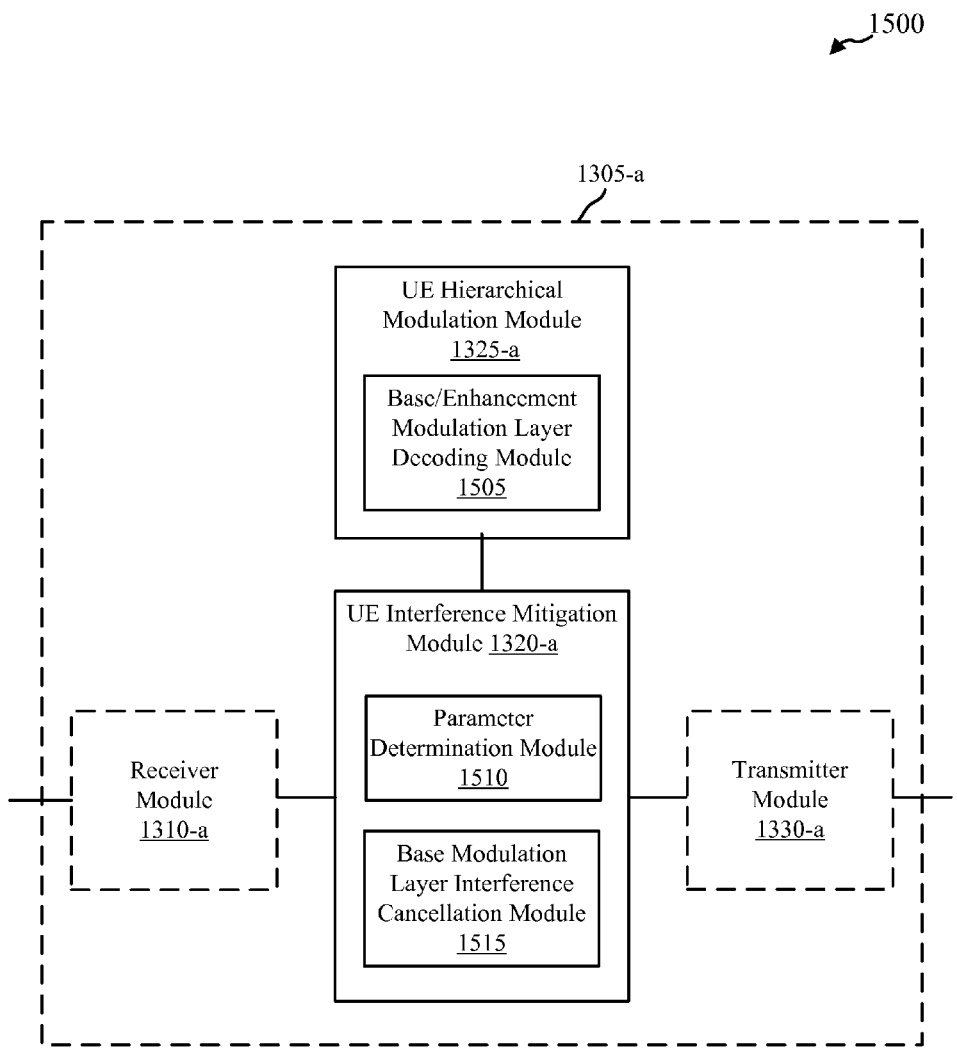
FIG. 15 shows another block diagram of a device that may be used for hierarchical modulation and interference cancellation in accordance with various examples.

Referring now to FIG. 15, a block diagram 1500 illustrates a device 1305-*a* for use in wireless communications, in accordance with various aspects of the present disclosure. In some examples, the device 1305-*a* may be an example of one or more aspects of the UEs 115 or device 1305 described with reference to FIGS. 1, 2, 6, 7, 8, 9 and/or 13. The device 1305-*a* may also be a processor. The device 1305-*a* may include a receiver module 1310-*a*, a UE interference mitigation module 1320-*a*, a UE hierarchical modulation module 1325-*a*, and/or a transmitter module 1330-*a*. Each of these components may be in communication with each other.

The components of the device 1305-*a* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310-*a* may be an example of the receiver module 1310 of FIG. 13. The receiver module 1310-*a* may be or include an RF receiver, such as an RF receiver operable to receive transmissions on two or more hierarchical modulation layers. In some examples, the transmitter module 1330-*a* may be an example of the transmitter module 1330 of FIG. 13. The transmitter module 1330-*a* may be or include an RF transmitter, such as an RF transmitter operable to transmit data on two or more hierarchical modulation layers. The RF transmitter 1330-*a*, in some examples, may include a single transmitter or a single transmitter per transmit/receive chain. The transmitter module 1330-*a* may be used to transmit various types of data and/or control signals (i.e., transmissions) over one or more communication links of a wireless communications system including two or more hierarchical modulation layers, such as one or more communication links 125 of the wireless communications systems 100, 200, 700, 800, and/or 900 described with reference to FIGS. 1, 2, 7, 8, and/or 9.

The UE interference mitigation module 1320-*a* may be an example of the UE interference mitigation module 1320 described with reference to FIG. 13 and may include a parameter determination module 1510 and a base modulation layer interference cancellation module 1515. Each of these components may be in communication with each other. The parameter determination module 1510 may determine one or more parameters associated with the base modulation layer and/or the enhancement modulation layer for use in interference cancellation. For example, the parameter determination module 1510 may determine one or more of an energy ratio between the base modulation layer and the enhancement modulation layer, an MCS of each of the layers, resource block locations of data transmitted to the UE on one or more of the base modulation layer or the enhancement modulation layer, a precoding matrix used for transmitting on one or more of the base modulation layer or the enhancement modulation layer, layer mapping for one or more of the base modulation layer or the enhancement modulation layer, code block size for one or more of the base modulation layer or the enhancement modulation layer, and/or a number of spatial layers for one or more of the base modulation layer or the enhancement modulation layer. The base modulation layer interference cancellation module 1515 may use the parameters provided by parameter determination module 1510 to cancel interference associated with the base modulation layer and provide the resultant signal for decoding of the enhancement modulation layer. Interference cancellation techniques may include those as discussed above, for example.

The UE hierarchical modulation module 1325-*a* may be an example of the UE hierarchical modulation module 1320 described with reference to FIG. 13 and may include a base/enhancement modulation layer decoding module 1505. The base/enhancement modulation layer decoding module 1505 may operate to decode content modulated onto the base modulation layer and enhancement modulation layer.

Figure 16:
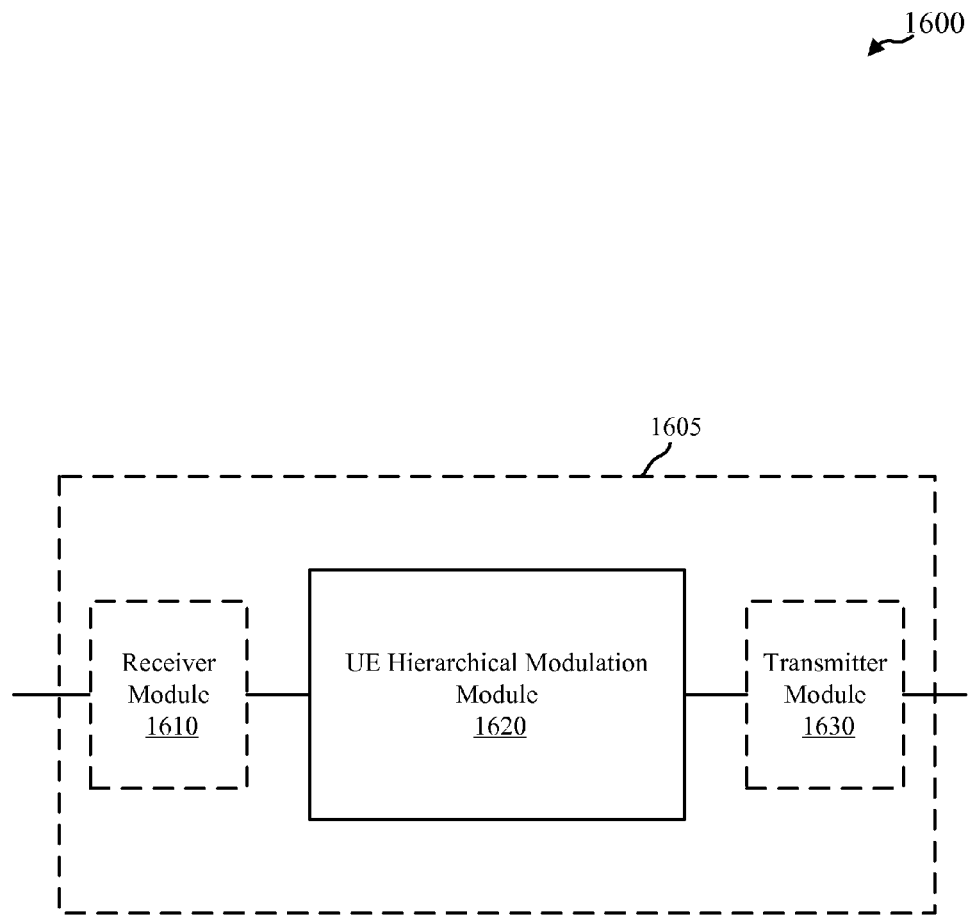
FIG. 16 shows a block diagram of a device that may be used for hierarchical modulation at a user equipment in accordance with various examples.

Referring now to FIG. 16, a block diagram 1600 illustrates a device 1605 for use in wireless communications, in accordance with various aspects of the present disclosure. In some examples, the device 1605 may be an example of one or more aspects of the UEs 115 described with reference to FIGS. 1, 2, 6, 7, 8 and/or 9. The device 1605 may also be a processor. The device 1605 may include a receiver module 1610, a UE hierarchical modulation module 1620, and/or a transmitter module 1630. Each of these components may be in communication with each other.

The components of the device 1605 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1610 may be or include an RF receiver, such as an RF receiver operable to receive transmissions on two or more hierarchical modulation layers. In some examples, the transmitter module 1630 may be or include an RF transmitter, such as an RF transmitter operable to transmit data on two or more hierarchical modulation layers. The RF transmitter 1630, in some examples, may include a single transmitter or a single transmitter per transmit/receive chain. The transmitter module 1630 may be used to transmit various types of data and/or control signals (i.e., transmissions) over one or more communication links of a wireless communications system including two or more hierarchical modulation layers, such as one or more communication links 125 of the wireless communications systems 100, 200, 700, 800, and/or 900 described with reference to FIGS. 1, 2, 7, 8, and/or 9.

The UE hierarchical modulation module 1620 may configure multiple hierarchical modulation layers and determine content to be transmitted on each hierarchical modulation layer for device 1605 when operating in a wireless communications system supporting transmissions on two or more hierarchical modulation layers. The UE hierarchical modulation module 1620 may, for example, configure device 1605 to determine content for transmission on each hierarchical modulation layer, modulation of the content on each hierarchical modulation layer, and superpositioning of the hierarchical modulation layers for transmission through transmitter module 1630. The UE hierarchical modulation module 1620 may perform hierarchical modulation in a manner similarly as discussed above with respect to eNB hierarchical modulation, such as described above with respect to FIGS. 1-12, for example, and as will be described below for various examples in FIGS. 17-46.

Figure 17:
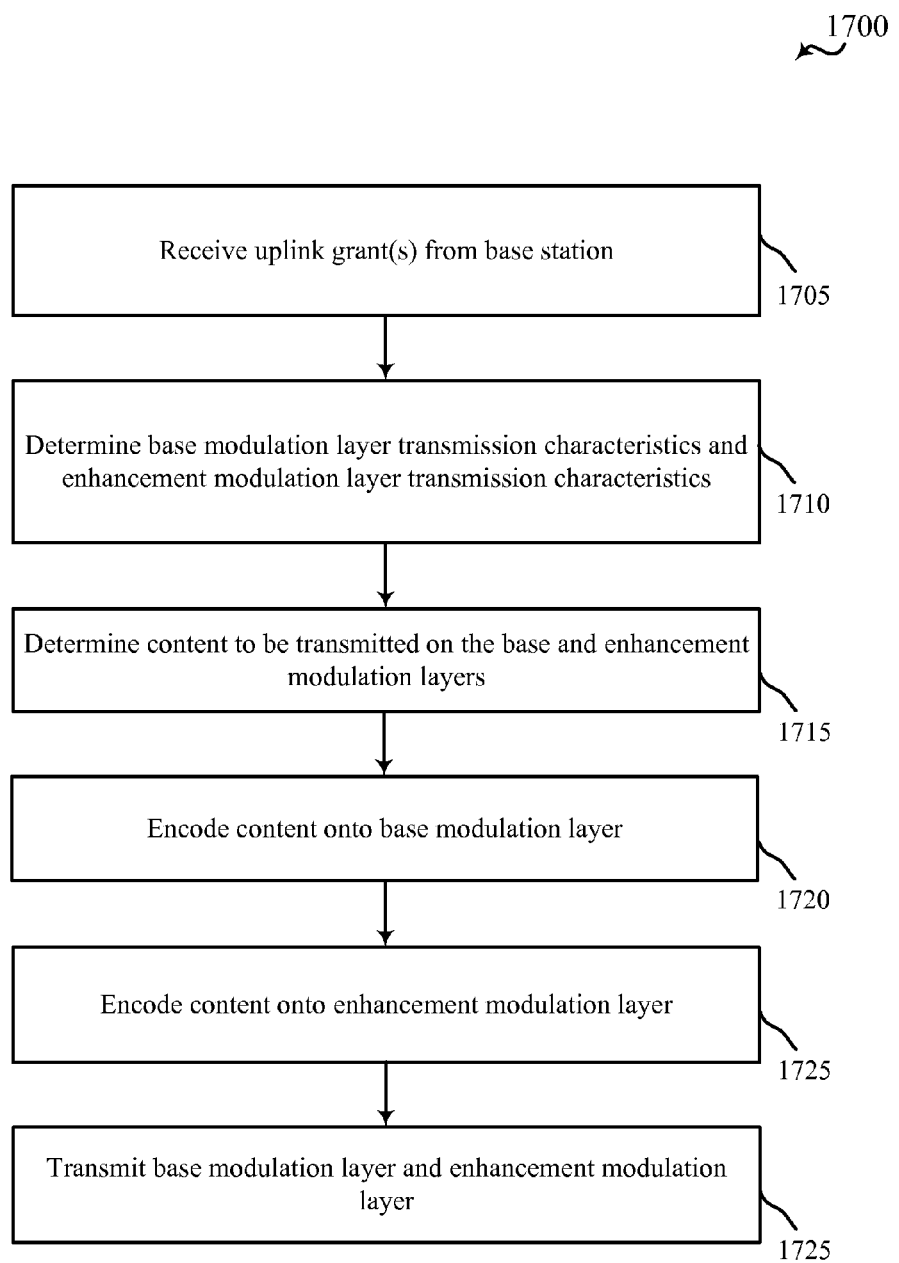
FIG. 17 is a flowchart of a method for hierarchical modulation of content in a user equipment according to various examples.

With reference now to FIG. 17, a flowchart conceptually illustrating an example of a method for wireless communication is described in accordance with aspects of the present disclosure. For clarity, the method 1700 is described below with reference to ones of the UEs 115 and/or device 1605 described with reference to FIGS. 1, 2, 6, 7, 8, 9 and/or 16. In one example, a UE may execute one or more sets of codes to control the functional elements of the UE to perform the functions described below.

At block 1705, the UE may receive one or more uplink grant(s) from a base station. The uplink grants may provide information related to uplink resources that the UE may use to transmit uplink data to an eNB. In some examples, a single uplink grant may include an indication of hierarchical modulation resources for both a base modulation layer and an enhancement modulation layer. In other examples, separate uplink grants may be received, with a first uplink grant indicating hierarchical modulation resources for the base modulation layer and a second uplink grant indicating hierarchical modulation resources for the enhancement modulation layer. Similarly as discussed above, the base modulation layer may have a lower error rate than the enhancement modulation layer. In some examples, the uplink grant(s) may include an indication of whether the grant is for the base modulation layer or the enhancement modulation layer, and uplink resources of the indicated base modulation layer or the enhancement modulation layer. Such an indication may include, for example, one or more bits embedded in the uplink grant. In other examples, the indication of the base modulation layer or the enhancement modulation layer may include a cyclic redundancy check (CRC) masked with a C-RNTI for the UE to indicate the uplink resources are for the base modulation layer or the enhancement modulation layer. The C-RNTI for the base modulation layer may include, in some examples, a PC-RNTI for the UE, and the C-RNTI for the enhancement modulation layer may include a SC-RNTI for the UE.

At block 1710, the UE may determine base modulation layer transmission characteristics and enhancement modulation layer transmission characteristics. The determination may be based on information from the uplink grant(s), for example, and may include a determination of one or more of an energy ratio between the base modulation layer and the enhancement modulation layer, layer mapping information, code block size, or a number of spatial layers within each of the base modulation layer and the enhancement modulation layer. In some examples, the uplink grant(s) may indicate a number of spatial layers for transmission of each of the base modulation layer and enhancement modulation layer. In other examples, one or more of the characteristics may be determined based on received signaling information received through RRC signaling that may include parameters such as, for example, one or more of a transmission energy ratio between the base modulation layer and the enhancement modulation layer, a transport block size for the base modulation layer and the enhancement modulation layer, or a modulation and coding scheme for the base modulation layer and the enhancement modulation layer. In other examples, one or more of the parameters may be provided in the uplink grant(s), with other of the parameters provided through RRC signaling. In some examples, the signaling information may be received on a PCFICH, and may include independent control information for each of the base modulation layer and the enhancement modulation layer.

At block 1715, the UE may determine content to be transmitted on the base modulation layer and the enhancement modulation layer. Similarly as discussed above, the content may include first content to be transmitted on the base modulation layer and second content to be transmitted on the enhancement modulation layer. The different content may be determined, in various examples, based on error rate thresholds associated with different content, higher priority content versus lower priority content, a QoS parameter associated with the content, and/or latency sensitivity of the content. In some examples, the base modulation layer may include a physical uplink control channel (PUCCH) and the enhancement modulation layer may include a physical uplink shared channel (PUSCH). In other examples, both the base modulation layer and enhancement modulation layer may include a PUSCH.

In certain examples, the first content may include control information transmitted on a PUCCH. Such control information may include, for example, one or more of acknowledgment of downlink data (e.g., HARQ ACK/NACK data), channel state information (CSI), a rank indicator (RI), or a scheduling request (SR). In some examples, the control information further includes uplink information associated with the enhancement modulation layer. For example, if the uplink grant(s) indicate that a certain data rate is to be used for the uplink transmission on the enhancement modulation layer, the UE may determine that such a data rate cannot be supported based on a transmitter power of the UE, and the UE may provide an indication of a different data rate in the uplink information.

At block 1720, the UE may encode content onto base modulation layer. At block 1725, the UE may encode content onto enhancement modulation layer. The enhancement modulation layer may be superpositioned on the base modulation layer, and the UE may transmit base modulation layer and enhancement modulation layer, as indicated at block 1725. The hierarchical modulation layers may be received at an eNB, and decoded in a manner similarly as discussed above, and as will be discussed below with reference to FIGS. 20A, 20B, and 21.

Figure 18:
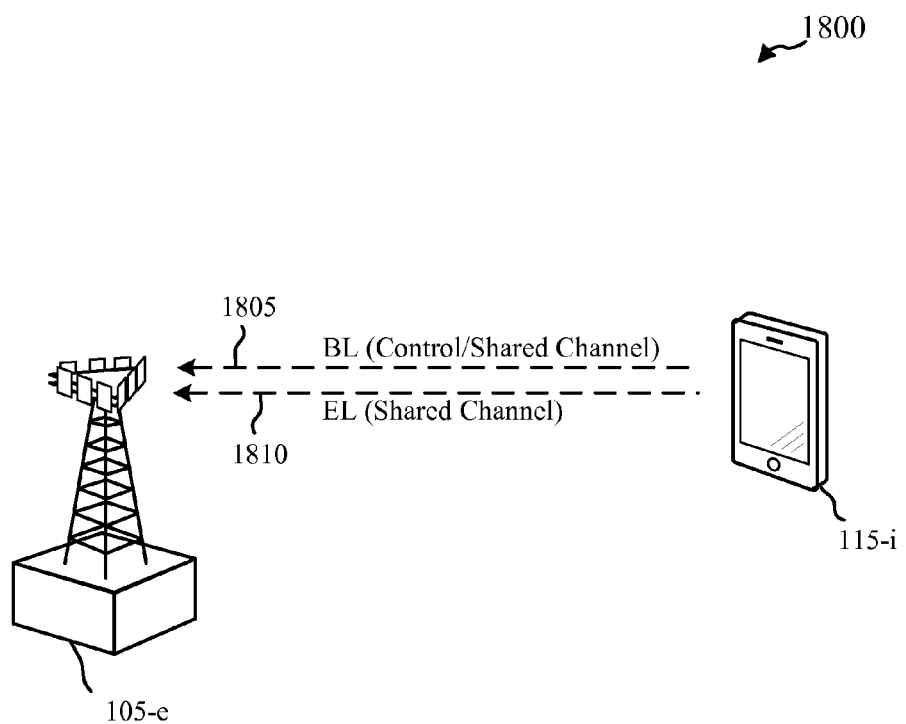
FIG. 18 illustrates a hierarchical modulation environment in accordance with various examples.

As discussed above, the base modulation layer and the enhancement modulation layer may be used to transmit different content based on one or more of a number of different factors. FIG. 18 illustrates a wireless communications system 1800 in which a UE 115-*i* may communicate with eNB 105-*e* using hierarchical modulation. The wireless communications system 1800 may illustrate, for example, aspects of wireless communications systems 100, 200, 700, 800 and/or 900 illustrated in FIGS. 1, 2, 7, 8 and/or 9. In this example, multiple modulation layers may be employed for wireless communications, in which a base modulation layer 1805 and an enhancement modulation layer 1810 may be concurrently transmitted between the UE 115-*i* and the eNB 105-*e*. While a single enhancement modulation layer 1810 is illustrated in FIG. 18, other examples may include more than one enhancement modulation layer. The enhancement modulation layer 1810 may be superpositioned on the base modulation layer 1805 and transmitted in a single communications link between UE 115-*i* and the eNB 105-*e*, in a manner such as described above with respect to FIGS. 16-17.

The base modulation layer 1805, according to this example, may provide higher reliability communications between the UE 115-*i* and the eNB 105-*e*, resulting in a relatively high confidence that eNB 105-*e* may successfully receive and decode the base modulation layer 1805. In some examples, the eNB 105-*e* may not transmit an ACK or NACK of receipt of transmissions on the base modulation layer, such as according to HARQ techniques. Removal of such feedback may enhance capacity on the base modulation layer due to less overhead associated with HARQ ACK/NACK transmissions and associated retransmissions. Due to the relatively high reliability of the base modulation layer 1805, content may be selected for transmission on the base modulation layer that may benefit from the high reliability and reduced latency of base modulation layer 1805 transmissions. For example, as discussed above, the base modulation layer 1805 may be selected to communicate high priority content, latency sensitive content, and/or control/signaling information from the UE 115-*i* to the eNB 105-*e*.

The enhancement modulation layer 1810, according to various examples, may provide relatively lower reliability communications between the UE 115-*i* and the eNB 105-*e* as compared to the base modulation layer 1805. As such, eNB 105-*e* may perform HARQ techniques on transmissions of the enhancement modulation layer 1810, such that transmissions that are not successfully received and decoded may be retransmitted by the UE 115-*i*. According to some examples, the base modulation layer 1805 may have an error rate of approximately 1%, and the enhancement modulation layer 1810 may have an error rate of approximately 10%. As mentioned above, in some examples the UE 115-*i* may identify first content for transmission on the base modulation layer 1805.

In some examples, the first content may be associated with a first error rate threshold that defines an error rate in an initial transmission that is required or desired for the first content. The first error rate threshold may be determined based on, for example a type of information contained in the first content. The UE 115-*i* may also identify second content for transmission on the enhancement modulation layer 1810. In some examples, the second content may be associated with a second error rate threshold that is higher than the first error rate threshold. The second error rate threshold may be determined, for example, based on the type of information contained in the second content. For example, the first content may include high priority content and the second content may include lower priority content.

In other examples, the base modulation layer 1805 may include a control and/or shared channel (e.g., PUCCH/PUSCH), and the enhancement modulation layer 1810 may include a shared channel (e.g., PUSCH). In some examples, the first content may include control information that may be used by the UE 115-*i* for communications with the eNB 105-*e*. For example, the control information may include scheduling request information, acknowledgment information, and/or signaling information, and the control information may be transmitted using PUCCH on the base modulation layer 1805. The second content may include, for example, user data that may be transmitted using a PUSCH on the enhancement modulation layer 1810.

Figure 19:
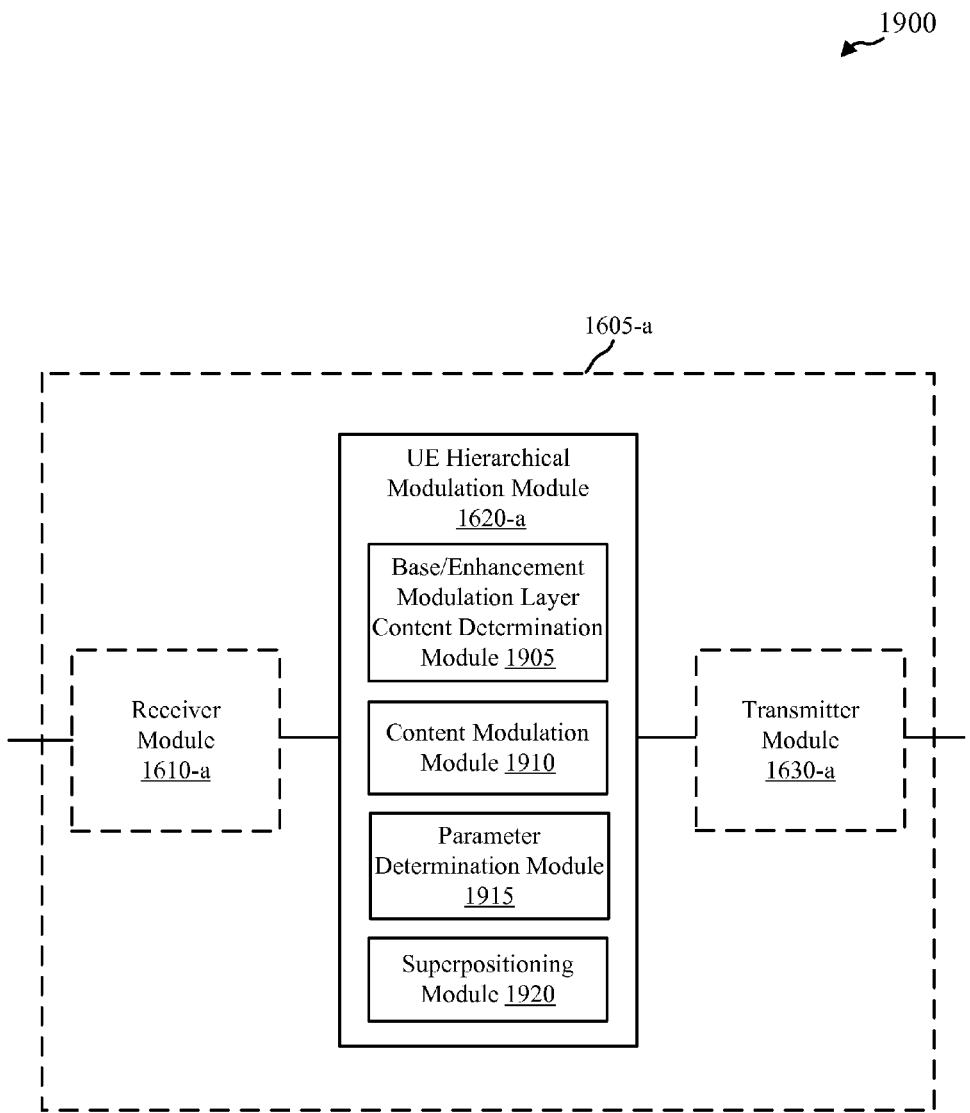
FIG. 19 shows another block diagram of a device that may be used for hierarchical modulation at a user equipment in accordance with various examples.

Referring now to FIG. 19, a block diagram 1900 illustrates a device 1605-*a* for use in wireless communications, in accordance with various aspects of the present disclosure. In some examples, the device 1605-*a* may be an example of one or more aspects of the UEs 115 and/or devices 1305, 1605 described with reference to FIGS. 1, 2, 6, 7, 8, 9, 13, 15, 16 and/or 18. The device 1605 may also be a processor. The device 1605 may include a receiver module 1610-*a*, a UE hierarchical modulation module 1620-*a*, and/or a transmitter module 1630-*a*. Each of these components may be in communication with each other.

The components of the device 1605-*a* may be, individually or collectively, implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1610-*a* may be an example of the receiver module 1610 of FIG. 16. The receiver module 1610-*a* may be or include an RF receiver, such as an RF receiver operable to receive transmissions on two or more hierarchical modulation layers. In some examples, the transmitter module 1630-*a* may be an example of the transmitter module 1630 of FIG. 16. The transmitter module 1630-*a* may be or include an RF transmitter, such as an RF transmitter operable to transmit data on two or more hierarchical modulation layers. The RF transmitter 1630-*a*, in some examples, may include a single transmitter or a single transmitter per transmit/receive chain. The transmitter module 1630-*a* may be used to transmit various types of data and/or control signals (i.e., transmissions) over one or more communication links of a wireless communications system including two or more hierarchical modulation layers, such as one or more communication links 125 of the wireless communications systems 100, 200, 700, 800, 900, and/or 1800 described with reference to FIGS. 1, 2, 7, 8, 9, and/or 18.

The UE hierarchical modulation module 1620-*a* may be an example of the UE hierarchical modulation module 1620 described with reference to FIG. 16 and may include a base/enhancement modulation layer content determination module 1905, a content modulation module 1910, a parameter determination module 1915, and a superpositioning module 1920. Each of these components may be in communication with each other.

In some examples, base/enhancement modulation layer content determination module 1905 may determine content that is to be transmitted from the device 1605-*a* using the base modulation layer and content that is to be transmitted from the device 1605-*a* using the enhancement modulation layer, such as described above with respect to FIGS. 16-18, for example. The content modulation module 1910 may modulate the determined content onto the appropriate base modulation layer or the enhancement modulation layer. The parameter determination module 1915 may determine one or more of various parameters related to channel conditions and parameters to use in hierarchical modulation, such as a transmission energy ratio between the base modulation layer and the enhancement modulation layer.

In some examples, the parameter determination module 1915 may determine CSI and provide the CSI information to an eNB to determine if channel conditions support hierarchical modulation. In some examples, the parameter determination module 1915 may determine parameters for each of a plurality of transmission time intervals (TTIs). The parameter determination module 1965 may also, in some examples, determine a number of spatial layers available for transmission of each of the base modulation layer and enhancement modulation layer, which may be reported to the eNB in a rank indicator, for example. The parameter determination module 1915 may also determine parameters associated with hierarchical modulation layers based on control signaling including one or more parameters for hierarchical modulation layer transmission. Such received parameters may include, for example, one or more of an energy ratio between layers, layer mapping information, code block size, a number of spatial layers within each of the base modulation layer and the enhancement modulation layer, or MCS for each modulation layer. The superpositioning module 1920 may superposition the enhancement modulation layer onto the base modulation layer according to the parameters determined by the parameter determination module 1915 for transmission by transmitter module 1630-*a*.

Figure 20A:
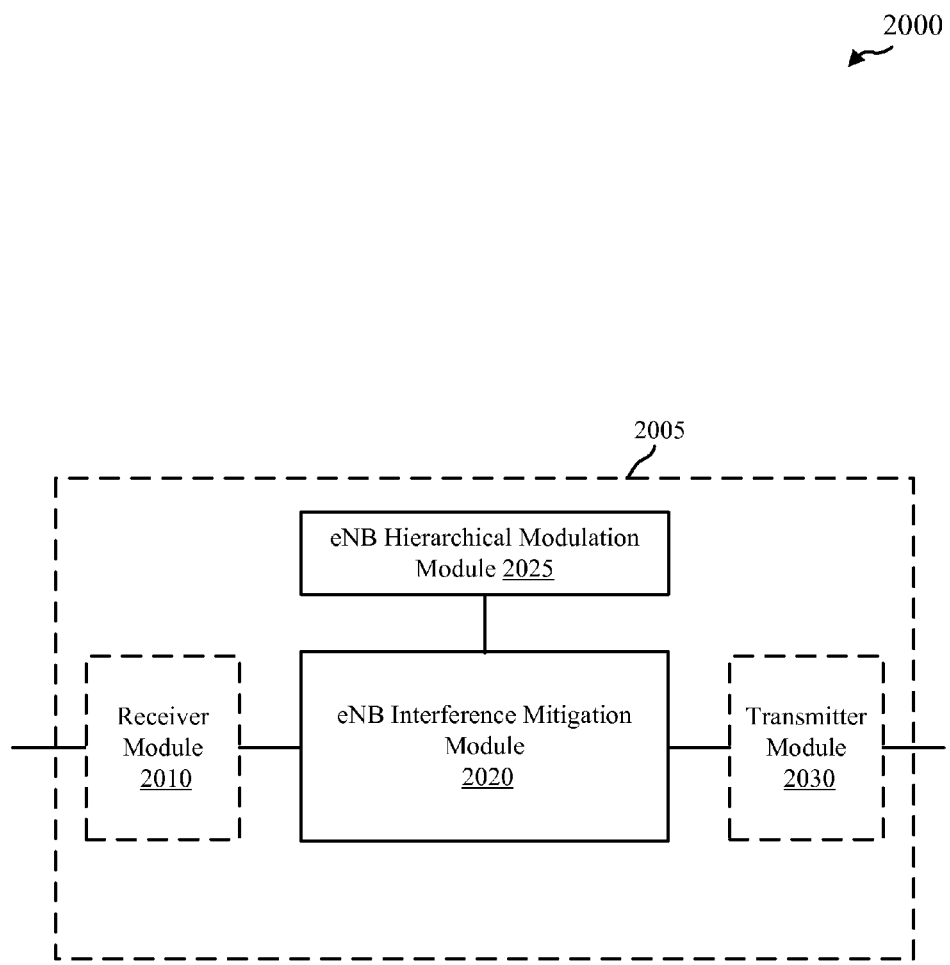
FIGS. 20A and 20B show block diagrams of devices that may be used for hierarchical modulation and interference cancellation at a base station in accordance with various examples.

Referring now to FIG. 20A, a block diagram 2000 illustrates a device 2005 for use in wireless communications, in accordance with various aspects of the present disclosure. In some examples, the device 2005 may be an example of one or more aspects of the eNBs 105 or devices 405 described with reference to FIGS. 1, 2, 4, 6, 7, 8, 9, 10, and/or 18. The device 2005 may also be a processor. The device 2005 may include a receiver module 2010, an eNB interference mitigation module 2020, an eNB hierarchical modulation module 2025, and/or a transmitter module 2030. Each of these components may be in communication with each other.

The components of the device 2005 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2010 may be or include an RF receiver, such as an RF receiver operable to receive transmissions on two or more hierarchical modulation layers. In some examples, the transmitter module 2030 may be or include an RF transmitter, such as an RF transmitter operable to transmit data on two or more hierarchical modulation layers. The RF transmitter 2030, in some examples, may include a single transmitter or a single transmitter per transmit/receive chain. The transmitter module 2030 may be used to transmit various types of data and/or control signals (i.e., transmissions) over one or more communication links of a wireless communications system including two or more hierarchical modulation layers, such as one or more communication links 125 of the wireless communications systems 100, 200, 700, 800, 900, and/or 1800 described with reference to FIGS. 1, 2, 7, 8, 9, and/or 18.

In some examples, the eNB interference mitigation module 2020 may perform interference mitigation on signals received at the receiver module 2010. For example, interference mitigation module 2020 may perform interference cancellation techniques on received signals to, for example, cancel interference associated with the base modulation layer from the received signal to provide the enhancement layer that may be decoded. The eNB interference mitigation module 2020 may also perform other intra-cell, inter-cell, and/or inter-radio interference cancellation techniques as will be described below for various examples in FIGS. 22-46. The UE hierarchical modulation module 2025 may decode multiple hierarchical modulation layers and/or configure multiple hierarchical modulation layers and determine content to be transmitted on each hierarchical modulation layer for device 2005 when operating in a wireless communications system supporting transmissions on two or more hierarchical modulation layers.

The eNB hierarchical modulation module 2025 may, for example, configure device 2005 to decode a base modulation layer, perform interference cancellation techniques on the received signal to cancel interference from the base modulation layer, and decode the enhancement modulation layer. The eNB hierarchical modulation module 2025 may also determine parameters associated with the one or more modulation layers to assist in interference cancellation and decoding of the modulation layers. In some examples, two or more enhancement modulation layers may be present, in which case the eNB hierarchical modulation module 2025 may manage the performance of successive interference cancellation and decoding of each successive modulation layer.

Figure 20B:
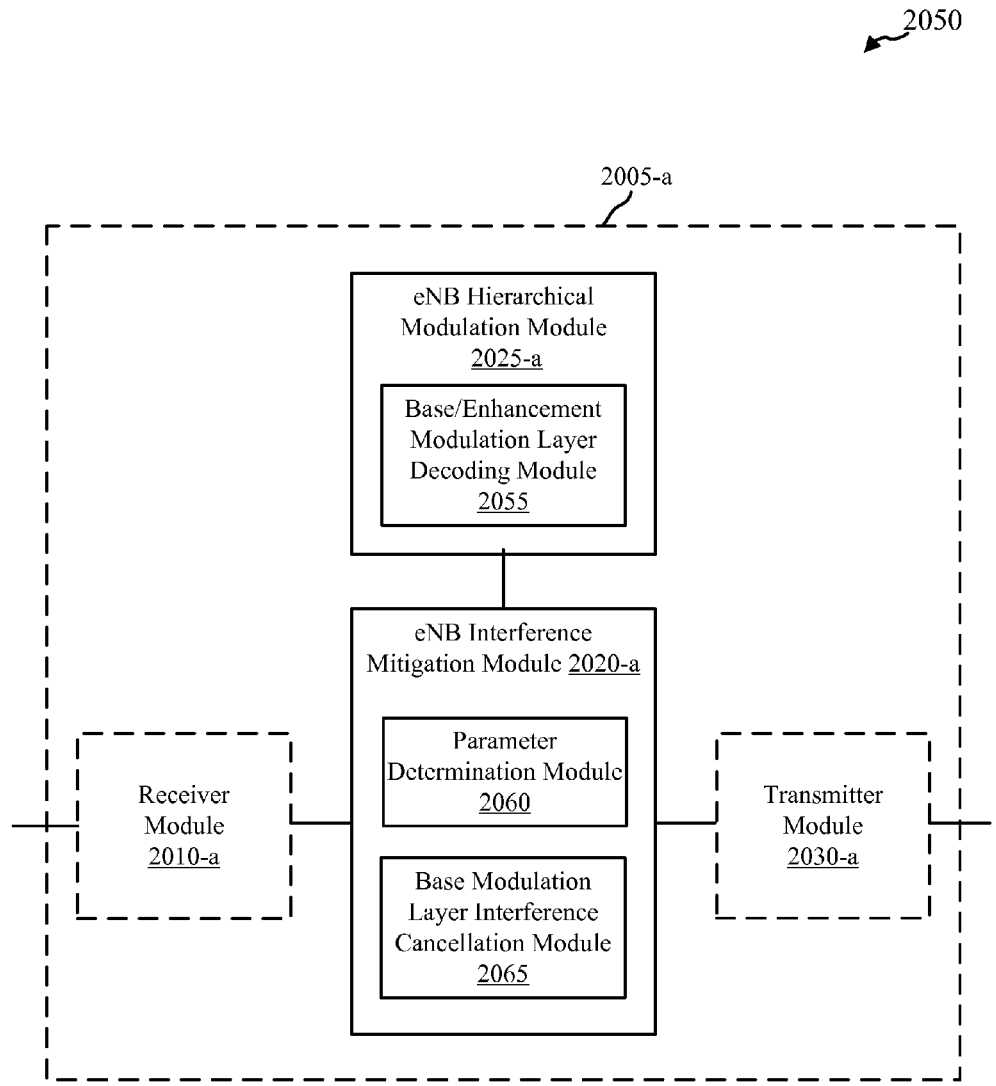

Referring now to FIG. 20B, a block diagram 2050 illustrates a device 2005-*a* for use in wireless communications, in accordance with various aspects of the present disclosure. In some examples, the device 2005-*a* may be an example of one or more aspects of the eNBs 105 or devices 405, 2005 described with reference to FIGS. 1, 2, 4, 6, 7, 8, 9, 10, 18, and/or 20. The device 2005-*a* may also be a processor. The device 2005-*a* may include a receiver module 2010-*a*, an eNB interference mitigation module 2020-*a*, an eNB hierarchical modulation module 2025-*a*, and/or a transmitter module 2030-*a*. Each of these components may be in communication with each other.

The components of the device 2005-*a* may be, individually or collectively, implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2010-*a* may be an example of the receiver module 2010 of FIG. 20A. The receiver module 2010-*a* may be or include an RF receiver, such as an RF receiver operable to receive transmissions on two or more hierarchical modulation layers. In some examples, the transmitter module 2030-*a* may be an example of the transmitter module 2030 of FIG. 20A. The transmitter module 2030-*a* may be or include an RF transmitter, such as an RF transmitter operable to transmit data on two or more hierarchical modulation layers. The RF transmitter 2030-*a*, in some examples, may include a single transmitter or a single transmitter per transmit/receive chain. The transmitter module 2030-*a* may be used to transmit various types of data and/or control signals (i.e., transmissions) over one or more communication links of a wireless communications system including two or more hierarchical modulation layers, such as one or more communication links 125 of the wireless communications systems 100, 200, 700, 800, 900, and/or 1800 described with reference to FIGS. 1, 2, 7, 8, 9, and/or 18.

The eNB interference mitigation module 2020-*a* may be an example of the eNB interference mitigation module 2020 described with reference to FIG. 20A and may include a parameter determination module 2060 and a base modulation layer interference cancellation module 2065. Each of these components may be in communication with each other. The parameter determination module 2060 may determine one or more parameters associated with the base modulation layer and/or the enhancement modulation layer for use in interference cancellation. For example, the parameter determination module 2060 may determine one or more of an energy ratio between the base modulation layer and the enhancement modulation layers, an MCS of each of the layers, resource block locations of data transmitted by the UE on one or more of the base modulation layer or the enhancement modulation layer, a precoding matrix used for transmitting on one or more of the base modulation layer or the enhancement modulation layer, layer mapping for one or more of the base modulation layer or the enhancement modulation layer, code block size for one or more of the base modulation layer or the enhancement modulation layer, and/or a number of spatial layers for one or more of the base modulation layer or the enhancement modulation layer. The base modulation layer interference cancellation module 2065 may use one or more parameters provided by parameter determination module 2060 to cancel interference associated with the base modulation layer and provide the resultant signal for decoding of the enhancement modulation layer. Interference cancellation techniques according to various examples may include those as discussed above (e.g., linear MMSE suppression, QR-SD, SIC, etc.).

The eNB hierarchical modulation module 2025-*a* may be an example of the eNB hierarchical modulation module 2025 described with reference to FIG. 20A and may include a base/enhancement modulation layer decoding module 2055. The base/enhancement modulation layer decoding module 2055 may operate to decode content modulated onto the base modulation layer and enhancement modulation layer.

Figure 21:
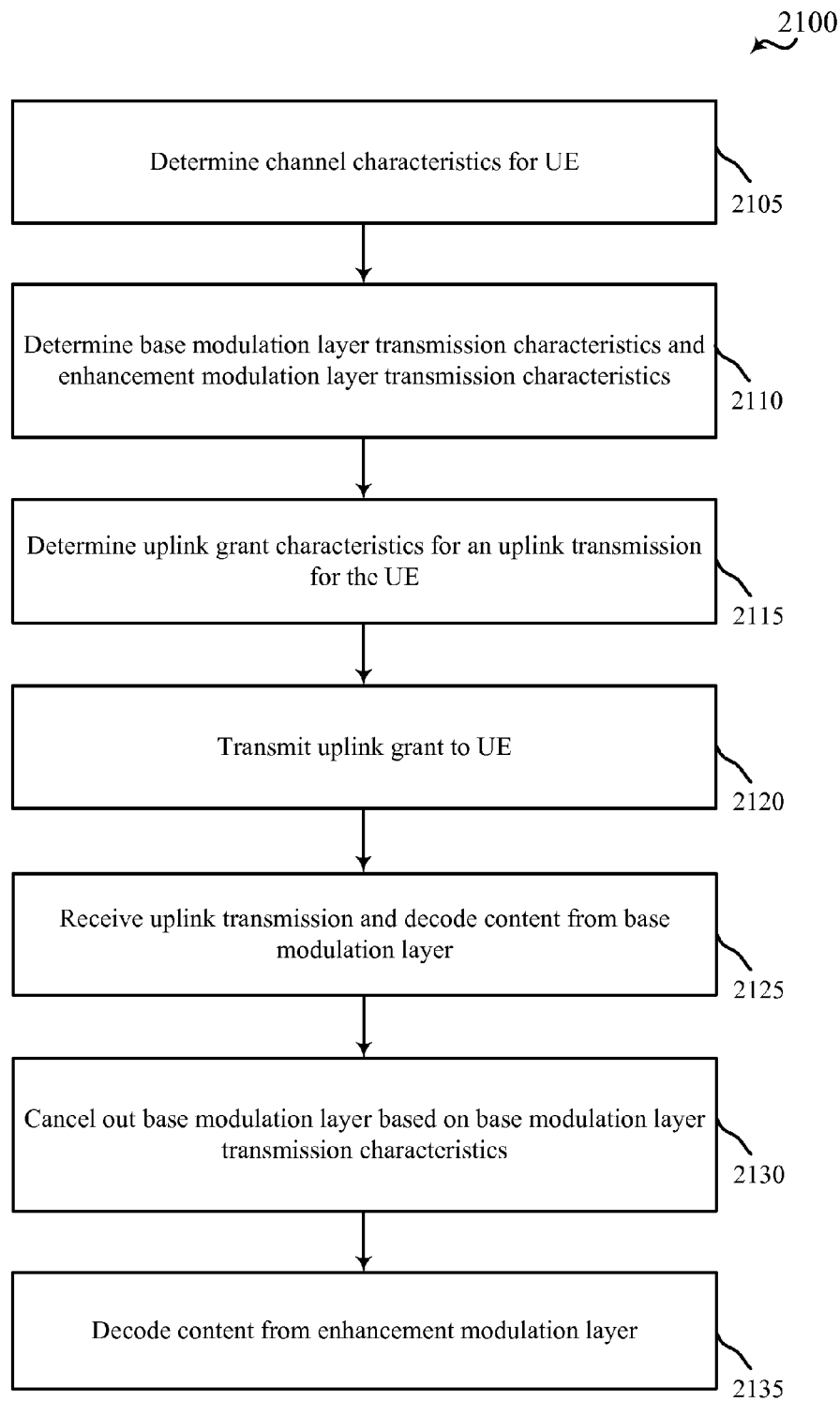
FIG. 21 is a flowchart of a method for hierarchical modulation of content and interference cancellation in a base station according to various examples.

With reference now to FIG. 21, a flowchart conceptually illustrating an example of a method for wireless communication is described in accordance with aspects of the present disclosure. For clarity, the method 2100 is described below with reference to ones of the eNBs or base stations 105 and/or devices 405, 2005 described with reference to FIGS. 1, 2, 4, 7, 8, 9, 10, 18, 20A and/or 20B. In one example, an eNB may execute one or more sets of codes to control the functional elements of the eNB to perform the functions described below.

At block 2105, the eNB may determine channel characteristics of a UE. Such channel characteristics may be determined, for example, based on CSI received from the UE. At block 2110, the eNB may determine base modulation layer transmission characteristics and enhancement modulation layer transmission characteristics. Such characteristics may be determined based on the determined channel characteristics for the UE and/or other information associated with the UE (e.g., capability for hierarchical modulation, RI, transmitted power, etc.). At block 2115, the eNB may determine uplink grant characteristics for an uplink grant for the UE. The uplink grant characteristics may include, in some examples, one or more of an energy ratio between the base modulation layer and the enhancement modulation layer, an MCS of each of the layers, resource block locations of data transmitted by the UE on one or more of the base modulation layer or the enhancement modulation layer, a precoding matrix used for transmitting on one or more of the base modulation layer or the enhancement modulation layer, layer mapping for one or more of the base modulation layer or the enhancement modulation layer, code block size for one or more of the base modulation layer or the enhancement modulation layer, and/or a number of spatial layers for one or more of the base modulation layer or the enhancement modulation layer.

At block 2120, the eNB may transmit one or more uplink grants to the UE. The eNB may, for example, transmit a single uplink grant including an uplink grant for a base modulation layer, a single uplink grant including uplink grant information for both a base modulation layer and an enhancement modulation layer, or separate uplink grants for a base modulation layer and one or more enhancement modulation layers. At block 2125, the eNB may receive an uplink transmission and decode content from the base modulation layer. At block 2130, the eNB may perform interference cancellation techniques on the received signal to mitigate interference in the signal from the base modulation layer. The interference cancellation may be based on, for example, base modulation layer transmission characteristics and enhancement modulation layer characteristics. The interference cancellation techniques may include one or more established interference cancellation techniques such as discussed above. At block 2135, the eNB nay decode content from enhancement modulation layer. Such content may include content that is determined to be sent using the enhancement modulation layer, such as lower priority data or data having a lower transmission data error rate threshold, for example. In some examples, the eNB may perform a HARQ routine on decoded enhancement layer content and transmit an ACK/NACK of receipt of the transmission.

Figure 22:
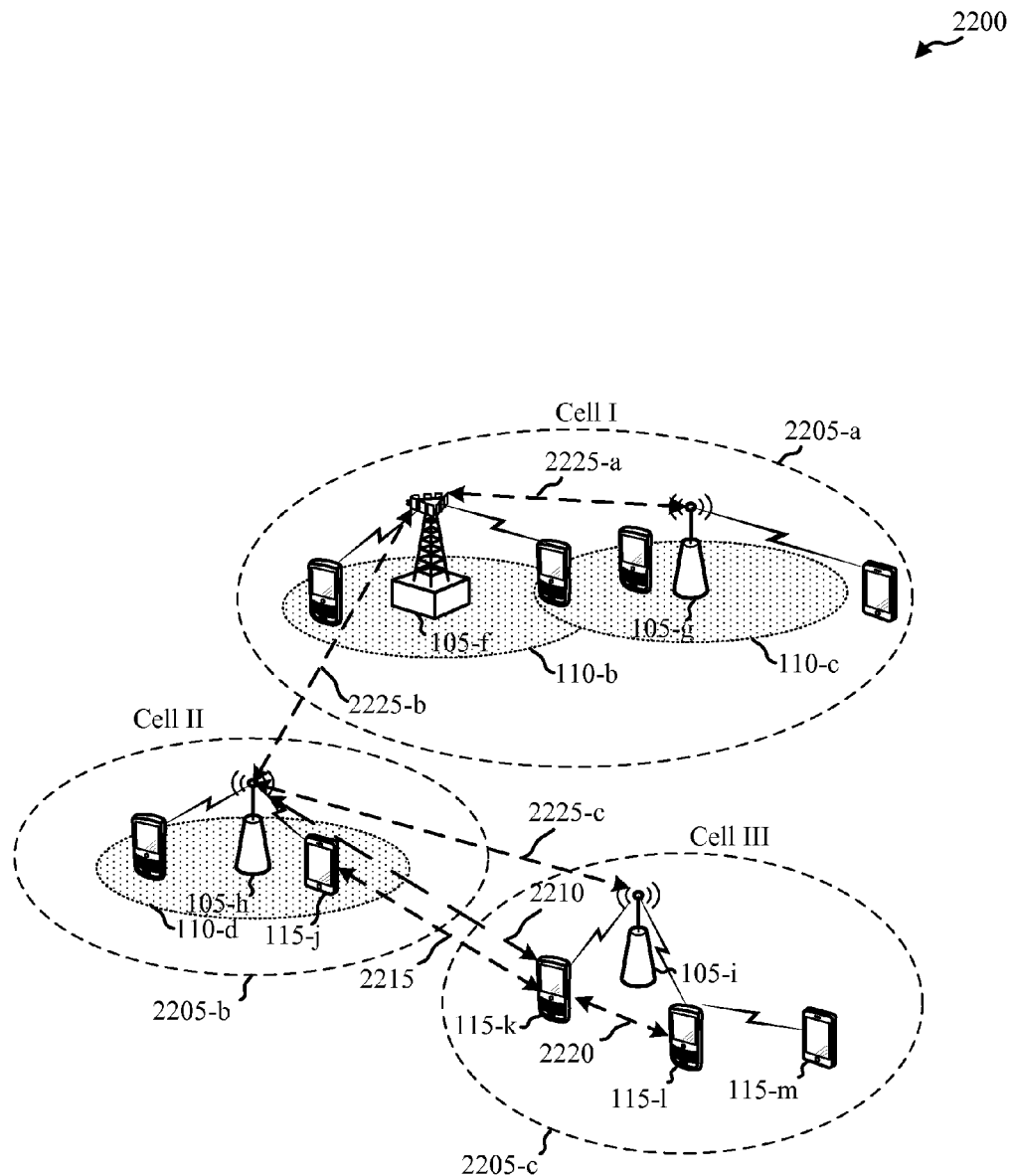
FIG. 22 illustrates a wireless communications system and interference cancellation environment in accordance with various examples.

FIG. 22 illustrates a wireless communications system 2200 having a number of cells (e.g., Cell I 2205-*a*, Cell II 2205-*b*, and Cell III 2205-*c*) and interference cancellation environment in accordance with various aspects of the present disclosure. The wireless communications system 2200 may illustrate, for example, aspects of wireless communications systems 100 and/or 200 illustrated in FIGS. 1 and/or 2. In the example of FIG. 22, each of a number of base stations (e.g., base stations 105-*f*, 105-*g*, 105-*h*, and 105-*i*) may communicate with a number of UEs (e.g., UEs 115-*j*, 115-*k*, 115-*l*, and 115-*m*) within respective coverage areas (e.g., coverage areas 110-*b*, 110-*c*, and 110-*d*) of the base stations. By way of example, Cell I 2205-*c* is shown to include a first base station 105-*f* and a second base station 105-*g*.

Under some scenarios or conditions, there may exist inter-cell interference between the base stations and/or UEs of the wireless communications system 2200. For example, the UE 115-*k* of Cell III 2205-*c* may experience interference 2210 from the base station 105-*h* of Cell II 2205-*b*. By way of example, the interference 2210 may be a result of reference signal transmissions (e.g., primary synchronization signal (PSS), secondary synchronization signal (SSS), cell-specific reference signal (CRS), positioning reference signal (PRS), CSI reference signal (CSI-RS), or UE-specific reference signal (UE-RS) transmissions) of the base station 105-*h* or control and data channel transmissions (e.g., PBCH, PCFICH, PHICH, PDCCH, ePDCCH, or PDSCH) of the base station 105-*h*. LTE systems already implement a variety of methods to cancel these types of interference (e.g., RS-IC, control-IC, and data-IC).

The UE 115-k of Cell III 2205-c may also or alternately experience interference 2215 from the UE 115-j of Cell II 2205-b. By way of example, the interference 2215 may be a result of enhanced interference management and traffic adaptation (eIMTA), which may result in uplink subframe transmissions from the UE 115-j to the base station 105-h during the reception of downlink subframes at the UE 115-k (e.g., the reception of downlink subframes transmitted to the UE 115-k by the base station 105-i).

As another example of inter-cell interference at a UE, consider the receipt of downlink subframes at the UE 115-j of Cell II 2205-b. When the UE 115-k of Cell III 2205-c makes a device-to-device (D2D) transmission 2220 to another node (e.g., to another UE (e.g., the UE 115-l), to a WLAN access point, etc.) while the UE 115-j is receiving a downlink subframe from the base station 105-h, the UE 115-j may experience interference 2215 from the D2D transmission 2220.

When the Cell I 2205-a, Cell II 2205-b, and Cell III 2205-c are operated by a common operator, neighboring cell base stations 105-f, 105-g, 105-h, and 105-i may communicate with one another over communication links 2225-a, 2225-b, and 2225-c (e.g., X2 backhaul links).

Figure 23:
FIG. 23 illustrates time division duplex uplink/downlink configurations in a wireless communications system in accordance with various examples.

FIG. 23 shows a table 2300 of various TDD uplink-downlink (UL/DL) configurations (e.g., configurations 0, 1, 2, 3, 4, 5, and 6) used for a frame of communications in an LTE system. Downlink subframes are indicated in the figure by a "D," uplink subframes are indicated by a "U," and special subframes are indicated by an "S." The UL/DL configurations may be classified, in one respect, based on their downlink-to-uplink switch-point periodicity. More specifically, configurations 0, 1, 2, and 6 are characterized by a downlink-to-uplink switch-point periodicity of 5 milliseconds (ms), whereas configurations 3, 4, and 5 are characterized by a downlink-to-uplink switch-point periodicity of 10 ms.

When an operator employs eIMTA, different cells of the operator may employ different TDD UL/DL configurations for the same frame of communications. Assuming the cells operate synchronously, all of the cells may communicate the same type of subframe (e.g., a D subframe, a U subframe, or an S subframe) during subframe numbers 0, 1, 2, and 5. However, different cells employing different TDD UL/DL configurations may communicate different types of subframes during subframe numbers 3, 4, 6, 7, 8, and 9. When different cells communicate different types of subframes during a single subframe number (e.g., when one cell is communicating a D subframe while another cell is communicating a U subframe), the likelihood of inter-cell interference may increase.

Figure 24:
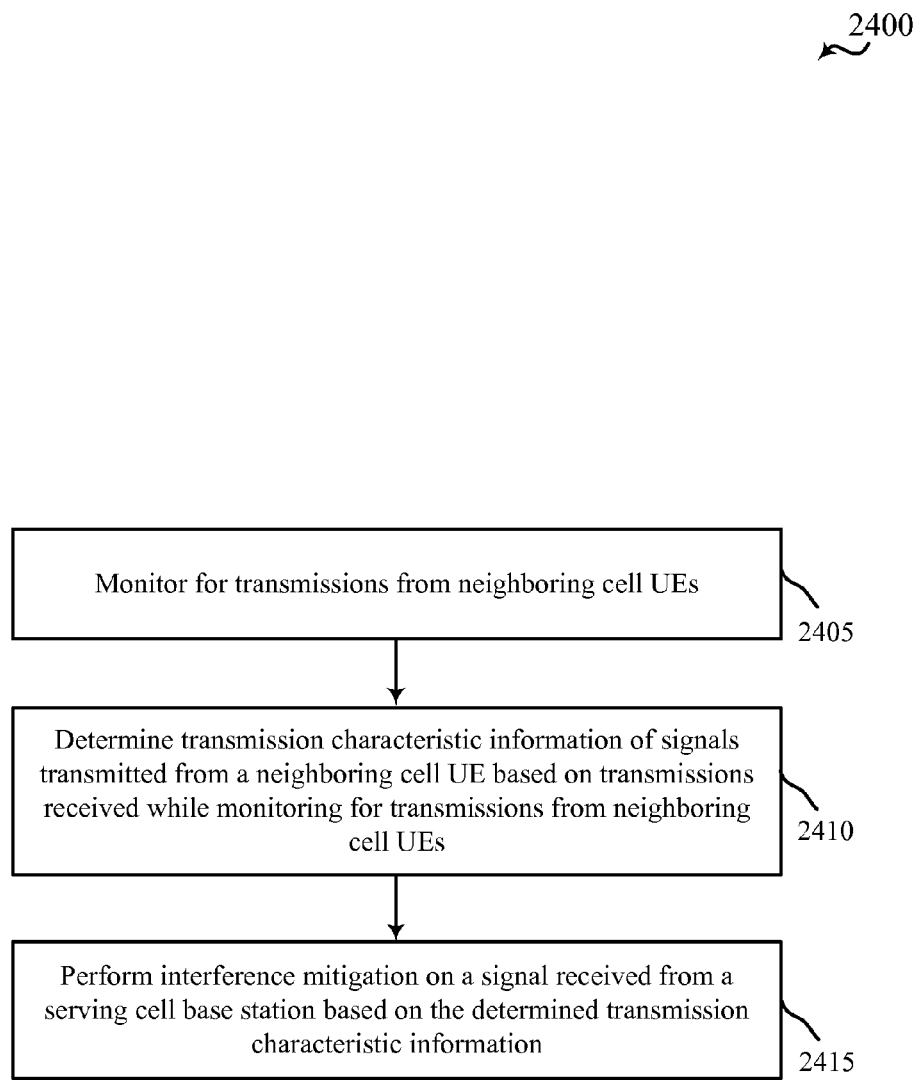
FIG. 24 is a flowchart of a method for inter-cell interference mitigation according to various examples.

With reference now to FIG. 24, a flowchart conceptually illustrating an example of a method 2400 of wireless communication at a UE is described in accordance with aspects of the present disclosure. FIG. 24 illustrates an example of a method for inter-cell interference mitigation. For clarity, the method 2400 is described below with reference to ones of the base stations, eNBs 105, and/or UEs 115, and/or 115 described with reference to FIGS. 1 and/or 2. In one example, a UE or other device may execute one or more sets of codes to control the functional elements of the UE or other device to perform the functions described below.

At blocks 2405 and/or 2410, a UE may determine transmission characteristic information of signals transmitted from a neighboring cell UE. More particularly, and at block 2405, a UE may monitor for transmissions from neighboring cell UEs. In some cases, the monitored transmissions may include uplink subframes transmitted from a neighboring cell UE to a neighboring cell base station according to a different TDD UL/DL configuration from a TDD UL/DL configuration used by a serving cell base station for the UE. The TDD UL/DL configuration used by the neighboring cell UE may include at least one uplink subframe transmitted from the neighboring cell UE to the neighboring cell base station during a downlink subframe transmitted from the serving cell base station to the UE, which uplink subframe transmitted from the neighboring cell UE to the neighboring cell base station may interfere with transmission of the downlink subframe from the serving cell base station to the UE. In other cases, the monitored transmissions may include at least one D2D transmission from the neighboring cell UE to another neighboring cell node (e.g., to another neighboring cell UE, to a WLAN access point, etc.). The at least one D2D transmission from the neighboring cell UE may be transmitted during a downlink subframe transmitted from the serving cell base station to the UE.

At block 2410, transmission characteristic information of signals transmitted from a neighboring cell UE may be determined. In some examples, the transmission characteristic information may include one or more of modulation order, number of spatial layers, or precoding information. In some cases, the transmission characteristic information may be determined based on transmissions received while monitoring for transmissions from neighboring cell UEs (e.g., the transmission characteristic information may be blindly detected from the received transmissions).

At block 2415, interference mitigation (e.g., interference cancellation) may be performed on a signal received at the UE from the serving cell base station. The interference mitigation may be performed based on the determined transmission characteristic information.

Figure 25:
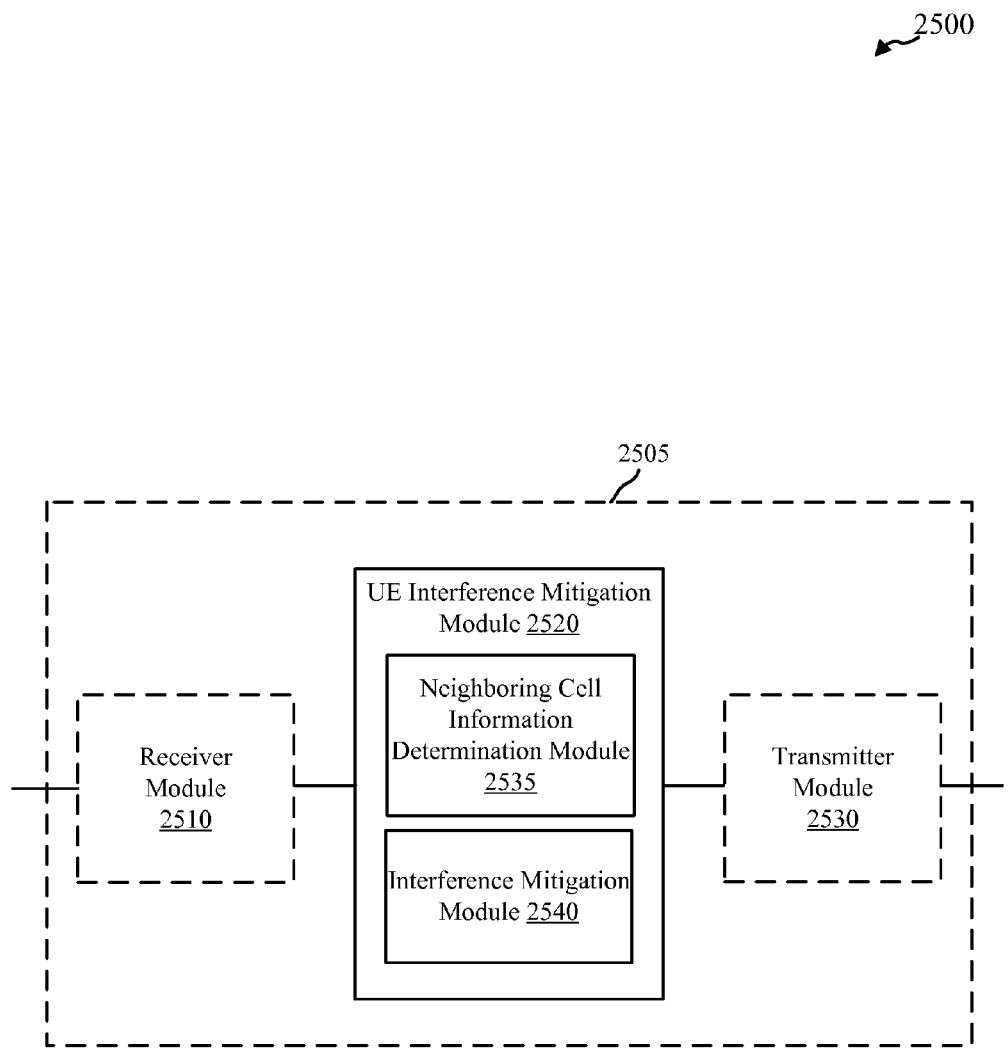
FIG. 25 is a block diagram of a device that may be used for inter-cell interference mitigation at a user equipment in accordance with various examples.

FIG. 25 is a block diagram conceptually illustrating a device 2505, such as a UE, for use in wireless communications in accordance with aspects of the present disclosure. The device 2505 may be used for inter-cell interference mitigation in accordance with various examples. In some examples, the device 2505 may be an example of one or more aspects of the UEs 115 described with reference to FIGS. 1 and/or 2. The device 2505 may also be a processor. The device 2505 may include a receiver module 2510, a UE interference mitigation module 2520, and/or a transmitter module 2530. Each of these components may be in communication with each other.

The components of the device 2505 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2510 may be or include an RF receiver, such as an RF receiver operable to receive transmissions on two or more hierarchical modulation layers. The receiver module 2510 may be used to receive various types of data and/or control signals (i.e., transmissions) over one or more communication links of a wireless communications system, such as one or more communication links 125 of the wireless communications systems 100 and/or 200 described with reference to FIGS. 1 and/or 2.

In some examples, the transmitter module 2530 may be or include an RF transmitter, such as an RF transmitter operable to transmit on two or more hierarchical modulation layers (e.g., through a base modulation layer and one or more enhancement modulation layers). The transmitter module 2530 may be used to transmit various types of data and/or control signals (i.e., transmissions) over one or more communication links of a wireless communications system, such as one or more communication links 125 of the wireless communications systems 100 and/or 200 described with reference to FIGS. 1 and/or 2.

In some examples, the UE interference mitigation module 2520 may include a neighboring cell information determination module 2535 and/or an interference mitigation module 2540.

In some examples, the neighboring cell information determination module 2535 may be used to determine transmission characteristic information of signals transmitted from a neighboring cell UE. In some cases, the signals transmitted from the neighboring cell UE may include uplink subframes transmitted from a neighboring cell UE to a neighboring cell base station according to a different TDD UL/DL configuration from a TDD UL/DL configuration used by a serving cell base station for the device 2505. The TDD UL/DL configuration used by the neighboring cell UE may include at least one uplink subframe transmitted from the neighboring cell UE to the neighboring cell base station during a downlink subframe transmitted from the serving cell base station to the device 2505, which uplink subframe transmitted from the neighboring cell UE to the neighboring cell base station may interfere with transmission of the downlink subframe from the serving cell base station to the device 2505. In other cases, the signals transmitted from the neighboring cell UE may include at least one D2D transmission from the neighboring cell UE to another neighboring cell node (e.g., to another neighboring cell UE, to a WLAN access point, etc.). The at least one D2D transmission from the neighboring cell UE may be transmitted during a downlink subframe transmitted from the serving cell base station to the device 2505.

In some examples, the transmission characteristic information determined by the neighboring cell information determination module 2535 may include one or more of modulation order, number of spatial layers, or precoding information.

In some examples, the neighboring cell information determination module 2535 may monitor for transmissions from neighboring cell UEs and determine the transmission characteristic information of the signals transmitted from a neighboring cell UE based on transmissions received while monitoring for the transmissions from neighboring cell UEs.

In some examples, the neighboring cell information determination module 2535 may monitor for transmissions from neighboring cell base stations (e.g., base stations of eNBs) and determine the transmission characteristic information of the signals transmitted from the neighboring cell UE based on transmissions received while monitoring for transmissions from neighboring cell base stations. In some cases, the monitoring may include monitoring a PDCCH of a neighboring cell base station. In some cases, monitoring the PDCCH of the neighboring cell base station may include decoding uplink grant information (e.g., uplink grants) for a neighboring cell UE, and the transmission characteristic information of the signals transmitted from the neighboring cell UE may be determined based on uplink grant information for uplink transmissions from the neighboring cell UE, where the uplink grant information is received while monitoring for the transmissions from neighboring cell base stations.

In some examples, the neighboring cell information determination module 2535 may receive transmission characteristic information of signals transmitted from a neighboring cell UE from a serving cell base station for the device 2505. The serving cell base station may receive the transmission characteristic information from a central scheduler in communication with both the serving cell base station and a neighboring cell base station, as described in more detail with reference to FIGS. 27 and/or 29.

In some examples, the interference mitigation module 2540 may be used to perform interference mitigation (e.g., interference cancellation) on a signal received at the device 2505 from its serving cell base station. The interference mitigation may be performed based on the determined transmission characteristic information.

Figure 26:
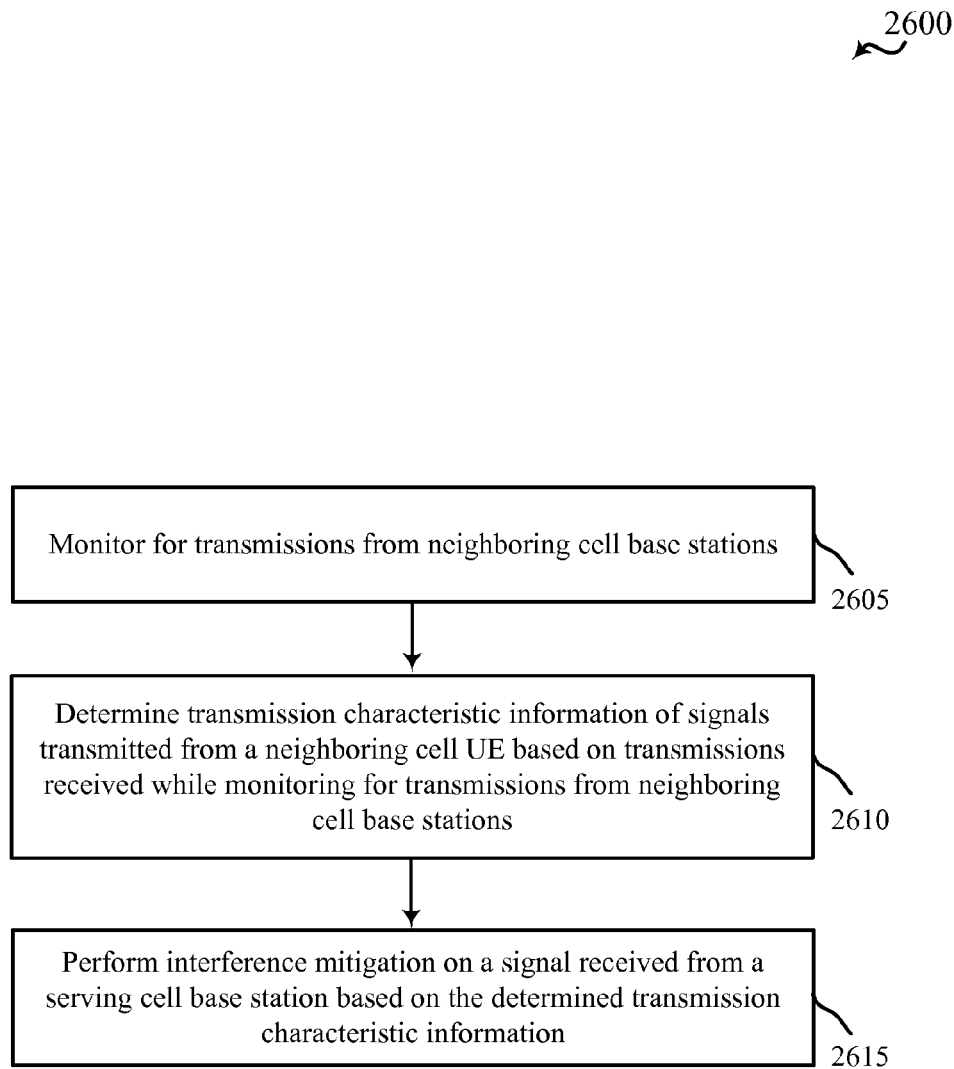
FIG. 26 is another flowchart of a method for inter-cell interference mitigation according to various examples.

With reference now to FIG. 26, a flowchart conceptually illustrating an example of a method 2600 for wireless communication at a UE is described in accordance with aspects of the present disclosure. FIG. 26 illustrates an example of a method for inter-cell interference mitigation in a wireless communications system. For clarity, the method 2600 is described below with reference to ones of the base stations, eNBs, 105 and/or UEs 115 described with reference to FIGS. 1 and/or 2. In one example, a UE or other device may execute one or more sets of codes to control the functional elements of the UE or other device to perform the functions described below.

At blocks 2605 and/or 2610, a UE may determine transmission characteristic information of signals transmitted from a neighboring cell UE. More particularly, and at block 2605, a UE may monitor for transmissions from neighboring cell base stations (e.g., base stations of eNBs). In some cases, the monitoring may include monitoring a PDCCH of a neighboring cell base station. In some cases, monitoring the PDCCH of the neighboring cell base station may include decoding uplink grant information (e.g., uplink grants) for a neighboring cell UE.

At block 2610, transmission characteristic information of signals transmitted from a neighboring cell UE may be determined. In some examples, the transmission characteristic information may include one or more of modulation order, number of spatial layers, or precoding information. In some cases, the transmission characteristic information may be determined based on the transmissions received while monitoring for transmissions from neighboring cell base stations (e.g., based on uplink grant information for uplink transmissions from the neighboring cell UE, where the uplink grant information is received while monitoring for the transmissions from neighboring cell base stations).

The signals transmitted from the neighboring cell UE, for which the transmission characteristic information is determined, may include, for example, uplink subframes transmitted from a neighboring cell UE to a neighboring cell base station according to a different TDD UL/DL configuration from a TDD UL/DL configuration used by a serving cell base station for the UE. For example, the TDD UL/DL configuration used by the neighboring cell UE may include at least one uplink subframe transmitted from the neighboring cell UE to the neighboring cell base station during a downlink subframe transmitted from the serving cell base station to the UE, which uplink subframe transmitted from the neighboring cell UE to the neighboring cell base station may interfere with transmission of the downlink subframe from the serving cell base station to the UE. The signals transmitted from the neighboring cell UE may also or alternately include at least one D2D transmission from the neighboring cell UE to another neighboring cell node (e.g., to another neighboring cell UE, to a WLAN access point, etc.). In some examples, the at least one D2D transmission from the neighboring cell UE may be transmitted during a downlink subframe transmitted from the serving cell base station to the UE.

At block 2615, interference mitigation (e.g., interference cancellation) may be performed on a signal received at the UE from the serving cell base station. The interference mitigation may be performed based on the determined transmission characteristic information.

Figure 27:
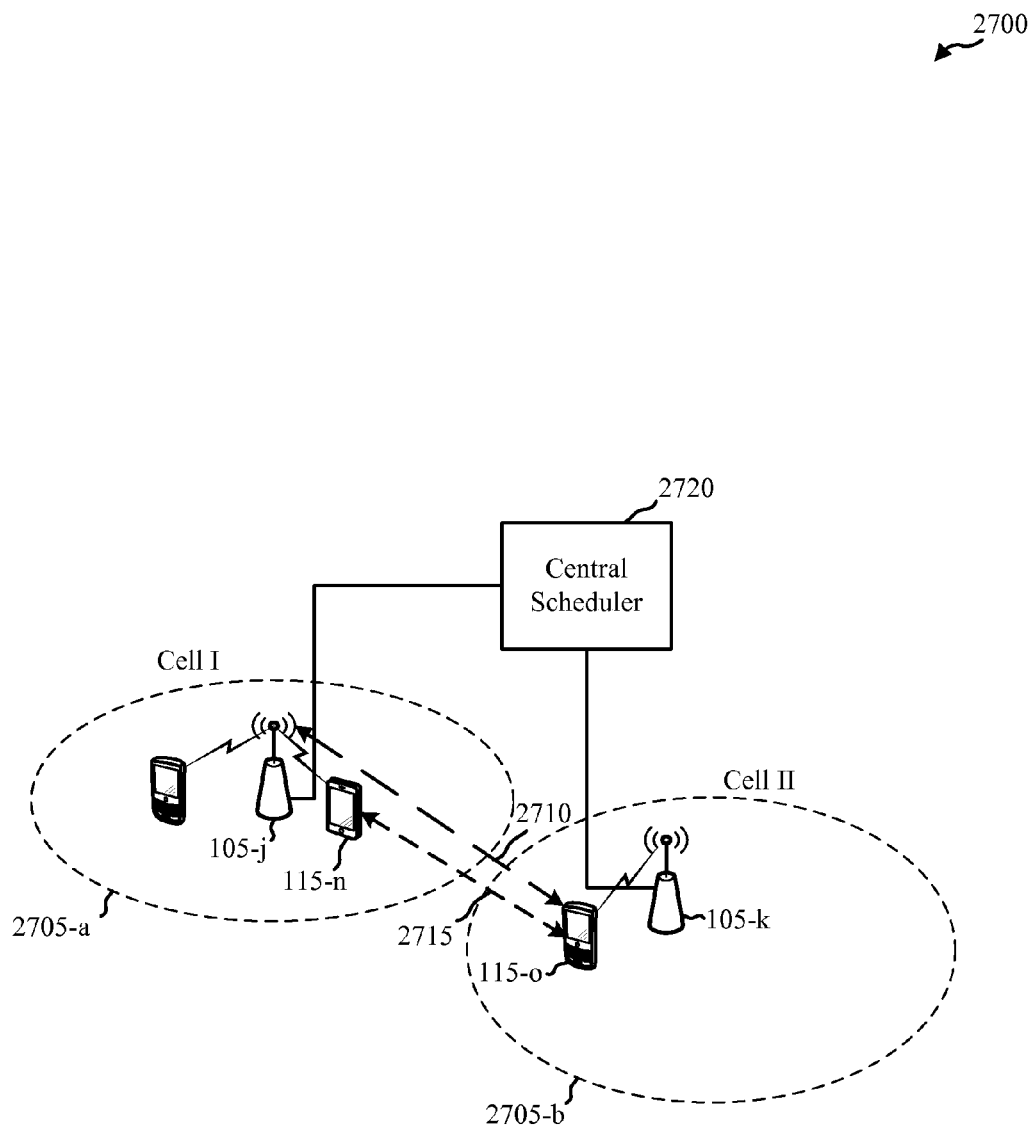
FIG. 27 illustrates a wireless communications system and interference mitigation environment in accordance with various examples.

FIG. 27 illustrates a wireless communications system 2700 having a number of cells (e.g., Cell I 2705-*a* and Cell II 2705-*b*) and interference mitigation environment in accordance with various aspects of the present disclosure. The wireless communications system 2700 may illustrate, for example, aspects of wireless communications systems 100 and/or 200 illustrated in FIGS. 1 and/or 2. In the example of FIG. 27, each of a number of base stations (e.g., base stations 105-*j* and 105-*k*) may communicate with a number of UEs (e.g., UEs 115-*n* and 115-*o*) within respective coverage areas of the base stations.

Under some scenarios or conditions, there may exist inter-cell interference between the base stations and/or UEs of the wireless communications system 2700. For example, the UE 115-*o* of Cell II 2705-*b* may experience interference 2710 from the base station 105-*j* of Cell I 2705-*a*. By way of example, the interference 2710 may be a result of reference signal transmissions (e.g., PSS, SSS, CRS, PRS, CSI-RS, or UE-RS transmissions) of the base station 105-*j* or control and data channel transmissions (e.g., PBCH, PCFICH, PHICH, PDCCH, ePDCCH, or PDSCH) of the base station 105-*j*. As previously mentioned, LTE systems already implement a variety of methods to cancel these types of interference (e.g., RS-IC, control-IC, and data-IC).

The UE 115-*o* of Cell II 2705-*b* may also or alternately experience interference 2715 from the UE 115-*n* of Cell I 2705-*a*. By way of example, the interference 2715 may be a result of eIMTA, which may result in uplink subframe transmissions from the UE 115-*n* to the base station 105-*j* during the reception of downlink subframes at the UE 115-*o* (e.g., the reception of downlink subframes transmitted to the UE 115-*o* by the base station 105-*k*).

When the Cell I 2705-*a* and the Cell II 2705-*b* are operated by a common operator, the base stations 105-*j* and 105-*k* of the cells may communicate with one another over a communication link such as one of the X2 backhaul links described with reference to FIGS. 1 and/or 2. In some embodiments, an X2 backhaul link between the base station 105-*j* and 105-*k* may be used to share information (e.g., transmission characteristic information) usable by the base stations 105-*j* and 105-*k* to mitigate the interference 2710 and 2715. In some cases, the shared information may include uplink grant information. The uplink grant information may be used to determine when the base station of one cell (e.g., the base station 105-*k* of Cell II 2705-*b*) is transmitting a downlink subframe to a UE (e.g., the UE 115-*o*) while a base station of another cell (e.g., the base station 105-*j* of Cell I 2705-*a*) is receiving an uplink subframe from a UE (e.g., the UE 115-*n*), which simultaneous transmissions of subframes may cause inter-cell interference. In other embodiments, a central scheduler 2720 with which the base stations 105-*j* and 105-*k* are in communication may share transmission characteristic information of one of the base stations with the other of the base stations.

Figure 28:
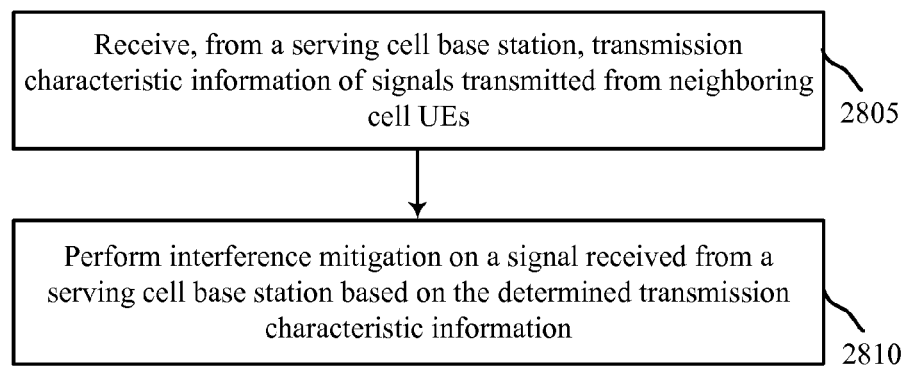
FIG. 28 is another flowchart of a method for inter-cell interference mitigation according to various examples.

With reference now to FIG. 28, a flowchart conceptually illustrating an example of a method for wireless communication 2800 at a UE is described in accordance with aspects of the present disclosure. FIG. 28 illustrates another example of a method for inter-cell interference mitigation in a wireless communications system. For clarity, the method 2800 is described below with reference to ones of the base stations, eNBs, 105 and/or UEs 115 described with reference to FIGS. 1 and/or 2. In one example, a UE or other device may execute one or more sets of codes to control the functional elements of the UE or other device to perform the functions described below.

At block 2805, a UE may determine transmission characteristic information of signals transmitted from a neighboring cell UE. In some examples, the transmission characteristic information may be determined by receiving the transmission characteristic information from a serving cell base station for the UE. In some examples, the transmission characteristic information may include one or more of modulation order, number of spatial layers, or precoding information.

The signals transmitted from the neighboring cell UE, for which the transmission characteristic information is determined, may include, for example, uplink subframes transmitted from the neighboring cell UE to a neighboring cell base station according to a different TDD UL/DL configuration from a TDD UL/DL configuration used by a serving cell base station for the UE. For example, the TDD UL/DL configuration used by the neighboring cell UE may include at least one uplink subframe transmitted from the neighboring cell UE to the neighboring cell base station during a downlink subframe transmitted from the serving cell base station to the UE, which uplink subframe transmitted from the neighboring cell UE to the neighboring cell base station may interfere with transmission of the downlink subframe from the serving cell base station to the UE. The signals transmitted from the neighboring cell UE may also or alternately include at least one D2D transmission from the neighboring cell UE to another neighboring cell node (e.g., to another neighboring cell UE, to a WLAN access point, etc.). In some examples, the at least one D2D transmission from the neighboring cell UE may be transmitted during a downlink subframe transmitted from the serving cell base station to the UE.

At block 2810, interference mitigation (e.g., interference cancellation) may be performed on a signal received at the UE from the serving cell base station. The interference mitigation may be performed based on the determined transmission characteristic information.

Figure 29:
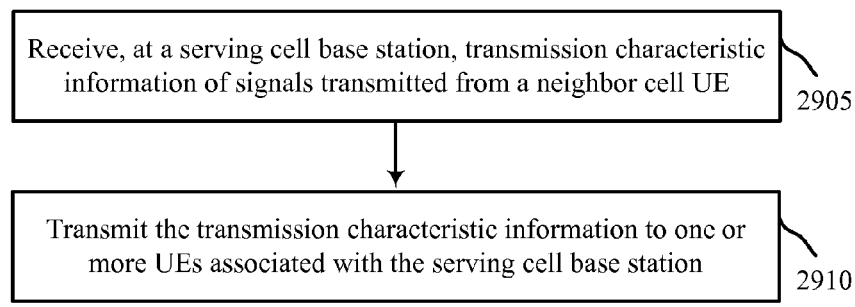
FIG. 29 is another flowchart of a method for inter-cell interference mitigation according to various examples.

With reference now to FIG. 29, a flowchart conceptually illustrating an example of a method 2900 for wireless communication at a UE is described in accordance with various aspects of the present disclosure. FIG. 29 shows another example of a method for inter-cell interference mitigation in a wireless communications system. For clarity, the method 2900 is described below with reference to ones of the base stations, eNBs, 105 and/or UEs 115 described with reference to FIGS. 1 and/or 2. In one example, a base station, eNB, or other device may execute one or more sets of codes to control the functional elements of the base station, eNB, or other device to perform the functions described below.

At block 2905, a serving cell base station may receive transmission characteristic information of signals transmitted from a neighboring cell UE. The transmission characteristic information may be received, for example, through an X2 backhaul link with a neighboring cell base station and/or from a central scheduler in communication with both the serving cell base station and the neighboring cell base station.

The signals transmitted from the neighboring cell UE, for which the transmission characteristic information is determined, may include, for example, uplink subframes transmitted from a neighboring cell UE to a neighboring cell base station according to a different TDD UL/DL configuration from a TDD UL/DL configuration used by a serving cell base station for the UE. For example, the TDD UL/DL configuration used by the neighboring cell UE may include at least one uplink subframe transmitted from the neighboring cell UE to the neighboring cell base station during a downlink subframe transmitted from the serving cell base station to a UE associated with the serving cell base station, which uplink subframe transmitted from the neighboring cell UE to the neighboring cell base station may interfere with transmission of the downlink subframe from the serving cell base station to the UE. The signals transmitted from the neighboring cell UE may also or alternately include at least one D2D transmission from the neighboring cell UE to another neighboring cell node (e.g., to another neighboring cell UE, to a WLAN access point, etc.). In some examples, the at least one D2D transmission from the neighboring cell UE may be transmitted during a downlink subframe transmitted from the serving cell base station to a UE. In some examples, the transmission characteristic information may include one or more of modulation order, number of spatial layers, or precoding information.

At block 2910, the serving cell base station may transmit the transmission characteristic information to one or more UEs associated with the serving cell base station. A UE may then use the transmission characteristic information to perform interference mitigation (e.g., interference cancellation) on a signal received at the UE from the serving cell base station.

Figure 30:
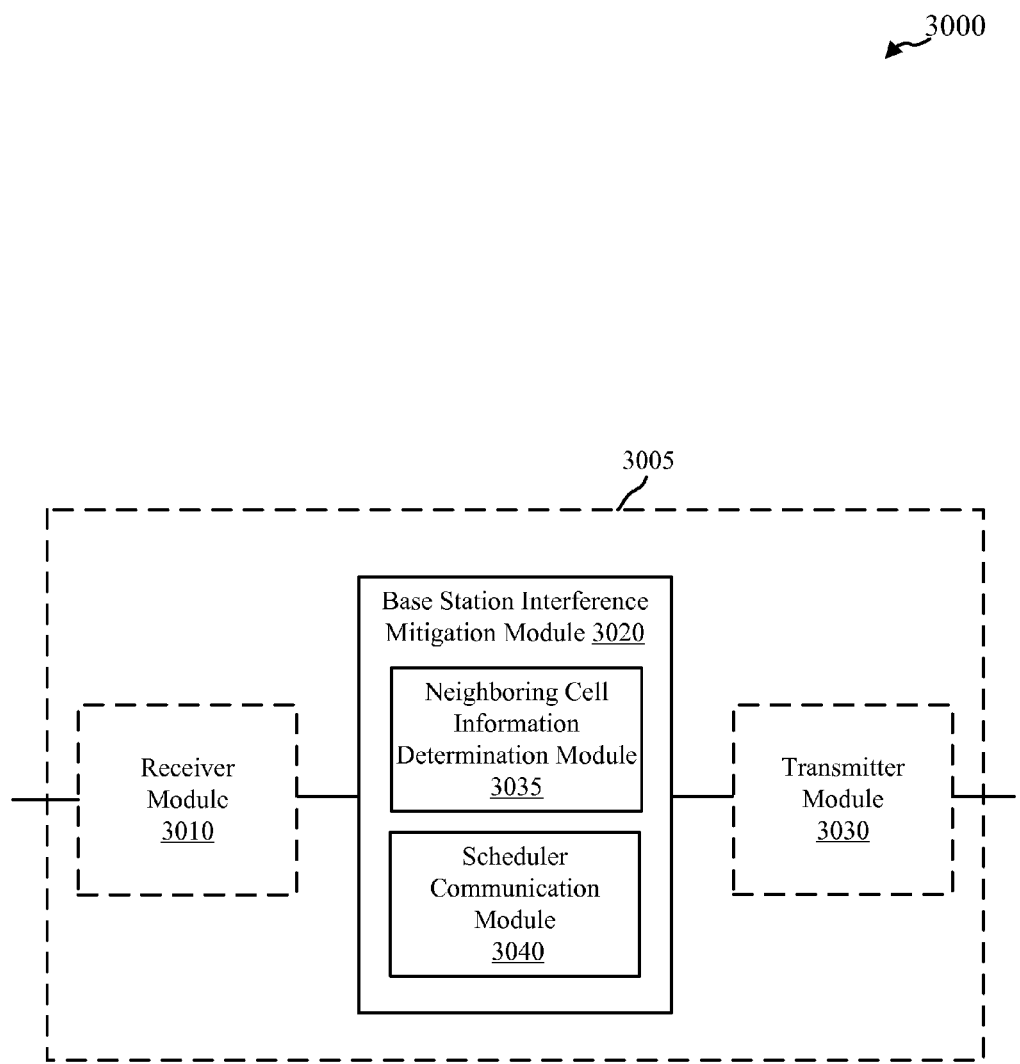
FIG. 30 is a block diagram of a device that may be used for inter-cell interference mitigation at a user equipment in accordance with various examples.

FIG. 30 is a block diagram conceptually illustrating an apparatus 3005, such as a base station or eNB, for use in wireless communications in accordance with various aspects of the present disclosure. In some examples, the apparatus 3005 may be an example of one or more aspects of the base stations or eNBs 105 described with reference to FIGS. 1 and/or 2. The apparatus 3005 may also be a processor. The apparatus 3005 may include a receiver module 3010, a base station interference mitigation module 3020, and/or a transmitter module 3030. Each of these components may be in communication with each other.

The components of the apparatus 3005 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 3010 may be or include an RF receiver, such as an RF receiver operable to receive transmissions on two or more hierarchical modulation layers. The receiver module 3010 may be used to receive various types of data and/or control signals (i.e., transmissions) over one or more communication links of a wireless communications system, such as one or more communication links 125 of the wireless communications systems 100 and/or 200 described with reference to FIGS. 1 and/or 2.

In some examples, the transmitter module 3030 may be or include an RF transmitter, such as an RF transmitter operable to transmit on two or more hierarchical modulation layers (e.g., through a base modulation layer and one or more enhancement modulation layers). The transmitter module 3030 may be used to transmit various types of data and/or control signals (i.e., transmissions) over one or more communication links of a wireless communications system, such as one or more communication links 125 of the wireless communications systems 100 and/or 200 described with reference to FIGS. 1 and/or 2.

In some examples, the base station interference mitigation module 3020 may include a neighboring cell information determination module 3035 and/or a scheduler communication module 3040.

In some examples, the base station interference mitigation module 3020 may receive transmission characteristic information of signals transmitted from a neighboring cell UE. The transmission characteristic information may be received, for example, through an X2 backhaul link with a neighboring cell base station and/or from a central scheduler in communication with both the apparatus 3005 and the neighboring cell base station.

In some examples, the received transmission characteristic information may be transmission characteristic information of signals transmitted from a neighboring cell UE. In some cases, the signals transmitted from the neighboring cell UE may include uplink subframes transmitted from a neighboring cell UE to a neighboring cell base station according to a different TDD UL/DL configuration from a TDD UL/DL configuration used by the apparatus 3005. The TDD UL/DL configuration used by the neighboring cell UE may include at least one uplink subframe transmitted from the neighboring cell UE to the neighboring cell base station during a downlink subframe transmitted from the apparatus 3005 to a UE associated with the apparatus 3005, which uplink subframe transmitted from the neighboring cell UE to the neighboring cell base station may interfere with transmission of the downlink subframe from the apparatus 3005 to the UE. In other cases, the transmission characteristic information received by the neighboring cell information determination module 3035 may be transmission characteristic information of at least one D2D transmission from a neighboring cell UE to another neighboring cell node (e.g., to another neighboring cell UE, to a WLAN access point, etc.). The at least one D2D transmission from the neighboring cell UE may be transmitted during a downlink subframe transmitted from the apparatus 3005 to a UE.

In some examples, the transmission characteristic information received by the neighboring cell information determination module 3035 may include one or more of modulation order, number of spatial layers, or precoding information.

In some examples, the neighboring cell information determination module 3035 may also or alternately receive information from which transmission characteristic information of signals transmitted from a neighboring cell UE may be determined.

The scheduler communication module 3040 may be employed by the base station interference mitigation module 3020 to communicate with a central scheduler and relay transmission characteristic information to the neighboring cell information determination module 3035.

Upon receiving and/or determining the transmission characteristic information of signals transmitted from a neighboring cell UE, the base station interference mitigation module 3020 may transmit the transmission characteristic information to one or more UEs associated with the apparatus 3005. A UE may then use the transmission characteristic information to perform interference mitigation (e.g., interference cancellation) on a signal (e.g., a downlink subframe) received at the UE from the apparatus 3005.

Figure 31:
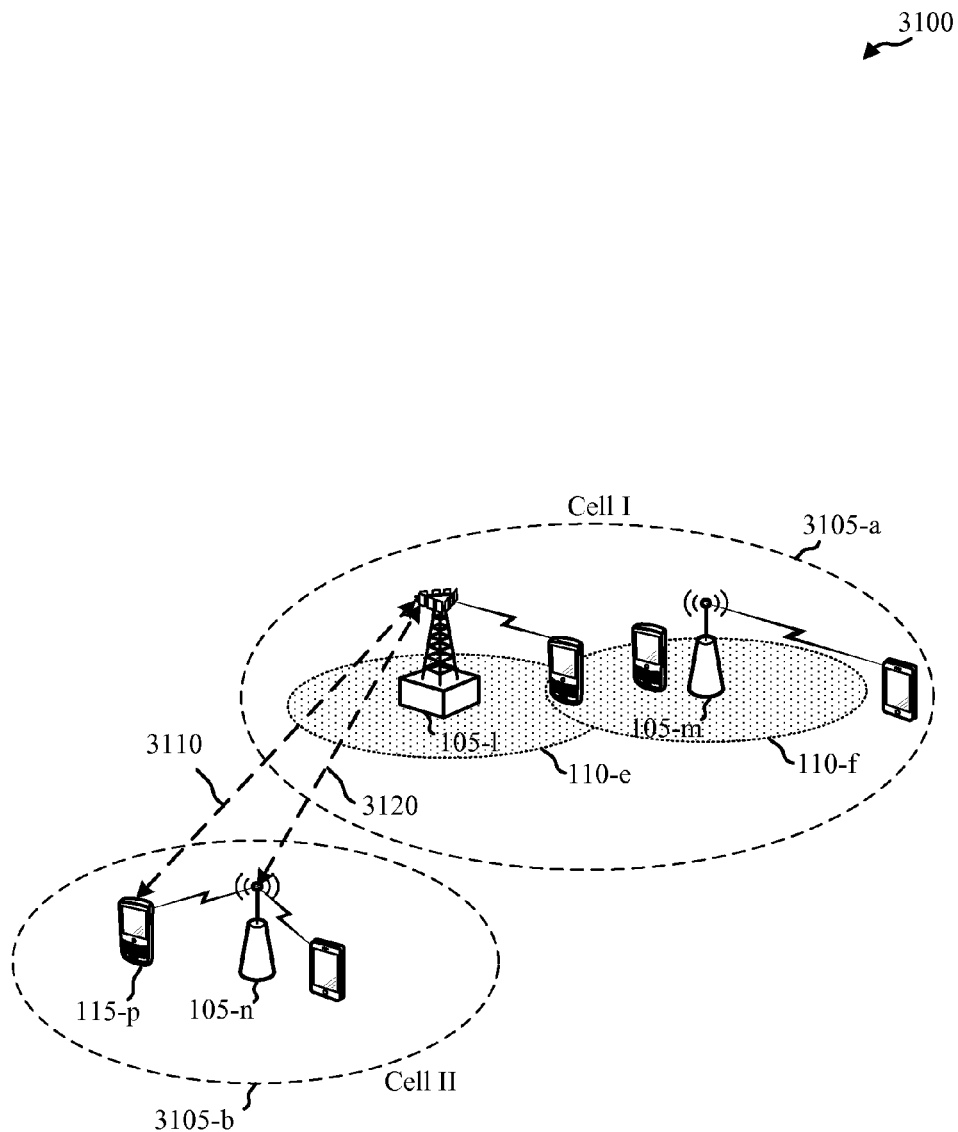
FIG. 31 illustrates another wireless communications system and interference mitigation environment in accordance with various examples.

FIG. 31 illustrates another wireless communications system 3100 having a number of cells (e.g., Cell I 3105-a and Cell II 3105-b) and interference mitigation environment in accordance with various aspects of the present disclosure. The wireless communications system 3100 may illustrate, for example, aspects of wireless communications systems 100 and/or 200 illustrated in FIGS. 1 and/or 2. In the example of FIG. 31, each of a number of base stations (e.g., base stations 105-l, 105-m, and 105-n) may communicate with a number of UEs (e.g., UE 115-p) within respective coverage areas (e.g., coverage areas 110-e and 110-f) of the base stations. By way of example, Cell I 3105-a is shown to include a first base station 105-l and a second base station 105-m.

Under some scenarios or conditions, there may exist inter-cell interference between the base stations and/or UEs of the wireless communications system 3100. For example, the base station 105-l of Cell I 3105-a may experience interference 3110 from the UE 115-p of Cell II 3105-b. By way of example, the interference 3110 may be a result of control channel transmissions (e.g., physical random access channel (PRACH), PUCCH, or sounding reference signal (SRS) transmissions) or data channel transmissions (e.g., PUSCH transmissions) of the UE 115-p. LTE systems already implement a variety of methods to cancel these types of interference (e.g., PRACH interference cancellation (PRACH-IC), PUCCH-IC, and PUSCH-IC).

The base station 105-l of Cell I 3105-a may also or alternately experience interference 3120 from the base station 105-n of Cell II 3105-b. By way of example, the interference 3120 may be a result of eIMTA, which may result in downlink subframe transmissions from the base station 105-n of Cell II 3105-b while the base station 105-l of Cell I 3105-a is receiving an uplink subframe transmitted from one or more of the UEs for which it serves as a serving cell base station.

When Cell I 3105-a and Cell II 3105-b are operated by a common operator, the base stations 105-l, 105-m, and 105-n may communicate with one another over communication links such as X2 backhaul links.

Figure 32:
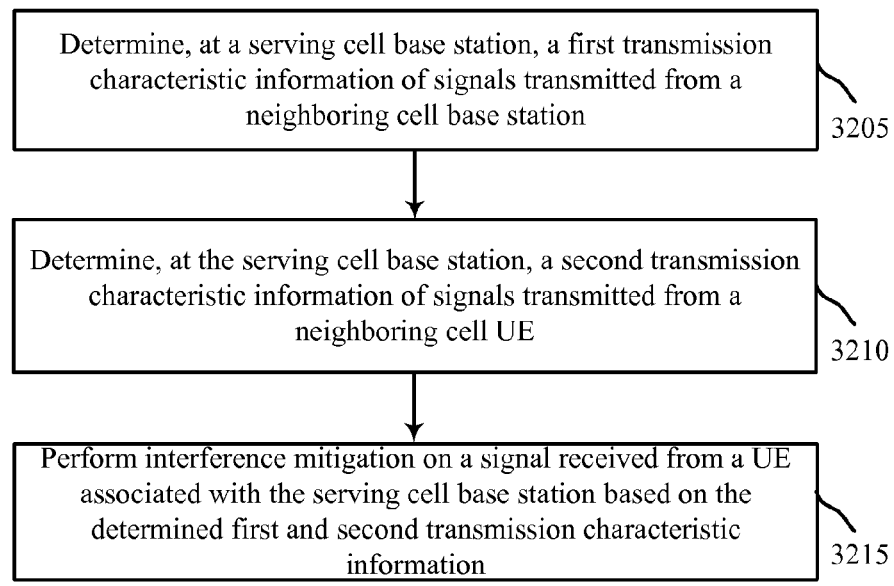
FIG. 32 is another flowchart of a method for inter-cell interference mitigation according to various examples.

With reference now to FIG. 32, a flowchart conceptually illustrating an example of a method for wireless communication at a serving cell base station is described in accordance with aspects of the present disclosure. FIG. 32 shows an example of a method for inter-cell interference mitigation in a wireless communications system 3100 described above with reference to FIG. 31, for example. For clarity, the method 3200 is described below with reference to ones of the base stations, eNBs, 105 and/or UEs 115 described with reference to FIGS. 1 and/or 2. In one example, a base station, eNB, or other device may execute one or more sets of codes to control the functional elements of the base station, eNB, or other device to perform the functions described below.

At block 3205, a serving cell base station may determine transmission characteristic information of signals transmitted from a neighboring cell base station. In some examples, the signals transmitted from the neighboring cell base station, for which the transmission characteristic information is determined, may include, for example, downlink subframes transmitted to a neighboring cell UE according to a different TDD UL/DL configuration from a TDD UL/DL configuration used by the serving cell base station. For example, the TDD UL/DL configuration used by the neighboring cell base station may include at least one downlink subframe transmitted from the neighboring cell base station to the neighboring cell UE during an uplink subframe transmitted from a UE associated with the serving cell base station, which downlink subframe transmitted from the neighboring cell base station to the neighboring cell UE may interfere with transmission of the uplink subframe to the serving cell base station.

In some cases, determining the transmission characteristic information of the signals transmitted from the neighboring cell base station may include monitoring for transmissions from the neighboring cell base station and determining downlink transmission characteristic information for downlink transmissions from the neighboring cell base station based on transmissions received while monitoring for the transmissions from the neighboring cell base stations.

At block 3210, the serving cell base station may determine transmission characteristic information of signals transmitted from a neighboring cell UE. In some examples, the signals transmitted from the neighboring cell UE, for which the transmission characteristic information is determined, may include, for example, one or more of an uplink control channel transmission or an uplink data channel transmission during an uplink subframe transmission from a UE associated with the serving cell base station.

In some cases, determining the transmission characteristic information of the signals transmitted from the neighboring cell UE may include monitoring for transmissions from neighboring cell UEs and determining the transmission characteristic information of signals transmitted from the neighboring cell UE based on transmissions received while monitoring for the transmissions from the neighboring cell UEs. In other cases, determining the transmission characteristic information of the signals transmitted from the neighboring cell UE may include monitoring for transmissions from neighboring cell base stations and determining the transmission characteristic information of signals transmitted from the neighboring cell UE based on transmissions received while monitoring for the transmissions from the neighboring cell base stations. In some examples, monitoring for transmissions from neighboring cell base stations may include monitoring a PDCCH of a neighboring cell base station (e.g., monitoring the PDCCH for uplink grants). In some examples, the transmission characteristic information of the signals transmitted from the neighboring cell UE may include one or more of modulation order, number of spatial layers, or precoding information.

At block 3215, the serving cell base station may perform interference mitigation (e.g., interference cancellation) on a signal received from a UE associated with the serving cell base station. The interference mitigation may be performed based on the determined transmission characteristic information. In some examples, the interference mitigation may include one or more of RS-IC, control-IC, or data-IC, as currently implemented in LTE systems by UEs.

In some examples, it may be determined (e.g., by the serving cell base station or a central scheduler) which of the neighboring cell base station or the neighboring cell UE is transmitting during an uplink subframe transmission from the UE associated with the serving cell base station, and the interference mitigation performed at block 3215 may be based on which of the neighboring cell base station or the neighboring cell UE is transmitting during the uplink subframe transmission from the UE associated with the serving cell base station.

In some examples, determining the transmission characteristic information of signals transmitted from the neighboring cell base station and determining the transmission characteristic information of signals transmitted from the neighboring cell UE may include receiving the transmission characteristic information through an X2 backhaul link with the neighboring cell base station. Alternately or additionally, the transmission characteristic information may be received from a central scheduler in communication with the serving cell base station and the neighboring cell base station.

Figure 33:
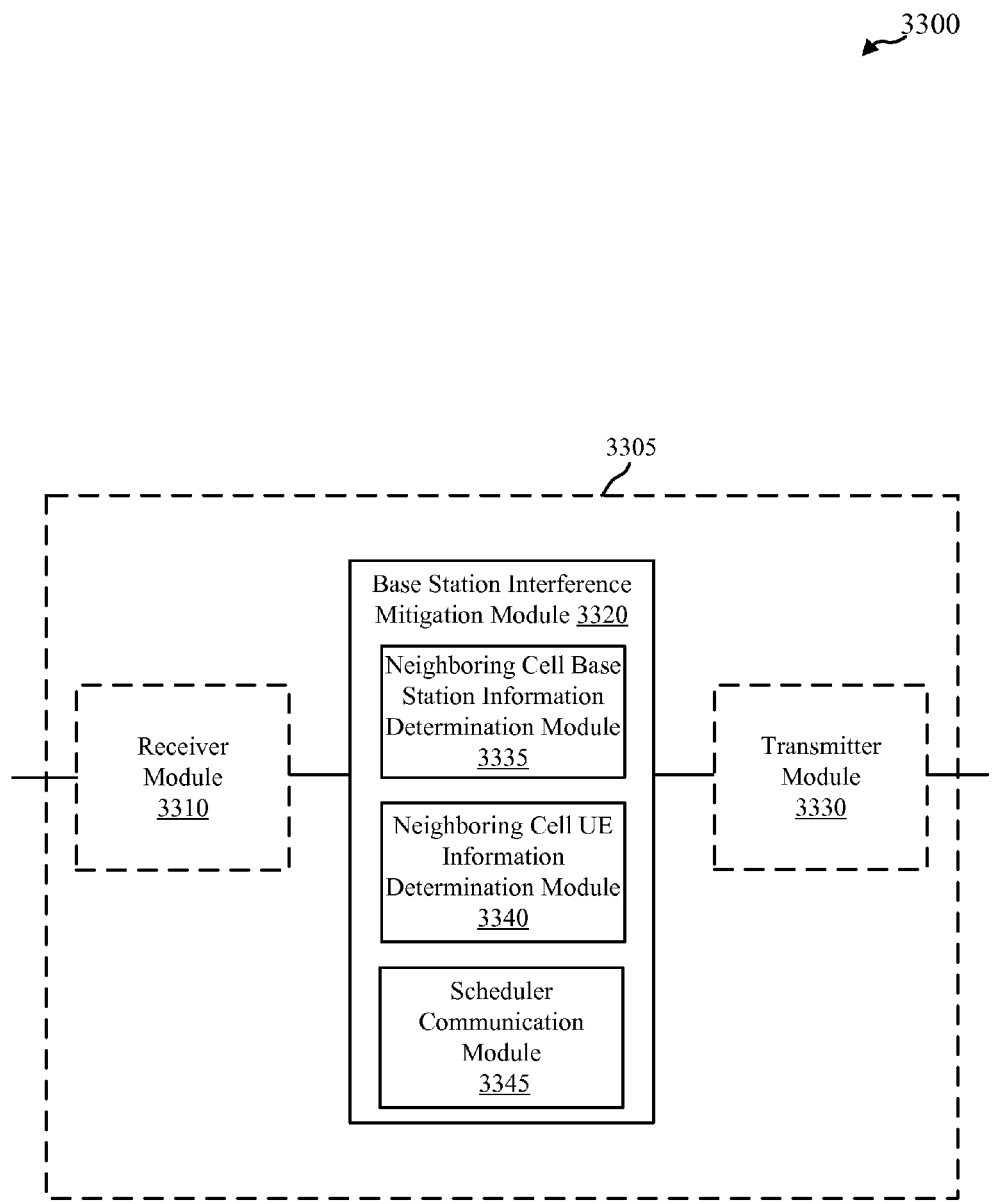
FIG. 33 is a block diagram of another device that may be used for inter-cell interference mitigation at a user equipment in accordance with various examples.

FIG. 33 is a block diagram conceptually illustrating a device 3305, such as a base station or eNB, for use in wireless communications in accordance with aspects of the present disclosure. In some examples, the device 3305 may be an example of one or more aspects of the base station or eNBs 105 described with reference to FIGS. 1 and/or 2. The device 3305 may also be a processor. The device 3305 may include a receiver module 3310, a base station interference mitigation module 3320, and/or a transmitter module 3330. Each of these components may be in communication with each other.

The components of the device 3305 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 3310 may be or include an RF receiver, such as an RF receiver operable to receive transmissions on two or more hierarchical modulation layers. The receiver module 3310 may be used to receive various types of data and/or control signals (i.e., transmissions) over one or more communication links of a wireless communications system, such as one or more communication links 125 of the wireless communications systems 100 and/or 200 described with reference to FIGS. 1 and/or 2.

In some examples, the transmitter module 3330 may be or include an RF transmitter, such as an RF transmitter operable to transmit on two or more hierarchical modulation layers (e.g., through a base modulation layer and one or more enhancement modulation layers). The transmitter module 3330 may be used to transmit various types of data and/or control signals (i.e., transmissions) over one or more communication links of a wireless communications system, such as one or more communication links 125 of the wireless communications systems 100 and/or 200 described with reference to FIGS. 1 and/or 2.

In some examples, the base station interference mitigation module 3320 may include a neighboring cell base station information determination module 3335, a neighboring cell UE information determination module 3340, and/or a scheduler communication module 3345. Upon determining transmission characteristic information of signals transmitted from a neighboring cell base station using the neighboring cell base station information determination module 3335, or upon determining transmission characteristic information of signals transmitted from a neighboring cell UE using the neighboring cell UE information determination module 3340, the base station interference mitigation module 3320 may perform interference mitigation (e.g., interference cancellation) on a signal received from a UE associated with the device 3305 (e.g., a UE for which the device 3305 acts as a serving cell base station). The interference mitigation may be performed based on the determined transmission characteristic information. In some examples, the base station interference mitigation module 3320 may be used to perform interference mitigation on a plurality of signals received from a plurality of UEs associated with the device 3305. In some examples, the interference mitigation may include one or more of RS-IC, control-IC, or data-IC, as currently implemented in LTE systems by UEs.

In some examples, the signals for which the neighboring cell base station information determination module 3335 determines transmission characteristic information may include, for example, downlink subframes transmitted from a neighboring cell base station to a neighboring cell UE according to a different TDD UL/DL configuration from a TDD UL/DL configuration used by the device 3305. For example, the TDD UL/DL configuration used by the neighboring cell base station may include at least one downlink subframe transmitted from the neighboring cell base station to the neighboring cell UE during an uplink subframe transmitted to the device 3305 from a UE associated with the device 3305, which downlink subframe transmitted from the neighboring cell base station to the neighboring cell UE may interfere with transmission of the uplink subframe transmitted to the device 3305.

In some cases, the neighboring cell base station information determination module 3335 may determine the transmission characteristic information of the signals transmitted from the neighboring cell base station by monitoring for transmissions from the neighboring cell base station and determining downlink transmission characteristic information for downlink transmissions from the neighboring cell base station based on transmissions received while monitoring for the transmissions from the neighboring cell base stations.

In some examples, the signals transmitted from the neighboring cell UE, for which the transmission characteristic information is determined, may include, for example, one or more of an uplink control channel transmission or an uplink data channel transmission during an uplink subframe transmission, to the device 3305, from a UE associated with the device 3305.

In some cases, the neighboring cell UE information determination module 3340 may determine the transmission characteristic information of the signals transmitted from the neighboring cell UE by monitoring for transmissions from neighboring cell UEs and determining the transmission characteristic information of signals transmitted from the neighboring cell UE based on transmissions received while monitoring for the transmissions from the neighboring cell UEs. In other cases, the neighboring cell UE information determination module 3340 may determine the transmission characteristic information of the signals transmitted from the neighboring cell UE by monitoring for transmissions from neighboring cell base stations and determining the transmission characteristic information of signals transmitted from the neighboring cell UE based on transmissions received while monitoring for the transmissions from the neighboring cell base stations. In some examples, monitoring for transmissions from neighboring cell base stations may include monitoring a PDCCH of a neighboring cell base station (e.g., monitoring the PDCCH for uplink grants). In some examples, the transmission characteristic information of the signals transmitted from the neighboring cell UE may include one or more of modulation order, number of spatial layers, or precoding information.

In some examples, the base station interference mitigation module 3320 (or a central scheduler in communication with the base station interference mitigation module 3320 through the scheduler communication module 3345) may determine whether a neighboring cell base station or a neighboring cell UE is transmitting during an uplink subframe transmission to the device 3305, and perform interference mitigation based on whether a neighboring cell base station or a neighboring cell UE is transmitting during the uplink subframe transmission to the device 3305.

In some examples, the neighboring cell base station information determination module 3335 or the neighboring cell UE information determination module 3340 may determine transmission characteristic information of signals transmitted from a neighboring cell base station or a neighboring cell UE by receiving the transmission characteristic information through an X2 backhaul link with a neighboring cell base station. In other examples, the base station interference mitigation module 3320 may employ the scheduler communication module 3345 to communicate with a central scheduler, which central scheduler may provide transmission characteristic information of signals transmitted from a neighboring cell base station or a neighboring cell UE to the base station interference mitigation module 3320.

Figure 34:
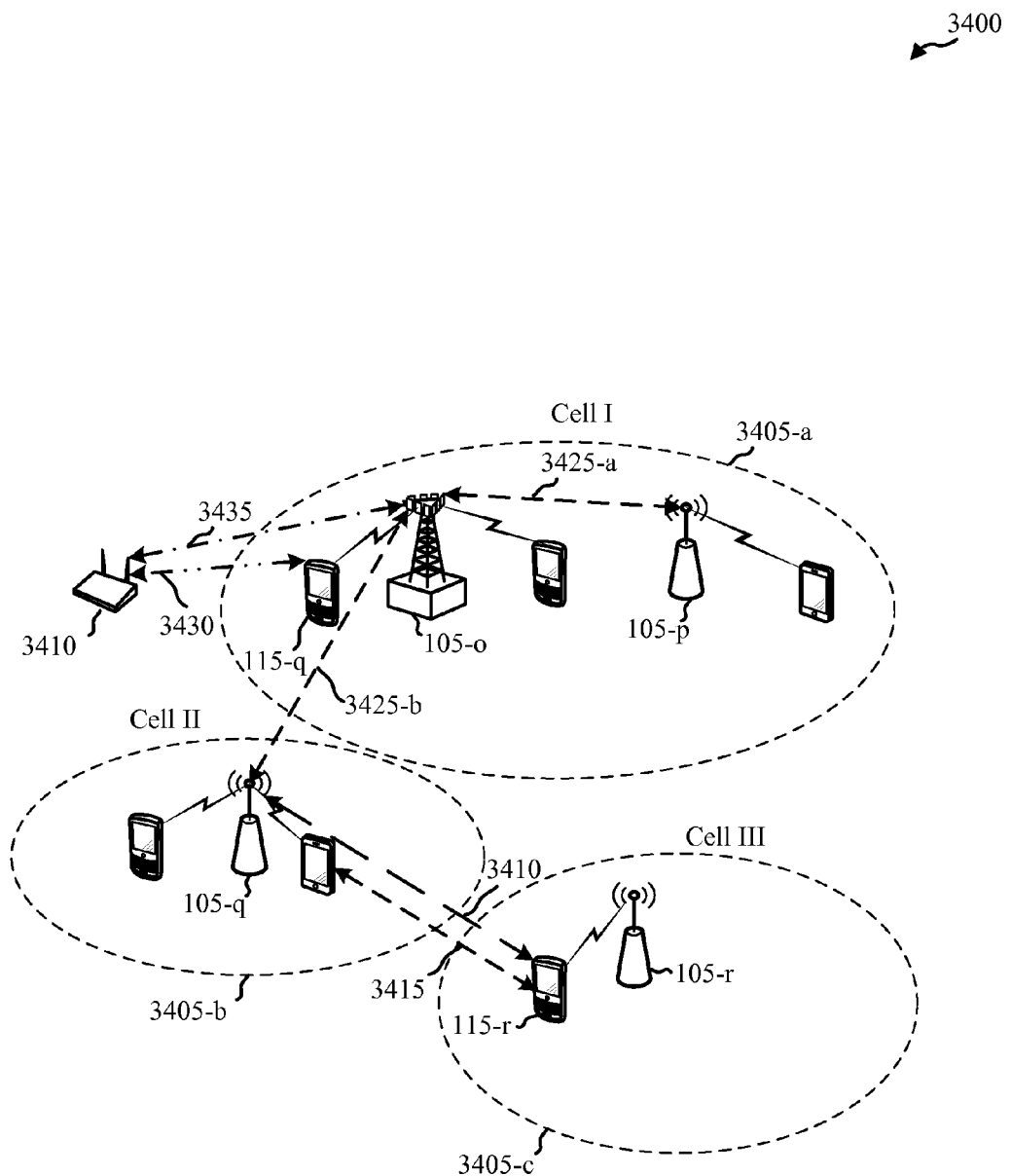
FIG. 34 illustrates another wireless communications system and interference cancellation environment in accordance with various examples.

Referring next to FIG. 34, a diagram illustrates an example of a wireless communications system 3400 in which one or more nodes may experience inter-radio interference. The wireless communications system 3400 may illustrate, for example, aspects of wireless communications systems 100, 200, 2200, 2700, and/or 3100 illustrated in FIGS. 1, 2, 22, 27, and/or 31. In this example, cells 3405 may include one or more eNBs 105, and a radio operating according to a different wireless communications protocol, such as wireless network access point 3405, that may be located within or adjacent to one or more cells 3405. As illustrated in the example of FIG. 34, the wireless communications system 3400 includes cells 3405-a, 3405-b, and 3405-c. Cell 3405-a may include eNB 105-o and eNB 105-p, cell 3405-b may include eNB 105-q, and cell 3405-c may include eNBs 105-r. As mentioned above, various sources of inter-cell interference may be present in the wireless communications system 3400, including, for example, inter-eNB interference 3425-a and 3425-b, inter-UE interference 3415, and interference 3410 between an eNB and neighboring cell UE, such as between UE 115-r and eNB 105-q in the illustration of FIG. 34. Furthermore, in the example of FIG. 34, an access point (AP) 3405 of another wireless network may cause interference with one or more nodes of wireless communications system 3400, such as AP-eNB interference 3435 between AP 3405 and eNB 105-o, and AP-UE interference 3430 between AP 3405 and UE 115-q. According to various aspects of the disclosure, the eNBs 105 and UEs 115 of wireless communications system 3400 may monitor, detect, and perform interference cancellation techniques to mitigate inter-radio interference, such as AP-eNB interference 3435 and AP-UE interference 3430.

Figure 35:
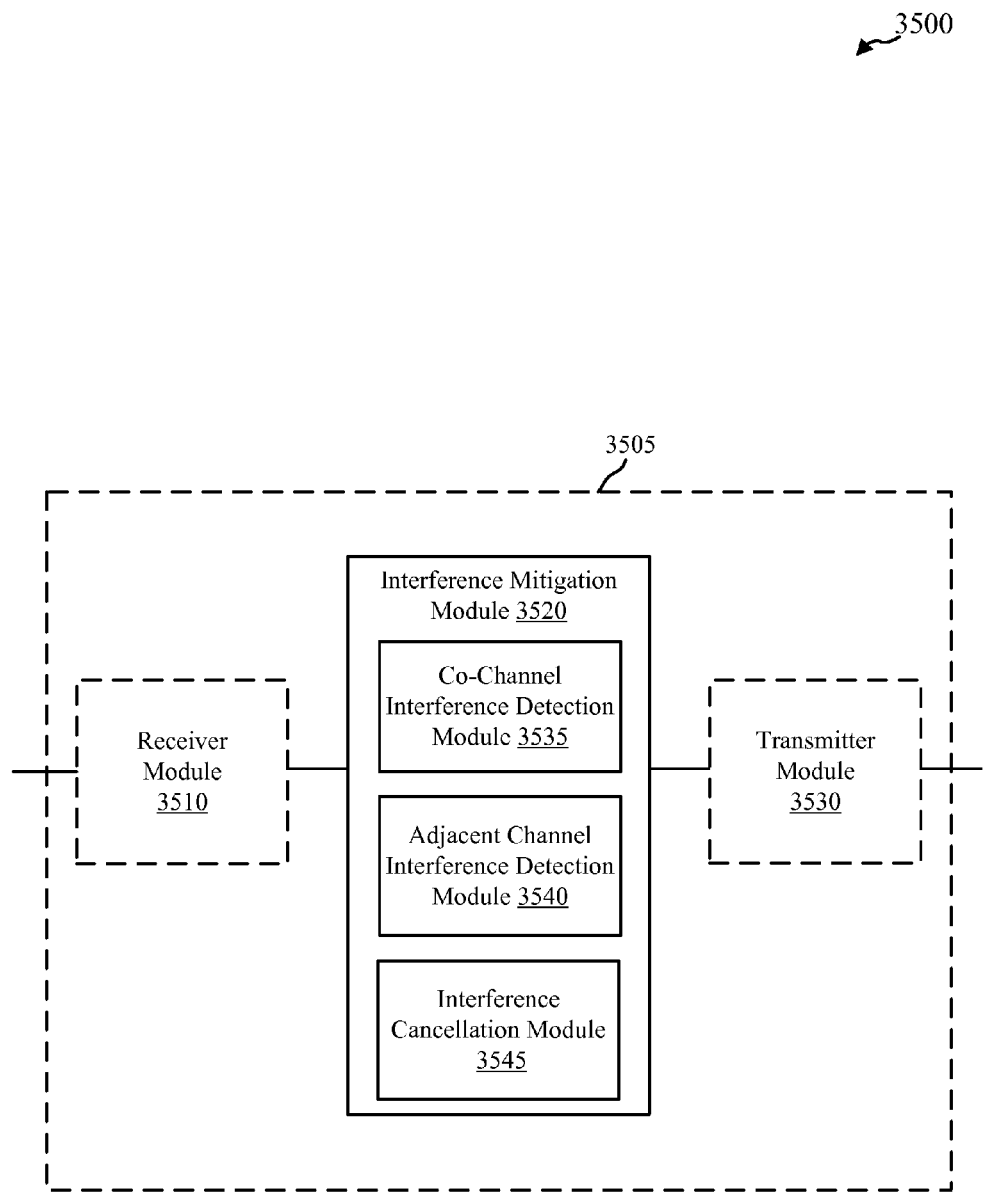
FIG. 35 is a block diagram of a device that may be used for inter-radio interference cancellation at a user equipment in accordance with various examples.

Referring now to FIG. 35, a block diagram 3500 illustrates a device 3505 for use in wireless communications, in accordance with various aspects of the present disclosure. In some examples, the device 3505 may be an example of one or more aspects of the eNBs 105, UEs 115, or devices 405, 1305, 1605, 2005, 2505, 3005, 3205 described with reference to FIGS. 1, 2, 6, 7, 8, 9, 10, 13, 16, 18, 19, 20A, 20B, 22, 25, 27, 30, 31, 32, and/or 34. The device 3505 may also be, in some examples, one or more aspects of a node operating according to the IEEE 802.11 protocols (referred to hereinafter as a Wi-Fi node), such as access point 3405 described with reference to FIG. 34. The device 3505 may also be a processor. The device 3505 may include a receiver module 3510, an interference mitigation module 3520, and/or a transmitter module 3530. Each of these components may be in communication with each other.

The components of the device 3505 may be, individually or collectively, implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 3510 may be or include an RF receiver, such as an RF receiver operable to receive transmissions on two or more hierarchical modulation layers and also operable to receive transmissions from other types of radios, which may include, for example, radios operating according to different wireless communications protocols such as an LTE protocol in unlicensed radio spectrum or Wi-Fi node radios. In some examples, the transmitter module 3530 may be or include an RF transmitter, such as an RF transmitter operable to transmit data on two or more hierarchical modulation layers. The RF transmitter 3530, in some examples, may include a single transmitter or a single transmitter per transmit/receive chain. The transmitter module 3530 may be used to transmit various types of data and/or control signals (i.e., transmissions) over one or more communication links of a wireless communications system including, such as one or more communication links 125 of the wireless communications systems 100, 200, 700, 800, 900, 1800, 2200, 2700, 3000, and/or 3400 described with reference to FIGS. 1, 2, 7, 8, 9, 18, 22, 27, 30, and/or 34.

The interference mitigation module 3520 may include a co-channel interference detection module 3535, an adjacent channel interference detection module 3540, and an interference cancellation module 3545. Each of these components may be in communication with each other. Co-channel interference detection module 3535 may detect signals from one or more radios that may be operating within the same frequency channels as the wireless communications system in which the device 3505 operates. For example, if the device 3505 is part of a Wi-Fi node, the co-channel interference detection module 3535 may detect interference from other radios operating in unlicensed radio frequency spectrum, such as a node operating in unlicensed spectrum according to an LTE protocol. Similarly, if the device 3505 is part of a LTE node that operates in unlicensed spectrum, the co-channel interference detection module 3535 may detect interference from WiFi nodes operating in the same spectrum. In some examples, the co-channel interference detection module 3535 may determine transmission characteristics of the co-channel transmission. Such transmission characteristics may be used in interference cancellation techniques to cancel the detected co-channel interference, for example. In some examples, the co-channel interference detection module 3535 may monitor the channel for a wireless transmission preamble associated with the interfering transmission (e.g., a WiFi preamble), which may be used to determine packet characteristics of the interfering signal.

The adjacent channel interference detection module 3540 may detect signals from one or more radios that may be operating in an adjacent frequency channel to the wireless communications system in which the device 3505 operates. For example, if the device 3505 is part of a LTE node (e.g., an aspect of a UE or eNB operating using LTE in licensed spectrum), the adjacent channel interference detection module 3540 may detect interference from WiFi nodes operating in adjacent spectrum, in which a portion of the signal leaks into the wireless communication channel of device 3505. In some examples, the adjacent channel interference detection module 3540 may determine transmission characteristics of the adjacent channel transmission. Such transmission characteristics may be used in interference cancellation techniques to cancel the detected adjacent channel interference, for example. In some examples, the adjacent channel interference detection module 3540 may monitor the channel for a wireless transmission preamble associated with the interfering transmission (e.g., a WiFi preamble), which may be used to determine packet characteristics of the interfering signal.

The interference cancellation module 3545 may use one or more characteristics provided by the co-channel interference detection module 3535 and/or the adjacent channel interference detection module 3540 to cancel interference associated with the detected interfering signals. Interference cancellation techniques according to various examples may include those as discussed above, such as linear MMSE suppression, QR-SD, SIC, etc. for co-channel interference, and non-linear interference cancellation techniques for adjacent channel interference. Non-linear interference cancellation techniques may include, for example, estimating adjacent channel leakage from the transmission on the adjacent channel, and providing the estimated channel leakage to an adaptive filter that may cancel the estimated leakage.

Figure 36:
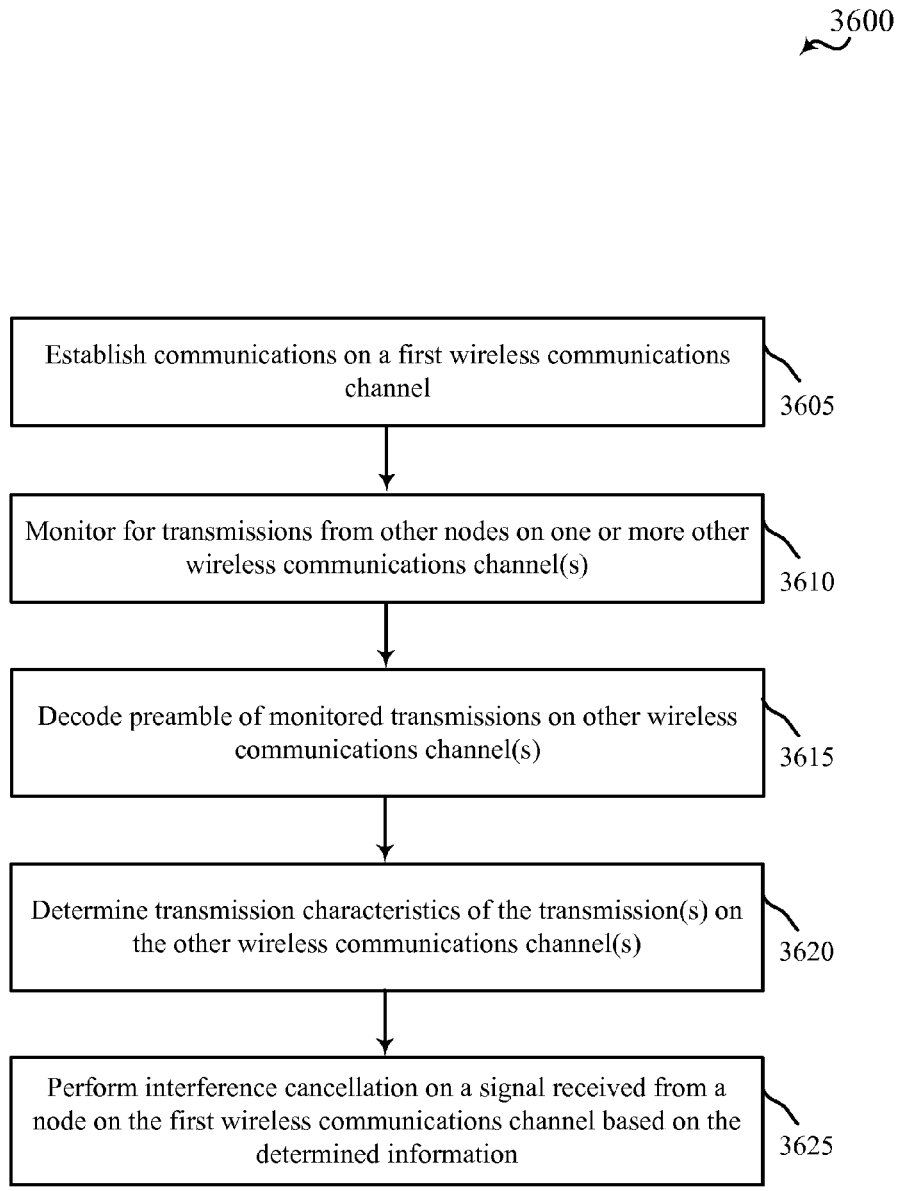
FIG. 36 is a flowchart of a method for inter-radio interference cancellation according to various examples.

With reference now to FIG. 36, a flowchart conceptually illustrating an example of a method for wireless communication is described in accordance with aspects of the present disclosure. FIG. 36 shows an example of inter-radio interference cancellation according to various examples. For clarity, the method 3600 is described below with reference to ones of the base stations or eNBs 105, UEs 115, or devices 405, 1305, 1605, 2005, 2505, 3005, 3205, 3505 described with reference to FIGS. 1, 2, 6, 7, 8, 9, 10, 13, 16, 18, 19, 20A, 20B, 22, 25, 27, 30, 31, 32, 34, and/or 35. In one example, an eNB, UE, or device may execute one or more sets of codes to control the functional elements of the eNB, UE, or device to perform the functions described below.

At block 3605, communications may be established on a first wireless communications channel for receiving wireless transmissions from a transmitting node. At block 3610, transmissions from other nodes on one or more other wireless communications channel(s) may be monitored. At block 3615 preamble(s) of monitored transmissions on the other wireless communications channel(s) may be decoded. For example, if the method is being performed on a UE operating according to LTE protocols in an unlicensed spectrum, the UE may monitor for interference from other radios operating in the same channel, and may decode preambles of one or more detected transmissions. At block 3620 transmission characteristics of the transmission(s) on the other wireless communications channel(s) may be determined.

Interference cancellation may then be performed on a signal received from a node on the first wireless communications channel based on the determined information, as indicated at block 3625. As mentioned above, interference cancellation may be performed by, for example, using estimated interference from the detected interfering signal from the second wireless communications channel based on the decoded transmission preamble, and performing an interference cancellation on the signal received on the first wireless communications channel. The estimated interference may include, for example, one or more of RF nonlinearities, harmonics from the other wireless communications channel introduced into the first wireless communications channel, intermodulation distortion (IMD) from the other wireless communications channel(s), channel leakage from the other wireless communications channel(s), or coupling between the first wireless communications channel and other wireless communications channel(s).

Figure 37:
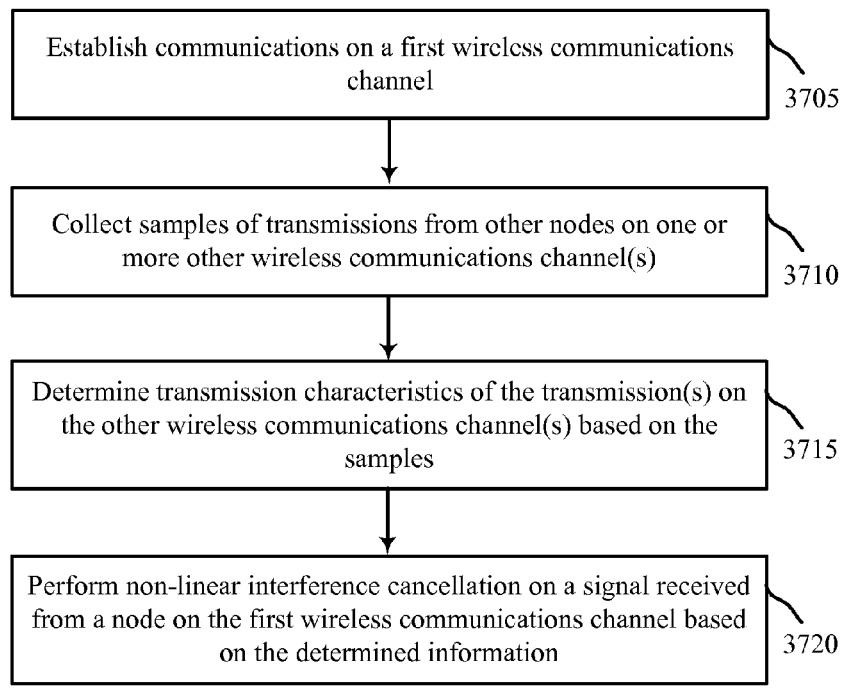
FIG. 37 is a flowchart of another method for inter-radio interference cancellation according to various examples.

With reference now to FIG. 37, a flowchart conceptually illustrating an example of a method for interference cancellation in wireless communication is described in accordance with aspects of the present disclosure. For clarity, the method 3700 is described below with reference to ones of the base stations or eNBs 105, UEs 115, or devices 405, 1305, 1605, 2005, 2505, 3005, 3205, 3505 described with reference to FIGS. 1, 2, 6, 7, 8, 9, 10, 13, 16, 18, 19, 20A, 20B, 22, 25, 27, 30, 31, 32, 34, and/or 35. In one example, an eNB, UE, or device may execute one or more sets of codes to control the functional elements of the eNB, UE, or device to perform the functions described below.

At block 3705, communications may be established on a first wireless communications channel for receiving wireless transmissions from a transmitting node. At block 3710, samples of transmissions from other nodes on one or more other wireless communications channel(s) may be collected. At block 3715 transmission characteristics of the transmission(s) on the other wireless communications channel(s) may be determined based on the samples. At block 3720, interference cancellation may be performed on a signal received from a node on the first wireless communications channel based on the determined information. In such a manner, non-linear leakage or other interference may be mitigated, thereby enhancing reception of signals on the first wireless communications channel and enhancing efficiency of the wireless communications system.

Figure 38:
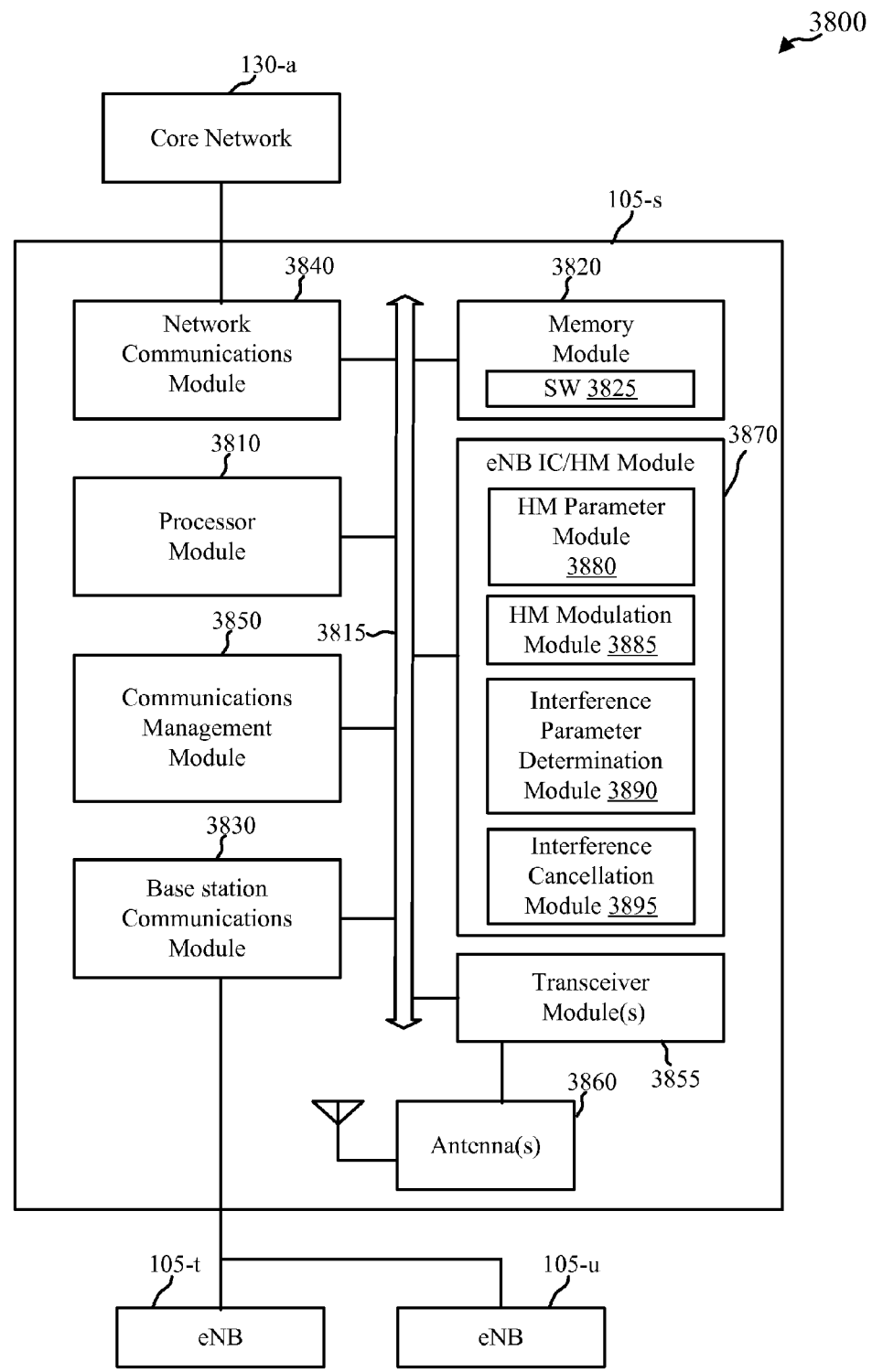
FIG. 38 is a block diagram that illustrates an example of a base station architecture according to various examples.

Turning to FIG. 38, a diagram 3800 is shown that illustrates a base station or eNB 105-*s* configured for hierarchical modulation and interference cancellation. In some embodiments, the base station 105-*s* may be an example of a base station or eNB of FIGS. 1, 2, 7, 8, 9, 18, 22, 27, 31, and/or 34. The base station 105-*s* may be configured to implement at least some of the features and functions described above with respect to FIGS. 1-37. The base station 105-*s* may include a processor module 3810, a memory module 3820, a transceiver module 3855, antennas 3860, and an eNB interference cancellation/hierarchical modulation (IC/HM) module 3870. The base station 105-*s* may also include one or both of a base station communications module 3830 and a network communications module 3840. Each of these components may be in communication with each other, directly or indirectly, over one or more buses 3815.

The memory module 3820 may include random access memory (RAM) and read-only memory (ROM). The memory module 3820 may also store computer-readable, computer-executable software (SW) code 3825 containing instructions that are configured to, when executed, cause the processor module 3810 to perform various functions described herein. Alternatively, the software code 3825 may not be directly executable by the processor module 3810 but be configured to cause the computer, e.g., when compiled and executed, to perform functions described herein.

The processor module 3810 may include an intelligent hardware device, e.g., a central processing unit (CPU), a microcontroller, an ASIC, etc. The processor module 3810 may process information received through the transceiver module 3855, the base station communications module 3830, and/or the network communications module 3840. The processor module 3810 may also process information to be sent to the transceiver module 3855 for transmission through the antennas 3860, to the base station communications module 3830, and/or to the network communications module 3840. The processor module 3810 may handle, alone or in connection with the eNB IC/HM module 3870, various aspects of interference cancellation and/or hierarchical modulation using multiple modulation layers, as described herein.

The transceiver module 3855 may include a modem configured to modulate packets and provide the modulated packets to the antennas 3860 for transmission, and to demodulate packets received from the antennas 3860. The transceiver module 3855 may be implemented as one or more transmitter modules and one or more separate receiver modules. The transceiver module 3855 may support communications on multiple hierarchical modulation layers. The transceiver module 3855 may be configured to communicate bi-directionally, via the antennas 3860, with one or more UEs 115 as illustrated in FIGS. 1, 2, 6, 7, 8, 9, 18, 22, 27, 31, and/or 34, for example. The base station 105-*s* may include multiple antennas 3860 (e.g., an antenna array). The base station 105-*s* may communicate with a core network 130-*a* through the network communications module 3840. The core network 130-*a* may be an example of the core network 130 of FIG. 1. The base station 105-*s* may communicate with other base stations, such as the base station 105-*t* and the base station 105-*u*, using the base station communications module 3830.

According to the architecture of FIG. 38, the base station 105-*s* may further include a communications management module 3850. The communications management module 3850 may manage communications with stations and/or other devices. The communications management module 3850 may be in communication with some or all of the other components of the base station 105-*s* via the bus or buses 3815. Alternatively, functionality of the communications management module 3850 may be implemented as a component of the transceiver module 3855, as a computer program product, and/or as one or more controller elements of the processor module 3810.

The eNB IC/HM module 3870 may be configured to perform and/or control some or all of the functions or aspects described in FIGS. 1-37 related to hierarchical modulation and interference cancellation. For example, the eNB IC/HM module 3870 may be configured to support multiple hierarchical modulation layers, intra-cell, inter-cell, and/or inter-radio interference cancellation. The eNB IC/HM module 3870 may include a hierarchical modulation (HM) parameter module 3880 configured to determine parameters associated with various transmissions for use in HM and/or base modulation layer interference cancellation as described herein. An HM modulation module 3885 may perform modulation of various content onto different hierarchical modulation layers, as well as superpositioning of one or more enhancement modulation layers onto a base modulation layer. Interference parameter determination module 3890 may determine various parameters related to interfering signals, which may be used by interference cancellation module 3895 to cancel interference from the interfering signals. The eNB IC/HM module 3870, or portions of it, may be a processor. Moreover, some or all of the functionality of the eNB IC/HM module 3870 may be performed by the processor module 3810 and/or in connection with the processor module 3810.

Figure 39:
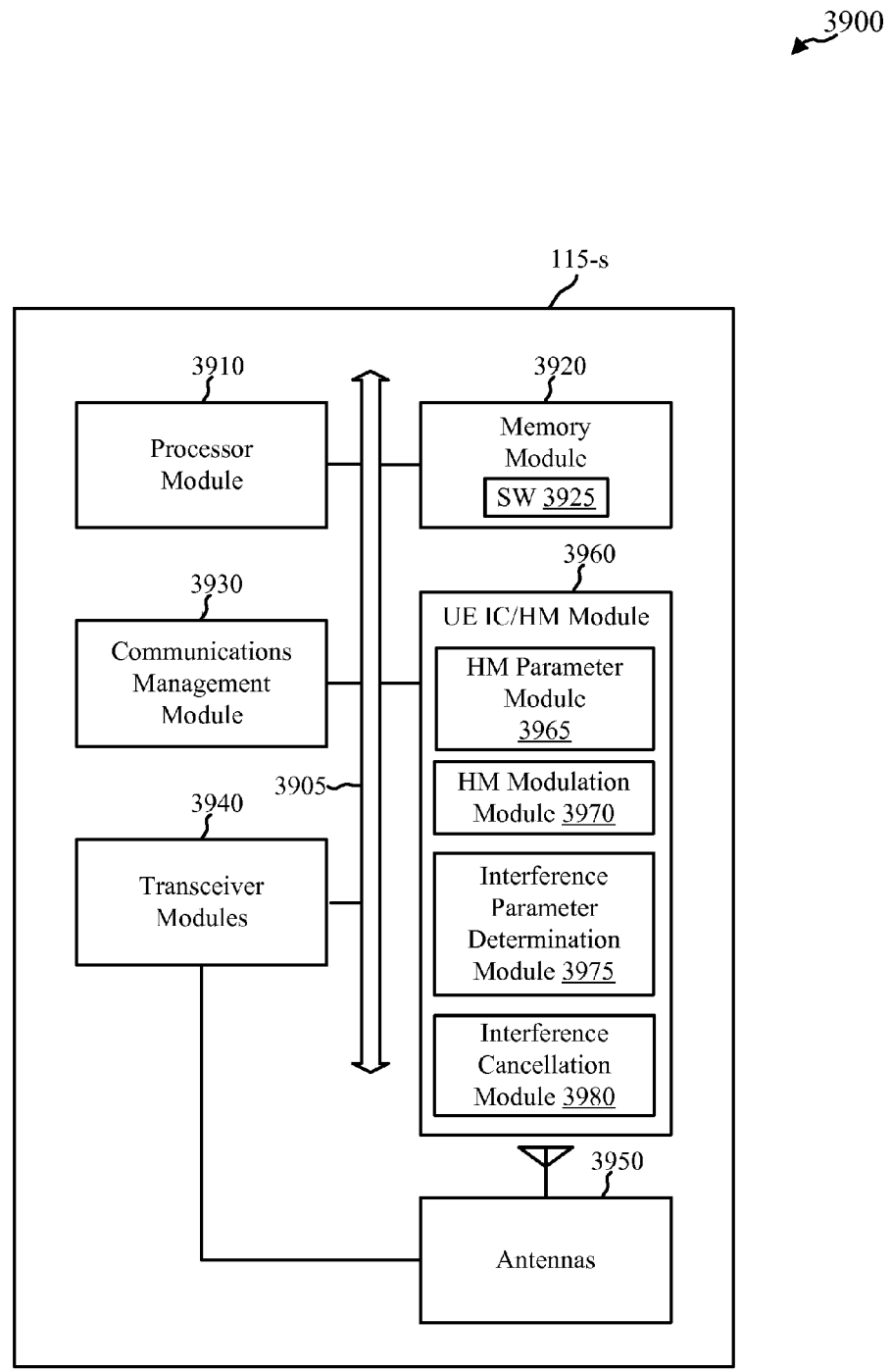
FIG. 39 shows a block diagram that illustrates an example of a UE architecture according to various examples.

Turning to FIG. 39, a diagram 3900 is shown that illustrates a UE 115-*s* configured for hierarchical modulation and interference cancellation. The UE 115-*s* may have various other configurations and may be included or be part of a personal computer (e.g., laptop computer, netbook computer, tablet computer, etc.), a cellular telephone, a smart phone, a PDA, a digital video recorder (DVR), an internet appliance, a gaming console, an e-readers, etc. The UE 115-*s* may have an internal power supply (not shown), such as a small battery, to facilitate mobile operation. The station UE 115-*s* may be an example of the UEs 115 of FIGS. 1, 2, 6, 7, 8, 9, 18, 22, 27, 31, 34, 39, and/or 40. The UE 115-*s* may be configured to implement at least some of the features and functions described above with respect to FIGS. 1-37.

The UE 115-*s* may include a processor module 3910, a memory module 3920, a transceiver module 3940, antennas 3950, and an UE IC/HM module 3960. Each of these components may be in communication with each other, directly or indirectly, over one or more buses 3905.

The memory module 3920 may include RAM and ROM. The memory module 3920 may store computer-readable, computer-executable software (SW) code 3925 containing instructions that are configured to, when executed, cause the processor module 3910 to perform various functions described herein. Alternatively, the software code 3925 may not be directly executable by the processor module 3910 but be configured to cause the computer (e.g., when compiled and executed) to perform functions described herein.

The processor module 3910 may include an intelligent hardware device, e.g., a CPU, a microcontroller, an ASIC, etc. The processor module 3910 may process information received through the transceiver module 3940 and/or to be sent to the transceiver module 3940 for transmission through the antennas 3950. The processor module 3910 may handle, alone or in connection with the UE IC/HM module 3960, various aspects of hierarchical modulation and interference cancellation.

The transceiver module 3940 may be configured to communicate bi-directionally with base stations (e.g., base stations 105). The transceiver module 3940 may be implemented as one or more transmitter modules and one or more separate receiver modules. The transceiver module 3940 may support communications on multiple hierarchical modulation layers. The transceiver module 3940 may include a modem configured to modulate packets and provide the modulated packets to the antennas 3950 for transmission, and to demodulate packets received from the antennas 3950. While the UE 115-*s* may include a single antenna, there may be embodiments in which the UE 115-*s* may include multiple antennas 3950.

According to the architecture of FIG. 39, the UE 115-*s* may further include a communications management module 3930. The communications management module 3930 may manage communications with various access points. The communications management module 3930 may be a component of the UE 115-*s* in communication with some or all of the other components of the UE 115-*s* over the one or more buses 3905. Alternatively, functionality of the communications management module 3930 may be implemented as a component of the transceiver module 3940, as a computer program product, and/or as one or more controller elements of the processor module 3910.

The UE IC/HM module 3960 may be configured to perform and/or control some or all of the functions or aspects described in FIGS. 1-37 related to hierarchical modulation layers transmission and reception, and various interference cancellation procedures. For example, the UE IC/HM module 3960 may be configured to support multiple hierarchical modulation layers, intra-cell, inter-cell, and/or inter-radio interference cancellation. The UE IC/HM module 3960 may include a UE hierarchical modulation (HM) parameter module 3965 configured to determine parameters associated with various transmissions for use in HM and/or base modulation layer interference cancellation as described herein. An HM modulation module 3970 may perform modulation of various content onto different hierarchical modulation layers, as well as superpositioning of one or more enhancement modulation layers onto a base modulation layer. Interference parameter determination module 3975 may determine various parameters related to interfering signals, which may be used by interference cancellation module 3980 to cancel interference from the interfering signals. The UE IC/HM module 3960, or portions of it, may be a processor. Moreover, some or all of the functionality of the UE IC/HM module 3960 may be performed by the processor module 3910 and/or in connection with the processor module 3910.

Figure 40:
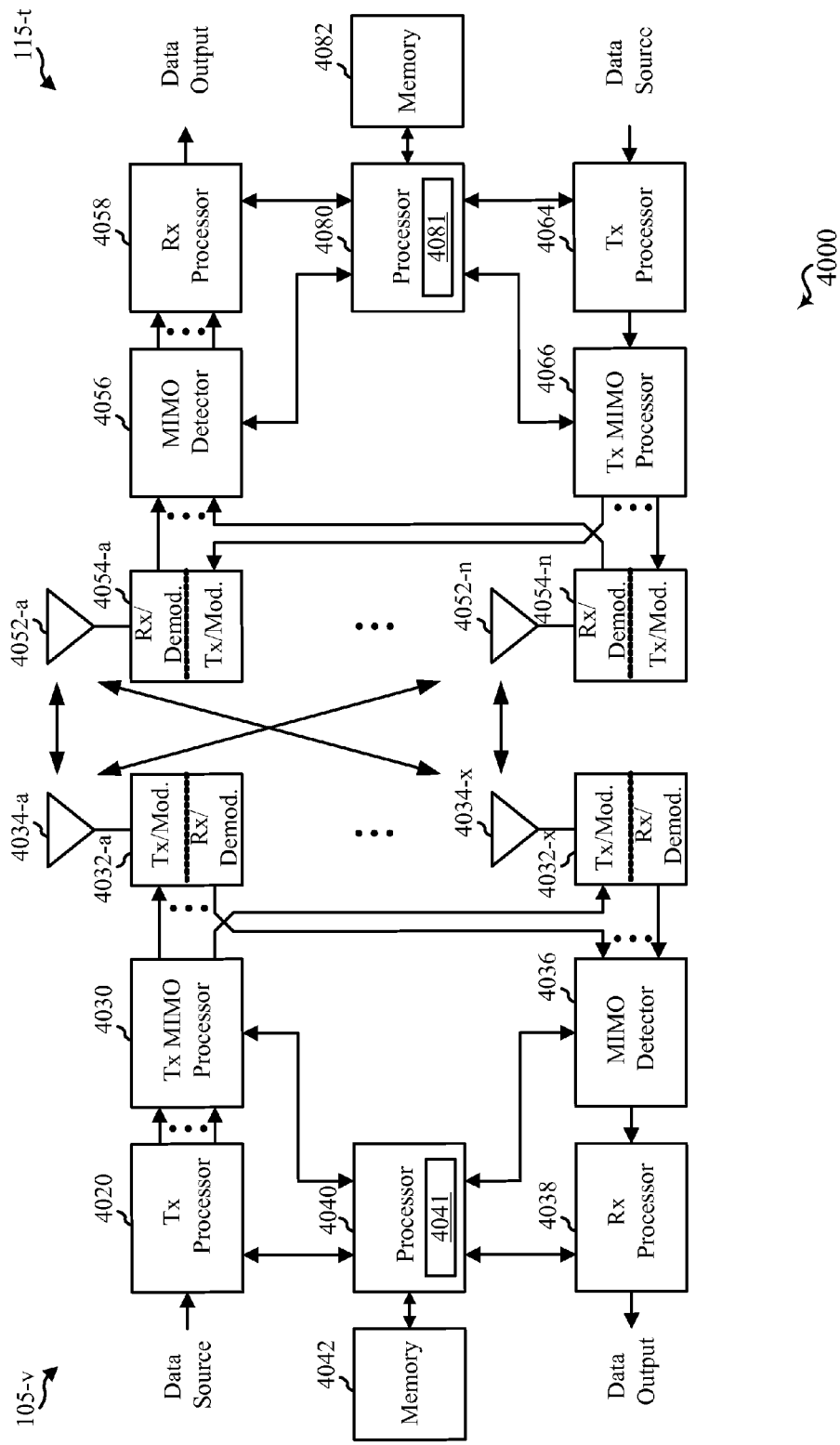
FIG. 40 shows a block diagram that illustrates an example of a multiple-input multiple-output (MIMO) communications system according to various examples.

Turning next to FIG. 40, a block diagram of a multiple-input multiple-output (MIMO) communication system 4000 is shown including a base station 105-$v$ and a user equipment or UE 115-$t$. The base station 105-$v$ and the UE 115-$t$ may support multiple hierarchical modulation layers and/or interference cancellation. The base station 105-$v$ may be an example of the base station or eNB of FIGS. 1, 2, 7, 8, 9, 18, 22, 27, 31, 34, and/or 38, while the UE 115-$t$ may be an example of the UE of FIGS. 1, 2, 6, 7, 8, 9, 18, 22, 27, 31, 34, and/or 39. The MIMO communication system 4000 may illustrate aspects of the wireless communications systems 100, 200, 700, 800, 900, 1800, 2300, 2700, 3100, and/or 3400 of FIGS. 1, 2, 7, 8, 9, 18, 22, 27, 31, and/or 34.

The base station 105-$v$ may be equipped with antennas 4034-$a$ through 4034-$x$, and the UE 115-$t$ may be equipped with antennas 4052-$a$ through 4052-$n$. In the MIMO communication system 4000, the base station 105-$v$ may be able to send data over multiple communication links at the same time. Each communication link may be called a "spatial layer" and the "rank" of the communication link may indicate the number of spatial layers used for communication. For example, in a 2×2 MIMO communication system where base station 105-$v$ transmits two "spatial layers," the rank of the communication link between the base station 105-$v$ and the UE 115-$t$ is two.

At the base station 105-$v$, a transmit (Tx) processor 4020 may receive data from a data source. The transmit processor 4020 may process the data. The transmit processor 4020 may also generate reference symbols, and a cell-specific reference signal. A transmit (Tx) MIMO processor 4030 may perform spatial processing (e.g., precoding) on data symbols, control symbols, and/or reference symbols, if applicable, and may provide output symbol streams to the transmit modulators 4032-$a$ through 4032-$x$. Each modulator 4032 may process a respective output symbol stream (e.g., for OFDM, etc.) to obtain an output sample stream. Each modulator 4032 may further process (e.g., convert to analog, amplify, filter, and upconvert) the output sample stream to obtain a downlink (DL) signal. In one example, DL signals from modulators 4032-$a$ through 4032-$x$ may be transmitted via the antennas 4034-$a$ through 4034-$x$, respectively.

At the UE 115-$t$, the antennas 4052-$a$ through 4052-$n$ may receive the DL signals from the base station 105-$v$ and may provide the received signals to the demodulators 4054-$a$ through 4054-$n$, respectively. Each demodulator 4054 may condition (e.g., filter, amplify, downconvert, and digitize) a respective received signal to obtain input samples. Each demodulator 4054 may further process the input samples (e.g., for OFDM, etc.) to obtain received symbols. A MIMO detector 4056 may obtain received symbols from all the demodulators 4054-$a$ through 4054-$n$, perform MIMO detection on the received symbols if applicable, and provide detected symbols. A receive (Rx) processor 4058 may process (e.g., demodulate, deinterleave, and decode) the detected symbols, providing decoded data for the UE 115-$t$ to a data output, and provide decoded control information to a processor 4080, or memory 4082. The processor 4080 may include a module or function 4081 that may perform various functions related to hierarchical modulation and/or interference cancellation. For example, the module or function 4081 may perform some or all of the functions described above with reference to the FIGS. 1-37.

On the uplink (UL), at the UE 115-$t$, a transmit (Tx) processor 4064 may receive and process data from a data source. The Tx processor 4064 may also generate reference symbols for a reference signal. The symbols from the Tx processor 4064 may be precoded by a Tx MIMO processor 4066 if applicable, further processed by the demodulators 4054-$a$ through 4054-$n$ (e.g., for SC-FDMA, etc.), and be transmitted to the base station 105-$v$ in accordance with the transmission parameters received from the base station 105-$v$. At the base station 105-$v$, the UL signals from the UE 115-$t$ may be received by the antennas 4034, processed by the demodulators 4032, detected by a MIMO detector 4036 if applicable, and further processed by a receive processor. The receive (Rx) processor 4038 may provide decoded data to a data output and to the processor 4040. The processor 4040 may include a module or function 4041 that may perform various aspects related to hierarchical modulation and/or interference cancellation. For example, the module or function 4041 may perform some or all of the functions described above with reference to FIGS. 1-37.

Figure 41:
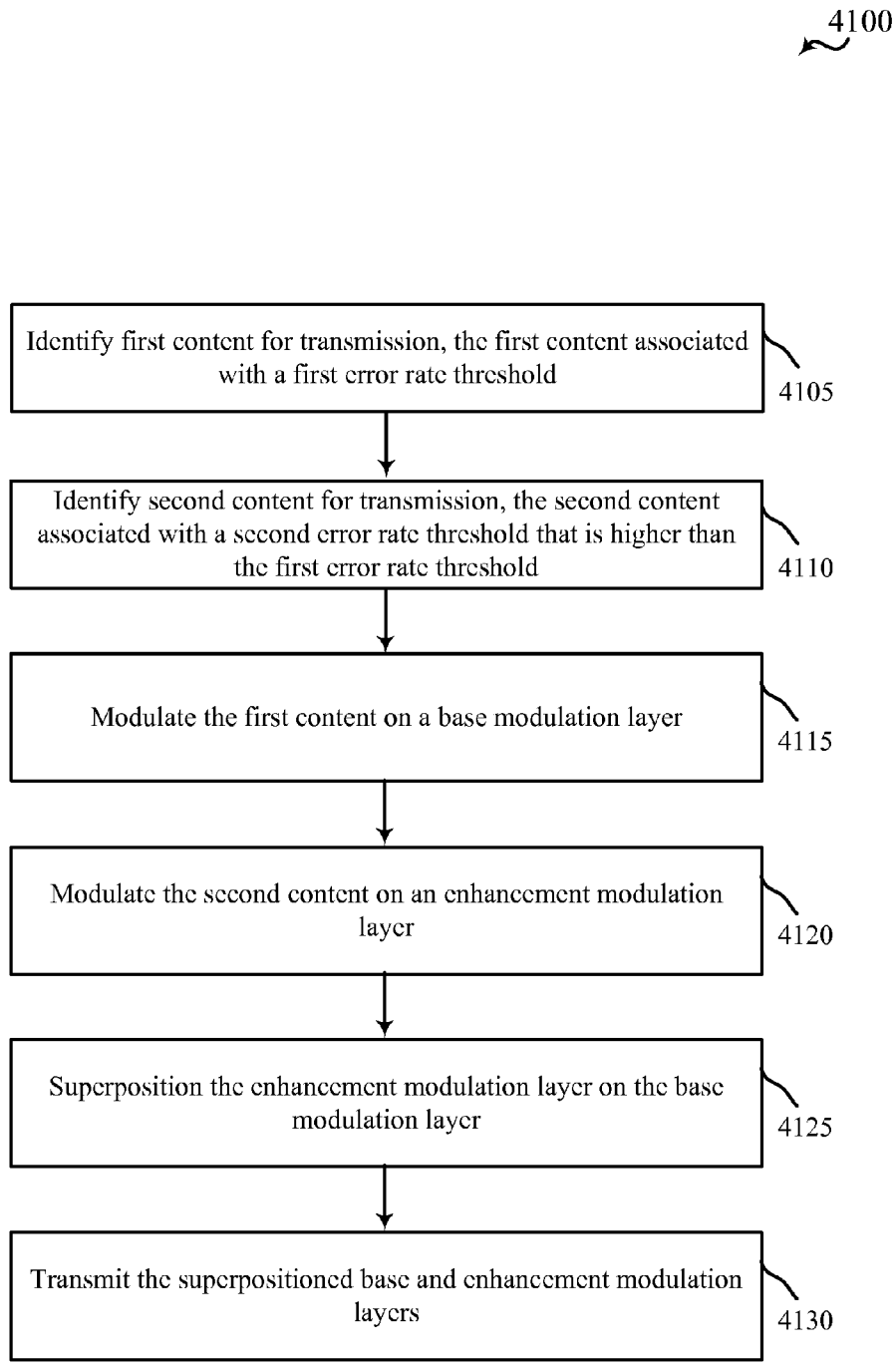
FIG. 41 is a flowchart of a method for wireless communications according to various examples.

FIG. 41 illustrates a method 4100 that may be carried out by a base station or eNB, or other entity in a wireless communications system according to various embodiments. The method 4100 may, for example, be performed by a base station or eNB 105 of FIGS. 1, 2, 7, 8, 9, 18, 22, 27, 31, 34, 38, and/or 40, or device 405, 2005, 3005, 3305, and/or 3505 of FIGS. 4, 10, 20A, 20B, 30, 33, and/or 35, or using any combination of the devices described for these figures. Initially, at block 4105, the base station may identify first content for transmission, the first content associated with a first error rate threshold. At block 4110, the base station may identify second content for transmission, the second content associated with a second error rate threshold that is higher than the first error rate threshold. At block 4115, the base station may modulate the first content on a base modulation layer. The base station may modulate the second content on an enhancement modulation layer, as indicated at block 4120. At block 4125, the base station may superposition the enhancement modulation layer on the base modulation layer. At block 4130, the base station may transmit the superpositioned base and enhancement modulation layers.

Figure 42:
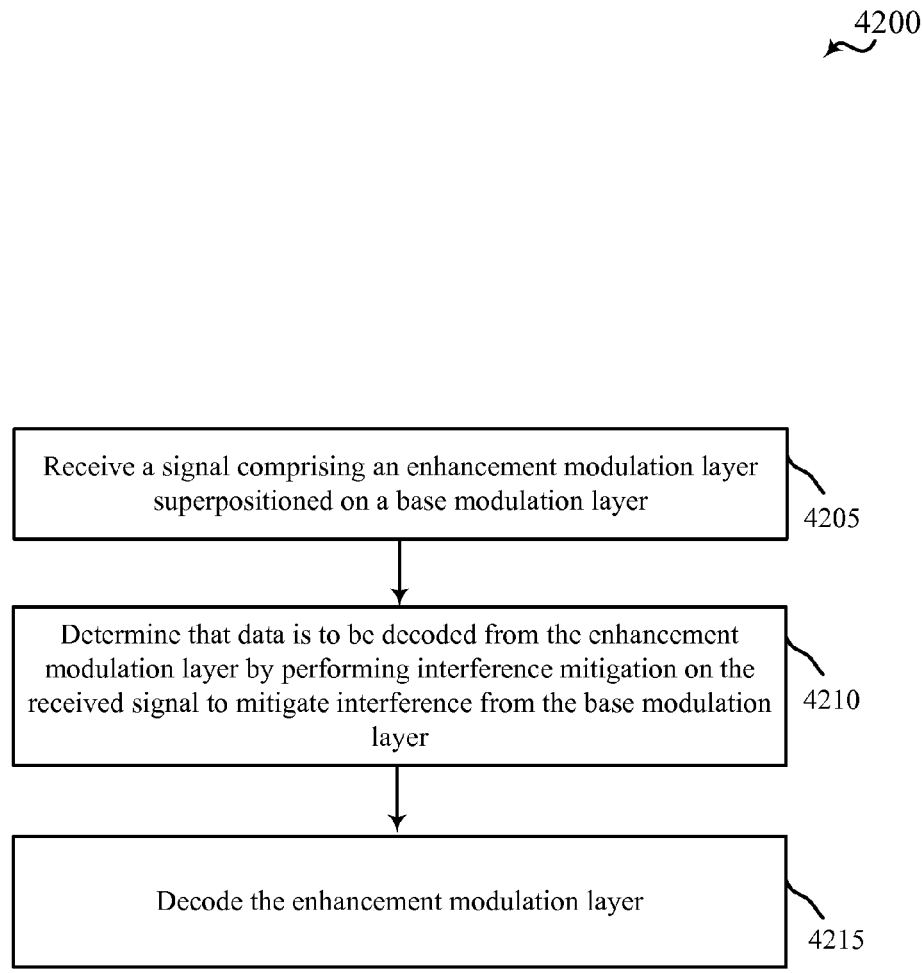
FIG. 42 is a flowchart of another method for wireless communications according to various examples.

FIG. 42 illustrates a method 4200 that may be carried out by a UE or other entity in a wireless communications system according to various embodiments. The method 4200 may, for example, be performed by a UE 115 of FIGS. 1, 2, 6, 7, 8, 9, 18, 22, 27, 31, 34, 39, and/or 40, or device 1305, 1605, 2505, and/or 3505 of FIGS. 13, 15, 16, 19, 25, and/or 35, or using any combination of the devices described for these figures. Initially, at block 4205, the UE may receive a signal comprising an enhancement modulation layer superpositioned on a base modulation layer. At block 4210, the UE may determine that data is to be decoded from the enhancement modulation layer by performing interference mitigation on the received signal to mitigate interference from the base modulation layer. At block 4215, the UE may decode the enhancement modulation layer.

Figure 43:
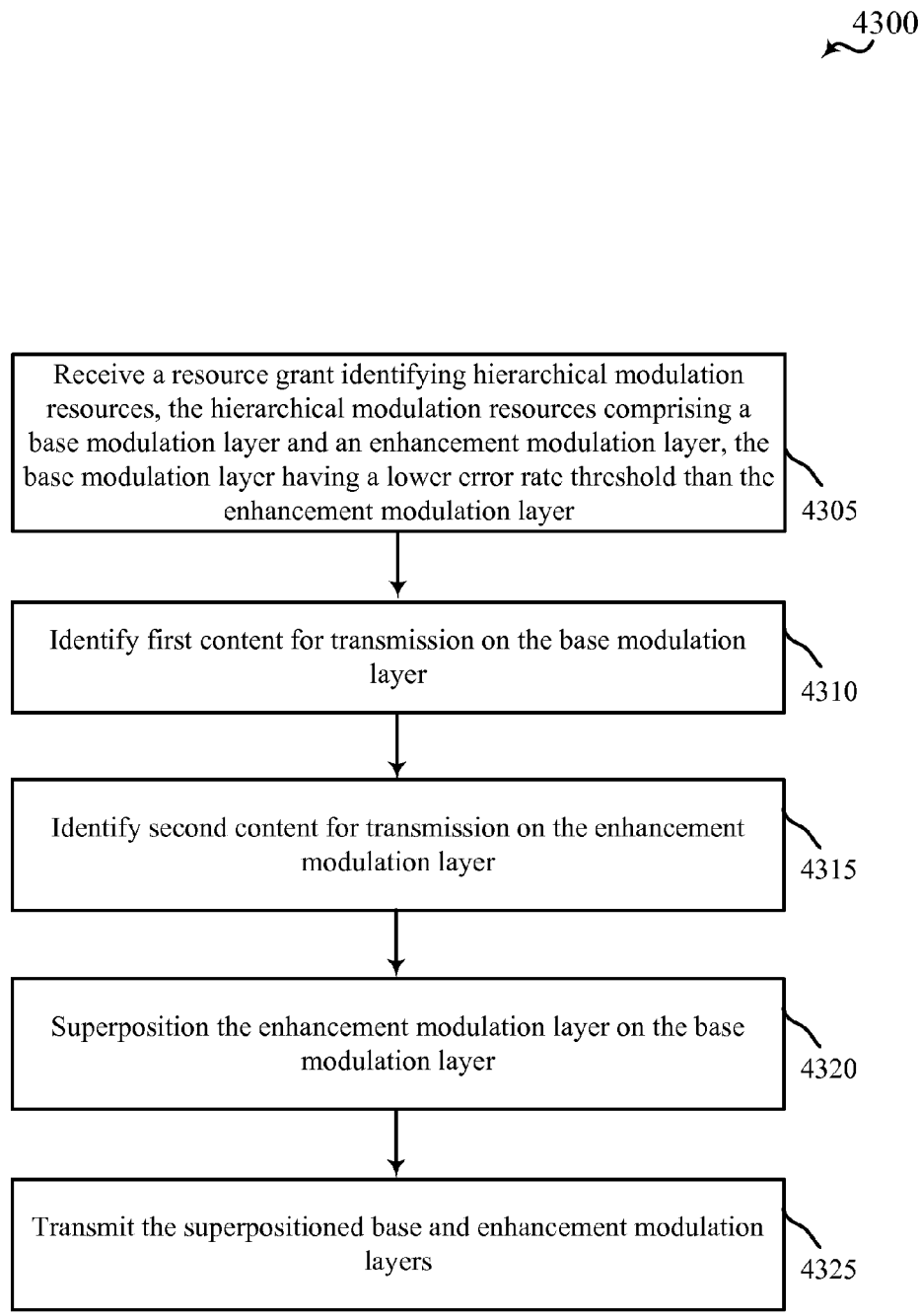
FIG. 43 is a flowchart of another method for wireless communications according to various examples.

FIG. 43 illustrates a method 4300 that may be carried out by a base station or eNB 105, or other entity in a wireless communications system according to various embodiments. The method 4300 may, for example, be performed by a base station or eNB of FIGS. 1, 2, 7, 8, 9, 18, 22, 27, 31, 34, 38, and/or 40, or device 405, 2005, 3005, 3305, and/or 3505 of FIGS. 4, 10, 20A, 20B, 30, 33, and/or 35, or using any combination of the devices described for these figures. Initially, at block 4305, the base station may receive a resource grant identifying hierarchical modulation resources, the hierarchical modulation resources comprising a base modulation layer and an enhancement modulation layer, the base modulation layer having a lower error rate threshold than the enhancement modulation layer. At block 4310, the base station may identify first content for transmission on the base modulation layer. At block 4315, the base station may identify second content for transmission on the enhancement modulation layer. At block 4320, the base station may superposition the enhancement modulation layer on the base modulation layer. At block 4325, the base station may transmit the superpositioned base and enhancement modulation layers.

Figure 44:
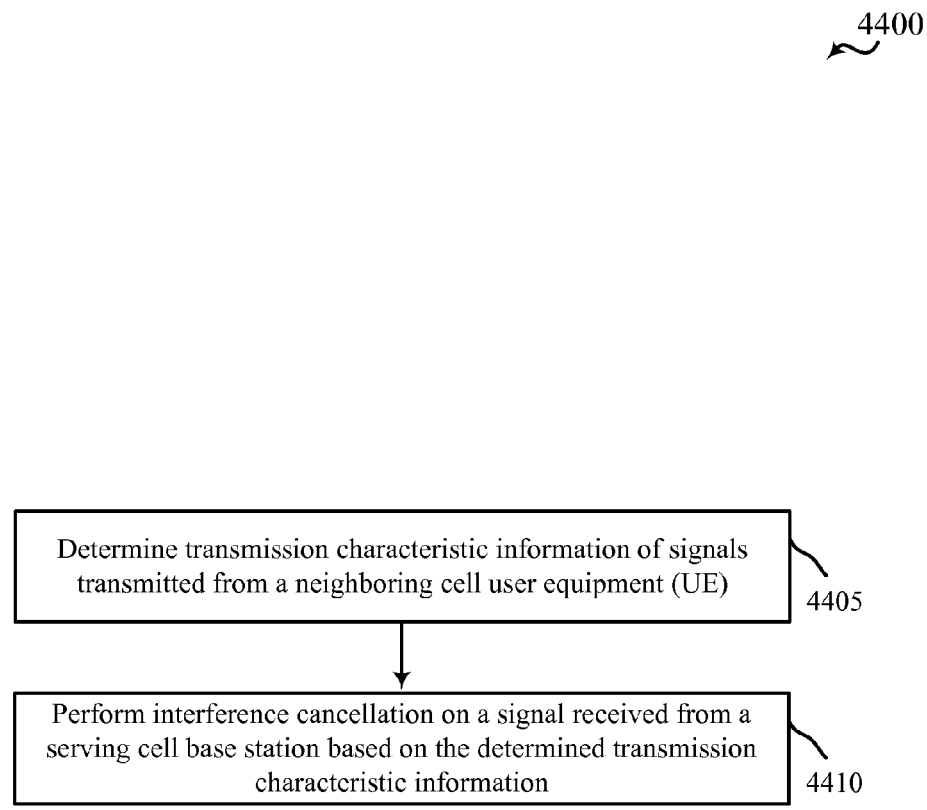
FIG. 44 is a flowchart of another method for wireless communications according to various examples.

FIG. 44 illustrates a method 4400 that may be carried out by a UE or other entity in a wireless communications system according to various embodiments. The method 4400 may, for example, be performed by a UE 115 of FIGS. 1, 2, 6, 7, 8, 9, 18, 22, 27, 31, 34, 39, and/or 40, or device 1305, 1605, 2505, and/or 3505 of FIGS. 13, 15, 16, 19, 25, and/or 35, or using any combination of the devices described for these figures. Initially, at block 4405, the UE may determine transmission characteristic information of signals transmitted from a neighboring cell UE. At block 4410, the UE may perform interference cancellation on a signal received from a serving cell base station based on the determined transmission characteristic information.

Figure 45:
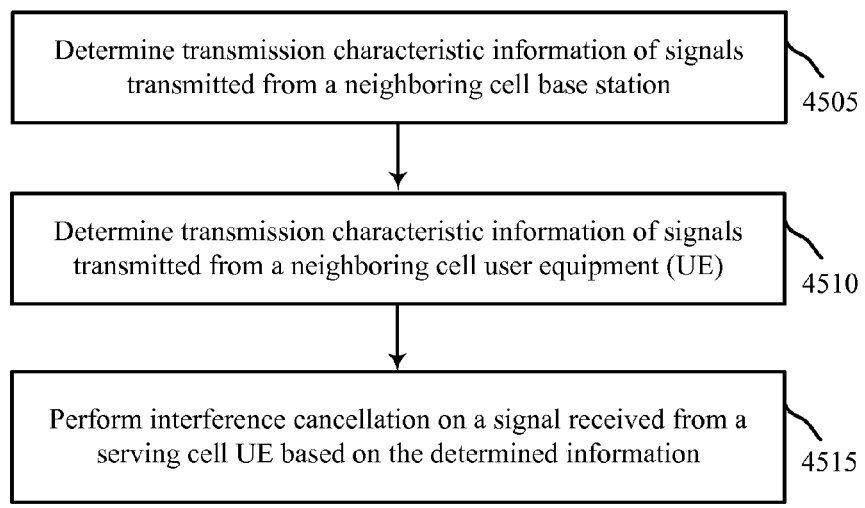
FIG. 45 is a flowchart of another method for wireless communications according to various examples.

FIG. 45 illustrates a method 4500 that may be carried out by a base station or eNB, or other entity in a wireless communications system according to various embodiments. The method 4500 may, for example, be performed by a base station or eNB 105 of FIGS. 1, 2, 7, 8, 9, 18, 22, 27, 31, 34, 38, and/or 40, or device 405, 2005, 3005, 3305, and/or 3505 of FIGS. 4, 10, 20A, 20B, 30, 33, and/or 35, or using any combination of the devices described for these figures. Initially, at block 4505, the base station may determine transmission characteristic information of signals transmitted from a neighboring cell base station. At block 4510, the base station may determine transmission characteristic information of signals transmitted from a neighboring cell UE. At block 4515, the base station may perform interference cancellation on a signal received from a serving cell UE based on the determined information.

Figure 46:
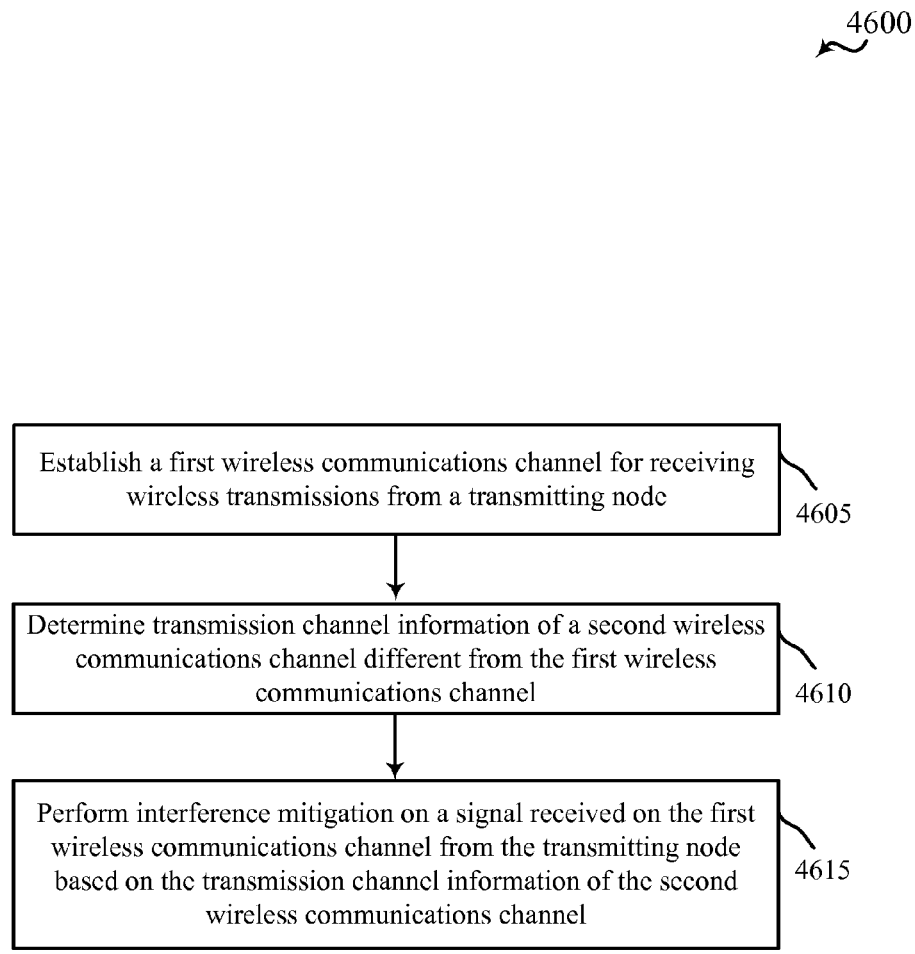
FIG. 46 is a flowchart of another method for wireless communications according to various examples.

FIG. 46 illustrates a method 4600 that may be carried out by a base station or eNB, a UE, or other entity in a wireless communications system according to various embodiments. The method 4600 may, for example, be performed by a base station or eNB 105, or a UE 115 of FIGS. 1, 2, 6, 7, 8, 9, 18, 22, 27, 31, 34, 38, 39, and/or 40, or device 405, 1305, 1605, 2005, 2505, 3005, 3305, and/or 3505 of FIGS. 4, 10, 13, 15, 16, 19, 20A, 20B, 25, 30, 33, and/or 35, or using any combination of the devices described for these figures. Initially, at block 4605, a first wireless communications channel is established for receiving wireless transmissions from a transmitting node. At block 4610, transmission channel information of a second wireless communications channel different from the first wireless communications channel is determined. At block 4615, interference mitigation is performed on a signal received on the first wireless communications channel from the transmitting node based on the transmission channel information of the second wireless communications channel.

The detailed description set forth above in connection with the appended drawings describes exemplary embodiments and does not represent the only embodiments that may be implemented or that are within the scope of the claims. The term "example" or "exemplary," when used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the terms "apparatus" and "device" are interchangeable.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for transmitting hierarchical content, comprising:
   transmitting, for at least one user equipment (UE), a downlink grant identifying hierarchical modulation resources that comprise a base modulation layer and an enhancement modulation layer;
   modulating first content on the base modulation layer, the first content associated with a first error rate threshold;
   modulating second content on the enhancement modulation layer, the second content associated with a second error rate threshold that is higher than the first error rate threshold;
   and
   transmitting, to the at least one UE, the first content and the second content as a superposition of the enhancement modulation layer on the base modulation layer using the hierarchical modulation resources.

2. The method of claim 1, wherein the first error rate threshold and the second error rate threshold are based on a type of information contained in the first content, the second content, or both.

3. The method of claim 1, wherein the first content comprises high priority content and the second content comprises lower priority content.

4. The method of claim 1, wherein the first content and the second content are transmitted to a same UE.

5. The method of claim 1, wherein the first content and the second content are transmitted to different UEs.

6. The method of claim 1, wherein the first content comprises control information for a UE configured to receive the first content.

7. The method of claim 6, wherein the control information comprises one or more of scheduling grant information, acknowledgment information, or signaling information.

8. The method of claim 6, wherein the UE is configured to refrain from transmitting an acknowledgment of receipt of the control information.

9. The method of claim 6, wherein the second content comprises user data.

10. The method of claim 9, wherein the UE is configured to transmit an acknowledgment of receipt of the user data.

11. The method of claim 9, wherein the control information is transmitted using a physical downlink control channel (PDCCH) on the base modulation layer, and the user data is transmitted using a physical downlink shared channel (PDSCH) on the enhancement modulation layer.

12. The method of claim 1, wherein the first content comprises latency sensitive unicast data for a first UE and the second content comprises best effort unicast data for the first UE or a different UE.

13. The method of claim 12, wherein the latency sensitive unicast data is transmitted using a physical downlink shared channel (PDSCH) on the base modulation layer and the best effort unicast data is transmitted using a second PDSCH on the enhancement modulation layer.

14. The method of claim 1, wherein the first content comprises unicast data for a specific UE and the second content comprises broadcast data.

15. The method of claim 1, wherein the first content comprises broadcast data and the second content comprises unicast data for a specific UE.

16. The method of claim 15, wherein the broadcast data is transmitted using a physical multicast channel (PMCH) on the base modulation layer and the unicast data is transmitted using a physical downlink shared channel (PDSCH) on the enhancement modulation layer.

17. The method of claim 15, wherein UEs configured to receive the broadcast data are configured to refrain from transmitting an acknowledgment of receipt of the broadcast data, and the specific UE is configured to transmit an acknowledgment of receipt of the unicast data.

18. The method of claim 1, further comprising:
determining channel state information (CSI) for a channel to be used for transmission of the base modulation layer and the enhancement modulation layer; and
calculating a transmission energy ratio between the base modulation layer and the enhancement modulation layer based on the CSI.

19. The method of claim 18, wherein determining the CSI and calculating the transmission energy ratio are performed for each of a plurality of transmission time intervals (TTIs).

20. The method of claim 1, further comprising:
determining a number of spatial layers available for transmission of the base modulation layer and the enhancement modulation layer; and
transmitting the superpositioned base and enhancement modulation layers on the determined number of spatial layers.

21. The method of claim 20, wherein the determining the number of spatial layers is based on a rank indicator (RI) from the at least one UE.

22. The method of claim 1, further comprising:
determining channel state information (CSI) for each of a plurality of UEs; and
ordering which of the plurality of UEs are is to receive one or more of the base modulation layer or the enhancement modulation layer based on the CSI for the plurality of UEs.

23. The method of claim 22, wherein transmitting the superpositioned base and enhancement modulation layers comprises:
transmitting the base modulation layer to the one or more UEs determined to have lower channel quality based on the determined CSI; and
transmitting the enhancement modulation layer to the one or more UEs determined to have higher channel quality based on the determined CSI.

24. The method of claim 1, wherein the downlink grant includes signaling information for the at least one UE that is to receive the superpositioned base and enhancement modulation layers.

25. The method of claim 24, wherein the signaling information comprises one or more of a transmission energy ratio between the base modulation layer and the enhancement modulation layer, a transport block size for the base modulation layer and the enhancement modulation layer, or a modulation and coding scheme for the base modulation layer and the enhancement modulation layer.

26. The method of claim 1, wherein the downlink grant indicates one or more of:
a resource block location of data transmitted to the UE on one or more of the base modulation layer or the enhancement modulation layers,
a code block size for one or more of the base modulation layer or the enhancement modulation layer, or
a number of spatial layers for one or more of the base modulation layer or the enhancement modulation layer.

27. The method of claim 1, wherein the downlink grant indicates one or more of:
a modulation and coding scheme (MCS) of data transmitted to the UE on one or more of the base modulation layer or the enhancement modulation layer,
a precoding matrix used for transmitting on one or more of the base modulation layer or the enhancement modulation layer, or
a layer mapping for one or more of the base modulation layer or the enhancement modulation layer.

28. The method of claim 1, wherein the downlink grant is a single downlink grant comprising information for the base modulation layer or the enhancement modulation layer.

29. The method of claim 1, wherein the downlink grant comprises two or more downlink grants for two or more UEs, each downlink grant corresponding to the base modulation layer or the enhancement modulation layer.

30. The method of claim 29, wherein the each downlink grant comprises an indication of the base modulation layer or the enhancement modulation layer and downlink resources of the indicated base modulation layer or enhancement modulation layer.

31. The method of claim 30, wherein the indication of the base modulation layer or the enhancement modulation layer comprises one or more bits embedded in the downlink grant.

32. The method of claim 30, wherein the indication of the base modulation layer or the enhancement modulation layer comprises a cyclic redundancy check (CRC) masked with a cell radio network temporary identifier (C-RNTI) for a UE of the two or more UEs to indicate the downlink resources are for the base modulation layer or the enhancement modulation layer.

33. The method of claim 32, wherein the C-RNTI for the base modulation layer comprises a primary cell radio network temporary identifier (PC-RNTI) for the UE, and the C-RNTI for the enhancement modulation layer comprises a secondary cell radio network temporary identifier (SC-RNTI) for the UE.

34. The method of claim 24, wherein the signaling information comprises radio resource control (RRC) signaling.

35. The method of claim 34, wherein the RRC signaling includes one or more of an energy ratio between the base modulation layer and the enhancement modulation layer, a modulation scheme for the base modulation layer, a modulation scheme for the enhancement modulation layer, a resource block size for the base modulation layer, or a resource block size for the enhancement modulation layer.

36. The method of claim 24, wherein the signaling information is provided using a physical control format indicator channel (PCFICH).

37. The method of claim 24, wherein the signaling information comprises independent control information for the base modulation layer and the enhancement modulation layer.

38. The method of claim 1, wherein the base modulation layer and the enhancement modulation layer have a same modulation scheme.

39. The method of claim 1, wherein the base modulation layer and the enhancement modulation layer have different modulation schemes.

40. The method of claim 39, wherein a modulation scheme for the base modulation layer and the enhancement modulation layer comprises a quadrature phase shift keying (QPSK) modulation scheme, a binary phase shift keying (BPSK) modulation scheme, or a quadrature amplitude modulation (QAM) modulation scheme.

41. A method for transmitting hierarchical content, comprising:
receiving a resource grant identifying hierarchical modulation resources, the hierarchical modulation resources comprising a base modulation layer and an enhancement modulation layer, the base modulation layer having a lower error rate threshold than the enhancement modulation layer;
modulating first content for transmission on the base modulation layer;

modulating second content for transmission on the enhancement modulation layer; and transmitting the first content and the second content as a superposition of the enhancement modulation layer on the base modulation layer using the hierarchical modulation resources.

42. The method of claim 41, wherein the base modulation layer comprises a physical uplink control channel (PUCCH) and the enhancement modulation layer comprises a physical uplink shared channel (PUSCH).

43. The method of claim 41, wherein both the base modulation layer and the enhancement modulation layer comprise a physical uplink shared channel (PUSCH).

44. The method of claim 41, wherein the first content comprises high priority content and the second content comprises lower priority content.

45. The method of claim 41, wherein receiving the resource grant comprises:
receiving an uplink grant from a base station indicating hierarchical modulation resources for both the base modulation layer and the enhancement modulation layer.

46. The method of claim 45, wherein the uplink grant comprises one or more of an energy ratio between the base modulation layer and the enhancement modulation layer, layer mapping information, code block size, or a number of spatial layers within the base modulation layer and the enhancement modulation layer.

47. The method of claim 45, wherein the uplink grant further indicates a number of spatial layers for transmission of the base modulation layer and the enhancement modulation layer.

48. The method of claim 41, wherein the base modulation layer and the enhancement modulation layer have the same modulation scheme.

49. The method of claim 41, wherein the base modulation layer and the enhancement modulation layer have different modulation schemes.

50. The method of claim 49, wherein a modulation scheme for the base modulation layer and the enhancement modulation layer comprises a quadrature phase shift keying (QPSK) modulation scheme, a binary phase shift keying (BPSK) modulation scheme, or a quadrature amplitude modulation (QAM) modulation scheme.

51. The method of claim 41, wherein receiving the resource grant comprises:
receiving a first uplink grant from a base station indicating hierarchical modulation resources for the base modulation layer; and
receiving a second uplink grant from the base station indicating hierarchical modulation resources for the enhancement modulation layer.

52. The method of claim 51, wherein the first uplink grant and the second uplink grant include spatial information indicating a number of spatial layers within a corresponding modulation layer.

53. The method of claim 51, wherein the first uplink grant and the second uplink grant comprise an indication of the base modulation layer or the enhancement modulation layer and uplink resources of the indicated base modulation layer or enhancement modulation layer.

54. The method of claim 53, wherein the indication of the base modulation layer or the enhancement modulation layer comprises one or more bits embedded in the first uplink grant and the second uplink grant.

55. The method of claim 53, wherein the indication of the base modulation layer or the enhancement modulation layer comprises a cyclic redundancy check (CRC) masked with a cell radio network temporary identifier (C-RNTI) for a user equipment (UE) to indicate the uplink resources are for the base modulation layer or the enhancement modulation layer.

56. The method of claim 55, wherein the C-RNTI for the base modulation layer comprises a primary cell RNTI (PC-RNTI) for the UE, and the C-RNTI for the enhancement modulation layer comprises a secondary cell RNTI (SC-RNTI) for the UE.

57. The method of claim 41, further comprising:
receiving signaling information comprising one or more of a transmission energy ratio between the base modulation layer and the enhancement modulation layer, a transport block size for the base modulation layer and the enhancement modulation layer, or a modulation and coding scheme for the base modulation layer and the enhancement modulation layer.

58. The method of claim 57, wherein the signaling information is received in radio resource control (RRC) signaling.

59. The method of claim 57, wherein the signaling information is received in the resource grant.

60. The method of claim 57, wherein the signaling information is received on a physical control format indicator channel (PCFICH).

61. The method of claim 57, wherein the signaling information comprises independent control information for the base modulation layer and the enhancement modulation layer.

62. The method of claim 41, wherein the first content comprises control information transmitted on a physical uplink control channel (PUCCH).

63. The method of claim 62, wherein the control information comprises one or more of acknowledgment of downlink data, channel state information (CSI), a rank indicator (RI), or a scheduling request (SR).

64. The method of claim 63, wherein the control information further comprises uplink information associated with the enhancement modulation layer.

65. The method of claim 64, wherein the uplink information associated with the enhancement modulation layer comprises a data rate associated with the enhancement modulation layer.

66. The method of claim 41, wherein the second content comprises user data transmitted on a physical uplink shared channel (PUSCH).

67. An apparatus for transmitting hierarchical content, comprising:
a processor;
memory in electronic communication with the processor; and
instructions stored in the memory, the instructions being executable by the processor to:
transmit, for at least one user equipment (UE), a downlink grant identifying hierarchical modulation resources that comprise a base modulation layer and an enhancement modulation layer;
modulate first content on the base modulation layer, the first content associated with a first error rate threshold;
modulate second content on the enhancement modulation layer, the second content associated with a second error rate threshold that is higher than the first error rate threshold;

and transmit, to the at least one UE, the first content and the second content as a superposition of the enhancement modulation layer on the base modulation layer using the hierarchical modulation resources.

68. The apparatus of claim 67, wherein the first error rate threshold and the second error rate threshold are based on a type of information contained in the first content, the second content, or both.

69. The apparatus of claim 67, wherein the first content comprises high priority content and the second content comprises lower priority content.

70. The apparatus of claim 67, wherein the first content and the second content are transmitted to a same UE.

71. The apparatus of claim 67, wherein the first content and the second content are transmitted to different UEs.

72. The apparatus of claim 67, wherein the first content comprises control information for a UE configured to receive the first content.

73. The apparatus of claim 72, wherein the control information comprises one or more of scheduling grant information, acknowledgment information, or signaling information.

74. The apparatus of claim 72, wherein the UE is configured to refrain from transmitting an acknowledgment of receipt of the first content.

75. The apparatus of claim 72, wherein the second content comprises user data.

76. The apparatus of claim 75, wherein the UE is configured to transmit an acknowledgment of receipt of the user data.

77. The apparatus of claim 75, wherein the control information is transmitted using a physical downlink control channel (PDCCH) on the base modulation layer, and the user data is transmitted using a physical downlink shared channel (PDSCH) on the enhancement modulation layer.

78. The apparatus of claim 67, wherein the first content comprises latency sensitive unicast data for a first UE and the second content comprises best effort unicast data for the first UE or a different UE.

79. The apparatus of claim 78, wherein the latency sensitive unicast data is transmitted using a physical downlink shared channel (PDSCH) on the base modulation layer and the best effort unicast data is transmitted using a second PDSCH on the enhancement modulation layer.

80. The apparatus of claim 67, wherein the first content comprises unicast data for a specific UE and the second content comprises broadcast data.

81. The apparatus of claim 67, wherein the first content comprises broadcast data and the second content comprises unicast data for a specific UE.

82. The apparatus of claim 81, wherein the broadcast data is transmitted using a physical multicast channel (PMCH) on the base modulation layer and the unicast data is transmitted using a physical downlink shared channel (PDSCH) on the enhancement modulation layer.

83. The apparatus of claim 81, wherein UEs configured to receive the broadcast data are configured to refrain from transmitting an acknowledgment of receipt of the broadcast data, and the specific UE is configured to transmit an acknowledgment of receipt of the unicast data.

84. The apparatus of claim 67, the instructions being further executable by the processor to:

determine channel station information (CSI) for a channel to be used for transmission of the base modulation layer and the enhancement modulation layer; and calculate a transmission energy ratio between the base modulation layer and the enhancement modulation layer based on the CSI.

85. The apparatus of claim 84, wherein the instructions are further executable to determine the CSI and calculate the transmission energy ratio for each of a plurality of transmission time intervals (TTIs).

86. The apparatus of claim 67, the instructions being further executable by the processor to:

determine a number of spatial layers available for transmission of the base modulation layer and the enhancement modulation layer; and transmit the superpositioned base and enhancement modulation layers on the determined number of spatial layers.

87. The apparatus of claim 86, wherein the instructions are further executable to determine the number of spatial layers based on a rank indicator (RI) from the at least one UE.

88. The apparatus of claim 67, the instructions being further executable by the processor to:

determine channel state information (CSI) for each of a plurality of UEs; and order which of the plurality of UEs are to receive one or more of the base modulation layer or the enhancement modulation layer based on the CSI for the plurality of UEs.

89. The apparatus of claim 88, wherein the instructions executable by the processor to transmit the superpositioned base and enhancement modulation layers comprise instructions executable by the processor to:

transmit the base modulation layer to the one or more UEs determined to have lower channel quality based on the determined CSI; and transmit the enhancement modulation layer to the one or more UEs determined to have higher channel quality based on the determined CSI.

90. The apparatus of claim 67, the instructions being further executable by the processor to:

transmit signaling information for the at least one user equipment (UE) that is to receive the superpositioned base and enhancement modulation layers.

91. The apparatus of claim 90, wherein the signaling information comprises one or more of a transmission energy ratio between the base modulation layer and the enhancement modulation layer, a transport block size for the base modulation layer and the enhancement modulation layer, or a modulation and coding scheme for the base modulation layer and the enhancement modulation layer.

92. The apparatus of claim 90, wherein the signaling information comprises radio resource control (RRC) signaling.

93. The apparatus of claim 92, wherein the RRC signaling includes one or more of an energy ratio between the base modulation layer and the enhancement modulation layer, a modulation scheme for the base modulation layer, a modulation scheme for the enhancement modulation layer, a resource block size for the base modulation layer, or a resource block size for the enhancement modulation layer.

94. The apparatus of claim 90, wherein the signaling information is provided using a physical control format indicator channel (PCFICH).

95. The apparatus of claim 90, wherein the signaling information comprises independent control information for the base modulation layer and the enhancement modulation layer.

96. The apparatus of claim 67, wherein the downlink grant indicates one or more of:
a resource block location of data transmitted to the UE on one or more of the base modulation layer or the enhancement modulation layers,
a code block size for one or more of the base modulation layer or the enhancement modulation layer, or
a number of spatial layers for one or more of the base modulation layer or the enhancement modulation layer.

97. The apparatus of claim 67, wherein the downlink grant indicates one or more of:
a modulation and coding scheme (MCS) of data transmitted to the UE on one or more of the base modulation layer or the enhancement modulation layer,
a precoding matrix used for transmitting on one or more of the base modulation layer or the enhancement modulation layer, or
a layer mapping for one or more of the base modulation layer or the enhancement modulation layer.

98. The apparatus of claim 67, wherein the downlink grant is a single downlink grant comprising information for the base modulation layer or the enhancement modulation layer.

99. The apparatus of claim 67, wherein the downlink grant comprises two or more downlink grants for two or more UEs, each downlink grant corresponding to the base modulation layer or the enhancement modulation layer.

100. The apparatus of claim 99, the each downlink grant comprises an indication of the base modulation layer or the enhancement modulation layer and downlink resources of the indicated base modulation layer or enhancement modulation layer.

101. The apparatus of claim 100, wherein the indication of the base modulation layer or the enhancement modulation layer comprises one or more bits embedded in the downlink grant.

102. The apparatus of claim 100, wherein the indication of the base modulation layer or the enhancement modulation layer comprises a cyclic redundancy check (CRC) masked with a cell radio network temporary identifier (C-RNTI) for a UE of the two or more UEs to indicate the downlink resources are for the base modulation layer or the enhancement modulation layer.

103. The apparatus of claim 102, wherein the C-RNTI for the base modulation layer comprises a primary cell RNTI (PC-RNTI) for the UE, and the C-RNTI for the enhancement modulation layer comprises a secondary cell RNTI (SC-RNTI) for the UE.

104. The apparatus of claim 67, wherein the base modulation layer and the enhancement modulation layer have a same modulation scheme.

105. The apparatus of claim 67, wherein the base modulation layer and the enhancement modulation layer have different modulation schemes.

106. The apparatus of claim 105, wherein a modulation scheme for the base modulation layer and the enhancement modulation layer comprises a quadrature phase shift keying (QPSK) modulation scheme, a binary phase shift keying (BPSK) modulation scheme, or a quadrature amplitude modulation (QAM) modulation scheme.

107. An apparatus for transmitting hierarchical content, comprising:
a processor;
memory in electronic communication with the processor; and
instructions stored in the memory, the instructions being executable by the processor to:
receive a resource grant identifying hierarchical modulation resources, the hierarchical modulation resources comprising a base modulation layer and an enhancement modulation layer, the base modulation layer having a lower error rate threshold than the enhancement modulation layer;
modulate first content for transmission on the base modulation layer;
modulate second content for transmission on the enhancement modulation layer; and
transmit the first content and the second content as a superposition of the enhancement modulation layer on the base modulation layer using the hierarchical modulation resources.

108. The apparatus of claim 107, wherein the base modulation layer comprises a physical uplink control channel (PUCCH) and the enhancement modulation layer comprises a physical uplink shared channel (PUSCH).

109. The apparatus of claim 107, wherein both the base modulation layer and the enhancement modulation layer comprise a physical uplink shared channel (PUSCH).

110. The apparatus of claim 107, wherein the first content comprises high priority content and the second content comprises low priority content.

111. The apparatus of claim 107, wherein the instructions executable by the processor to receive the resource grant comprise instructions executable by the processor to:
receive an uplink grant from a base station indicating hierarchical modulation resources for both the base modulation layer and the enhancement modulation layer.

112. The apparatus of claim 111, wherein the uplink grant comprises one or more of an energy ratio between the base modulation layer and the enhancement modulation layer, layer mapping information, code block size, or a number of spatial layers within the base modulation layer and the enhancement modulation layer.

113. The apparatus of claim 111, wherein the uplink grant further indicates a number of spatial layers for transmission of the base modulation layer and the enhancement modulation layer.

114. The apparatus of claim 107, wherein the base modulation layer and the enhancement modulation layer have the same modulation scheme.

115. The apparatus of claim 107, wherein the base modulation layer and the enhancement modulation layer have different modulation schemes.

116. The apparatus of claim 115, wherein a modulation scheme for the base modulation layer and the enhancement modulation layer comprises a quadrature phase shift keying (QPSK) modulation scheme, a binary phase shift keying (BPSK) modulation scheme, or a quadrature amplitude modulation (QAM) modulation scheme.

117. The apparatus of claim 107, wherein the instructions executable by the processor to receive the resource grant comprise instructions executable by the processor to:
receive a first uplink grant from a base station indicating hierarchical modulation resources for the base modulation layer; and
receive a second uplink grant from the base station indicating hierarchical modulation resources for the enhancement modulation layer.

118. The apparatus of claim 117, wherein the first uplink grant and the second uplink grant include spatial information indicating a number of spatial layers within a corresponding modulation layer.

119. The apparatus of claim 117, wherein the first uplink grant and the second uplink grant comprise an indication of the base modulation layer or the enhancement modulation layer and uplink resources of the indicated base modulation layer or enhancement modulation layer.

120. The apparatus of claim 119, wherein the indication of the base modulation layer or the enhancement modulation layer comprises one or more bits embedded in the first uplink grant and the second uplink grant.

121. The apparatus of claim 119, wherein the indication of the base modulation layer or the enhancement modulation layer comprises a cyclic redundancy check (CRC) masked with a cell radio network temporary identifier (C-RNTI) for a user equipment (UE) to indicate the uplink resources are for the base modulation layer or the enhancement modulation layer.

122. The apparatus of claim 121, wherein the C-RNTI for the base modulation layer comprises a primary cell RNTI (PC-RNTI) for the UE, and the C-RNTI for the enhancement modulation layer comprises a secondary cell RNTI (SC-RNTI) for the UE.

123. The apparatus of claim 107, the instructions being further executable by the processor to:
receive signaling information comprising one or more of a transmission energy ratio between the base modulation layer and the enhancement modulation layer, a transport block size for the base modulation layer and the enhancement modulation layer, or a modulation and coding scheme for the base modulation layer and the enhancement modulation layer.

124. The apparatus of claim 123, wherein the signaling information is received in radio resource control (RRC) signaling.

125. The apparatus of claim 123, wherein the signaling information is received in the resource grant.

126. The apparatus of claim 123, wherein the signaling information is received on a physical control format indicator channel (PCFICH).

127. The apparatus of claim 123, wherein the signaling information comprises independent control information for the base modulation layer and the enhancement modulation layer.

128. The apparatus of claim 107, wherein the first content comprises control information transmitted on a physical uplink control channel (PUCCH).

129. The apparatus of claim 128, wherein the control information comprises one or more of acknowledgment of downlink data, channel state information (CSI), a rank indicator (RI), or a scheduling request (SR).

130. The apparatus of claim 129, wherein the control information further comprises uplink information associated with the enhancement modulation layer.

131. The apparatus of claim 130, wherein the uplink information associated with the enhancement modulation layer comprises a data rate associated with the enhancement modulation layer.

132. The apparatus of claim 107, wherein the second content comprises user data transmitted on a physical uplink shared channel (PUSCH).

* * * * *